United States Patent [19]

Doswald et al.

[11] Patent Number: 4,550,158
[45] Date of Patent: Oct. 29, 1985

[54] METAL-FREE DISAZO COMPOUNDS CONTAINING AT LEAST TWO BASIC WATER-SOLUBILIZING GROUPS AND HAVING A 1-PHENYLPYRAZOLE MIDDLE COMPONENT RADICAL AND A 6-HYDROXYPRID-2-ONE TERMINAL COUPLING COMPONENT

[75] Inventors: Paul Doswald, Münchenstein; Emil Moriconi, Basel; Helmut Moser, Oberwil; Horst Schmid, Reinach, all of Switzerland

[73] Assignee: Sandoz Ltd., Basel, Switzerland

[21] Appl. No.: 409,170

[22] Filed: Aug. 18, 1982

Related U.S. Application Data

[60] Division of Ser. No. 402,407, Jul. 27, 1982, which is a continuation-in-part of Ser. No. 261,318, May 7, 1981, abandoned, and a continuation-in-part of Ser. No. 391,261, Jun. 23, 1982, abandoned, said Ser. No. 391,261, is a continuation-in-part of Ser. No. 261,318.

[30] Foreign Application Priority Data

| Date | Country | Number |
|---|---|---|
| May 8, 1980 [CH] | Switzerland | 3601/80 |
| May 8, 1980 [CH] | Switzerland | 3602/80 |
| May 8, 1980 [CH] | Switzerland | 3603/80 |
| May 8, 1980 [CH] | Switzerland | 3604/80 |
| May 8, 1980 [CH] | Switzerland | 3605/80 |
| May 8, 1980 [CH] | Switzerland | 3606/80 |
| May 13, 1980 [CH] | Switzerland | 3735/80 |
| May 13, 1980 [CH] | Switzerland | 3736/80 |
| May 13, 1980 [CH] | Switzerland | 3737/80 |
| May 29, 1980 [CH] | Switzerland | 4183/80 |
| May 29, 1980 [CH] | Switzerland | 4184/80 |
| May 29, 1980 [CH] | Switzerland | 4185/80 |
| Jul. 1, 1980 [CH] | Switzerland | 5079/80 |
| Jul. 1, 1980 [CH] | Switzerland | 5080/80 |
| Jul. 1, 1980 [CH] | Switzerland | 5081/80 |
| Dec. 10, 1980 [CH] | Switzerland | 9104/80 |
| Dec. 10, 1980 [CH] | Switzerland | 9105/80 |
| Dec. 10, 1980 [CH] | Switzerland | 9106/80 |

[51] Int. Cl.[4] .................. C09B 44/02; C09B 44/08; C09B 44/18; C09B 44/20
[52] U.S. Cl. .................. 534/605; 534/603; 534/604; 534/612; 534/613; 534/623; 534/698; 534/641; 534/700; 534/701; 534/739; 534/750; 534/797; 534/803; 162/162
[58] Field of Search .......... 260/146 R, 146 D, 146 T, 260/147, 148, 149, 150, 151; 534/603, 604, 605, 612, 613

[56] References Cited

U.S. PATENT DOCUMENTS

| | | | |
|---|---|---|---|
| 2,135,293 | 11/1938 | Renshaw et al. | 424/226 X |
| 3,971,740 | 7/1976 | Desai et al. | 260/146 R X |
| 3,993,787 | 1/1976 | Moser | 260/158 |
| 4,103,092 | 7/1978 | Jefferies et al. | 260/175 |
| 4,206,144 | 6/1980 | Jefferies et al. | 260/567.6 |

FOREIGN PATENT DOCUMENTS

| | | | |
|---|---|---|---|
| 24321 | 3/1981 | European Pat. Off. | 260/158 |
| 24322 | 3/1981 | European Pat. Off. | 260/156 |
| 1211425 | 3/1960 | France | 260/158 |
| 1495232 | 9/1967 | France | 260/158 |
| 472486 | 6/1969 | Switzerland | 260/156 |
| 576270 | 3/1946 | United Kingdom | 260/156 |
| 1296857 | 11/1972 | United Kingdom | 260/156 |
| 1299080 | 12/1972 | United Kingdom | 260/202 |
| 1333837 | 10/1973 | United Kingdom | 260/202 |
| 1338250 | 11/1973 | United Kingdom | 260/202 |
| 1534563 | 12/1978 | United Kingdom | 260/176 |
| 1547900 | 6/1979 | United Kingdom | 260/198 |
| 1550830 | 8/1979 | United Kingdom | 260/176 |

*Primary Examiner*—Floyd D. Higel
*Attorney, Agent, or Firm*—Gerald D. Sharkin; Richard E. Vila; Melvyn M. Kassenoff

[57] ABSTRACT

Metal-free azo compounds of the formula

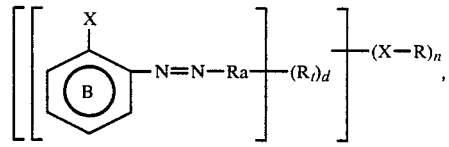

wherein
Ra is an aromatic group or an active methylene coupling component radical as defined in the specification,
$R_t$ is an arylazo group or a group of the formula -Y-Z, wherein
Y is a direct bond or a bridging radical, and
Z is a basic amino or quaternary ammonium group,

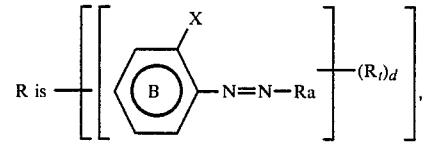

wherein each of the variables is as defined above or below,
X is a direct bond or a bridging radical,
x is hydrogen, hydroxy $C_{1-4}$alkyl, $C_{1-4}$alkoxy, amino or carboxy,
ring B is further unsubstituted or further substituted,
d is 0, 1 or 2, and
n is 0 or 1,
with the provisos that (i) the compounds contain an average of at least 1.3 basic water-solubilizing groups, and (ii) the compounds are free of sulfo groups,
and 1:1 and 1:2 metal complexes thereof,
which metal-free compounds and metal complexes are useful as dyes for leather and paper.

19 Claims, No Drawings

METAL-FREE DISAZO COMPOUNDS CONTAINING AT LEAST TWO BASIC WATER-SOLUBILIZING GROUPS AND HAVING A 1-PHENYLPYRAZOLE MIDDLE COMPONENT RADICAL AND A 6-HYDROXYPRID-2-ONE TERMINAL COUPLING COMPONENT

This application is a division of application Ser. No. 402,407, filed July 27, 1982, which in turn is a continuation-in-part of application Ser. No. 261,318, filed May 7, 1981 and now abandoned, and a continuation-in-part of application Ser. No. 391,261, filed June 23, 1982 and now abandoned, said application Ser. No. 391,261 also being a continuation-in-part of said application Ser. No. 261,318.

The invention relates to sulpho group-free azo compounds in metal-free, 1:1 metal complex or 1:2 metal complex form, which are useful for dyeing paper and leather.

What is meant by a "1:1 metal complex" is that each molecule of the complex has 1 metal atom bonded to 1 dyestuff molecule or has 2 metal atoms bonded to two dyestuff units, which dyestuff units are joined together by a direct bond or a conventional bridging group; and what is meant by a "1:2 metal complex" is that the complex has 1 atom of metal bonded to two dyestuff units, which dyestuff units can be the same or different but which dyestuff units are part of two separate dyestuff molecules. Unless otherwise indicated, terms such as "a 1:2 metal complex of a compound of the formula . . . " and "a compound in . . . 1:2 metal complex form, the compound being of the formula . . . " includes 1:2 metal complexes having one dyestuff unit of the stated formula, the other dyestuff unit being a further metallizable compound not having the stated formula, as well as 1:2 metal complexes having two dyestuff units (which may be the same or different) of the stated formula.

As utilized herein, the term "dyestuff unit" means a dye molecule not covalently linked to another molecule but that may be joined to another molecule through a complexed metal ion.

The invention provides sulpho group-free azo compounds in metal-free, 1:1 metal complex or 1:2 metal complex form having on average at least 1.3, preferably at least 2, water-solubilizing basic groups, the compounds being of formula I

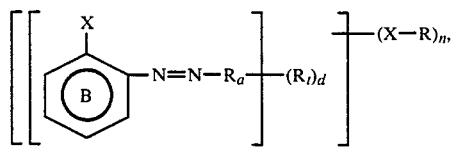

in which
Ra is a group of formula Ia, Ib or Ic

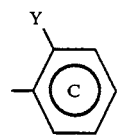

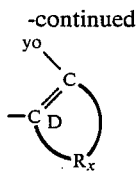

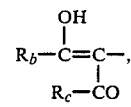

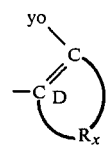

where the group $$\begin{array}{c} yo \\ \diagdown \\ C \\ \diagup \diagup \\ -C \quad D \\ \diagdown \\ R_x \end{array}$$

is a substituted pyrazolone-5, a substituted 5-aminopyrazole, a substituted 2-pyridone or an unsubstituted or substituted β-hydroxynaphthalene group,
in which
yo is —OH, —NH₂ or C₁₋₄alkoxy;
R_b is C₁₋₄alkyl or a substituted C₁₋₃alkyl group,
R_c is —NH₂, a substituted alkyl group, an unsubstituted or substituted alkylamino group, an unsubstituted or substituted phenylamino group, an unsubstituted or substituted naphthylamino group, an unsubstituted or substituted benzothiazolylamino group, an unsubstituted or substituted benzoxazolylamino group or an unsubstituted or substituted benzimidazolylamino group,
x and y independently are hydrogen, —OH, C₁₋₄alkyl, C₁₋₄alkoxy, —NH₂ or —COOH or
(i) x and y form a —NH—Me—O—, —NH—Me—NH—, —NH—Me—OOC—, —O—Me—O—, —O—Me—NH—, —O—Me—OOC—, —COO—Me—NH—, —COO—Me—O— or —COO—Me—OOC— group,
(ii) x and yo form a —NH—Me—O—, —NH—Me—NH—, —O—Me—O—, —O—Me—NH—, —COO—Me—O— or —COO—Me—NH— group or
(iii) x and the —OH group of the group of formula Ic form an —O—Me—O—, —NH—Me—O— or —COO—Me—O— group,
where
Me is a metal capable of forming a 1:1 metal complex, a 1:2 metal complex or both a 1:1 and a 1:2 metal complex,
n is 0 or 1,
d is 0, 1 or 2, each R_t is independently a group of formula Id, Ie, If or Ig

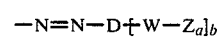

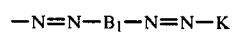

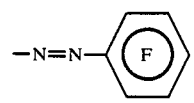

where

D is a diazo component radical,
W is a direct bond or a bridging radical,
$B_1$ is phenylene, naphthylene, tetrahydronaphthylene or

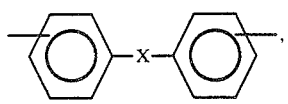

each of which may be substituted but is preferably unsubstituted,
Z is a basic amino or quaternary ammonium group,
a is 1 or 2,
b is 1, 2 or a number between 1 and 2 (When b is not an integer, only mixtures of compounds are contemplated. In the individual components of the mixtures, b is 1 or 2 although a minor amount of compounds wherein b has another value, e.g., 0 or 3, may be present.),
K is a coupling component radical of the 4-alkyl-2-pyridone, β-hydroxynaphthalene, benzene (e.g., aniline), pyrazole-5 (e.g., 5-aminopyrazole and pyrazolone-5) or acetoacyl series, the coupling component radical being substituted by at least one water-solubilizing basic group;
Y is a direct bond or a bridging radical;
X is a direct bond or a bridging radical; and
R is a group of formula Ih

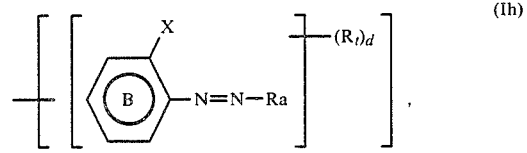

(Ih)

where x, $R_a$, $R_t$ and d are above defined, and each ring B independently may be substituted by one, two or three substituents in addition to x and the —N=N—$R_a$ group (but including any $R_t$ and —X—R groups), ring C may be substituted by one, two or three substituents in addition to y (but including any $R_t$ and —X—R groups) and ring F may be substituted by up to three substituents (including any —X—R group), with the provisos that;
(1) when in formula I, $R_a$ is a group of formula Ic and d is 1 or 2, at least one $R_t$ in formula I is a group of formula Ig and when, in formula Ih, $R_a$ is a group of formula Ic and d is 1 or 2, at least one $R_t$ in formula Ih is a group of formula Ig,
(2) when n is 1 and, in formula I, $R_a$ is a group of formula Ia, d is 1 or 2 and at least one $R_t$ is a group of formula Ig, the —X—R group is attached to an $R_a$ or $R_t$ group and when n is 1 and, in formula Ih, $R_a$ is a group of formula Ia, d is 1 or 2 and at least one $R_t$ is a group of formula Ig, the free valence is attached to an $R_a$ or $R_t$ group,
(3) when n is 1 and $R_a$ is a group of formula Ia, at least one of x and y on a ring B and ring C that are directly linked through an azo radical is other than hydrogen and $C_{1-4}$alkoxy, and
(4) when the compound of formula I is in 1:2 metal complex form with another metallizable compound, the other metallizable compound of the 1:2 metal complex also contains an average of at least 1.3 basic water-solubilizing groups.

Preferably, when the compounds of formula I are in 1:1 metal complex form, Me is copper, chromium, cobalt, iron, nickel, manganese or zinc, more preferably copper, chromium or cobalt; most preferably it is copper. Preferably, copper is $Cu^{2+}$, chromium is $Cr^{2+}$, cobalt is $Co^{2+}$, iron is $Fe^{2+}$, nickel is $Ni^{2+}$, manganese is $Mn^{2+}$ and zinc is $Zn^{2+}$.

Preferably, when the compounds of formula I are in 1:2 metal complex form, Me is chromium, cobalt, iron or nickel, more preferably chromium, cobalt or iron, and most preferably iron. Preferably, chromium is $Cr^{3+}$, cobalt is $Co^{3+}$, iron is $Fe^{3+}$ and nickel is $Ni^{3+}$.

Preferably, the compounds of formula I, when in 1:2 metal complex form and/or in metal-free form when n is 1, are symmetric, i.e., both dyestuff molecules bonded to the metal ion are the same and/or both "halves" of a molecule linked by X are identical.

The term "water-solubilizing basic group" is well-known in the art and includes quaternary ammonium groups and protonizable primary, secondary and tertiary amino groups, e.g., the Z, $Z_2$, etc. groups of the compounds of formulae I, II, etc. but not aromatic amino groups such as the —$NH_2$ groups as x, y or yo. See, for example, column 10 of U.S. Pat. No. 3,852,261 and Belgian Pat. No. 733,186.

The complexed metal ion of each 1:2 metal complex contains a negative charge which must be balanced by $M^{\oplus}$, wherein $M^{\oplus}$ is hydrogen or an equivalent of a non-chromophoric cation, preferably a monovalent cation such as lithium, sodium, potassium or $N^{\oplus}(R_{101})_4$, wherein each $R_{101}$ is independently hydrogen, $C_{1-3}$alkyl or 2- or 3-hydroxy($C_{2-3}$alkyl), with the proviso that at least one $R_{101}$ is hydrogen or $C_{1-3}$alkyl.

Further, the invention provides sulpho group-free azo compounds in metal-free, 1:1 metal complex or 1:2 metal complex form having on average at least 1.3, preferably at least 2, water-solubilizing basic groups, the compounds being of formula II

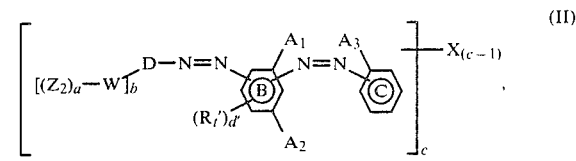

(II)

where
D, X, W, a, b and rings B and C are above defined,
both c's are 1 or 2,
d' is 0 or 1,
$A_1$ is —OH or —$NH_2$,
$A_3$ is hydrogen or —OH or
$A_1$ and $A_3$ form the group —NH—Me—O— or —O—Me—O—,
where
Me is a metal capable of forming a 1:1 metal complex, a 1:2 metal complex or both a 1:1 metal complex and a 1:2 metal complex.
$A_2$ is —OH or —$NH_2$,
$R_t'$ is a group of formula If defined above,
$Z_2$ is a group of the formula

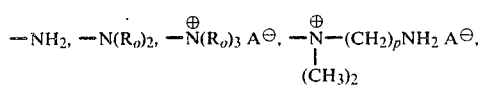

-continued

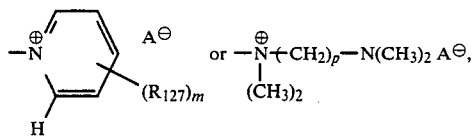

where each $R_o$ independently is methyl, ethyl, β-hydroxyethyl, benzyl,

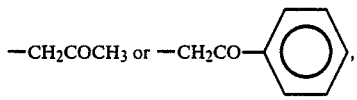

provided that not more than one group selected from from benzyl,

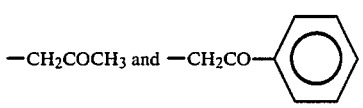

is attached and not more than two β-hydroxyethyl groups are attached to a nitrogen atom,
$R_{127}$ is methyl or ethyl,
m is 0, 1 or 2,
p is 1, 2 or 3,
and $A^\ominus$ is a non-chrromophoric anion,
with the provisos that (i) each of the azo bridges on ring B is ortho to $A_1$ or $A_2$ or to both $A_1$ and $A_2$ and (ii) when an $A_1$ and $A_3$ form a metal-containing radical, the —N=N— radical joining the $A_1$- and $A_3$-bearing rings is ortho to $A_1$ and to $A_3$.

Preferably, compounds of formula II are of formula II′

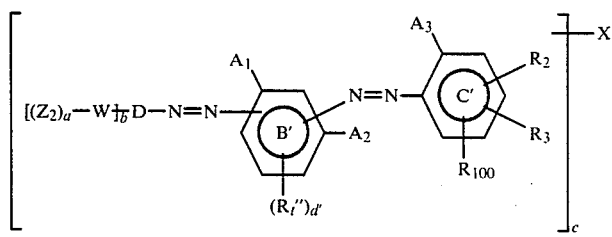

where $Z_2$, a, W, b, c, D, $A_1$, $A_2$, $A_3$ and d′ are as defined above, $[(Z_2)_a-W_b-D-$ preferably being $(Z_2)_a-D_1-$ defined below, $R_t''$ is a group of the formula αα or αβ

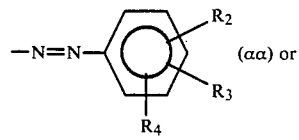

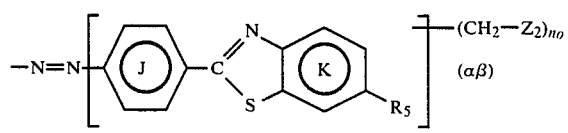

where, $R_2$ is hydrogen,

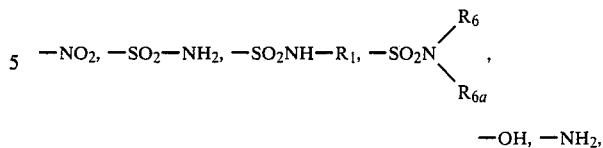

—OH, —NH$_2$,

—SO$_2$—NH—(CH$_2$)$_p$—Z$_2$, C$_{1-4}$alkyl or C$_{1-4}$ alkoxy,
where
p is 1, 2 or 3,
$R_1$ is C$_{1-4}$alkyl, —C$_2$H$_4$OH or —(CH$_2$)$_p$—N(R$_{1a}$)$_2$, where $R_{1a}$ is propyl or butyl,
$R_6$ is C$_{1-4}$alkyl, —C$_2$H$_4$OH or —(CH$_2$)$_p$—N(R$_6'$)$_2$, where $R_6'$ is C$_{1-4}$alkyl and $R_{6a}$ is C$_{1-4}$alkyl, —C$_2$H$_4$OH, —(CH$_2$)$_p$—N(R$_6'$)$_2$ or —C$_2$H$_4$O—R$_6'$,
$R_3$ is hydrogen, —NO$_2$, —SO$_2$NH$_2$,

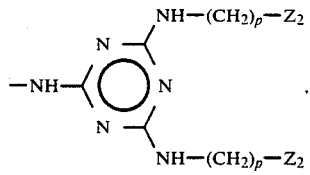

C$_{1-4}$alkyl, C$_{1-4}$alkoxy,

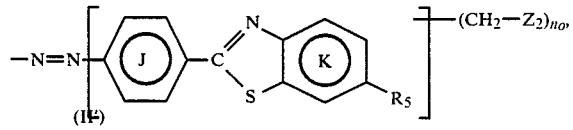

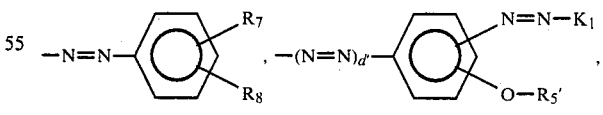

—N=N—K$_1$, —CO—NH—(CH$_2$)$_p$—Z$_2$,
—NH—CO—(CH$_2$)$_p$—Z$_2$, —SO$_2$—NH—(CH$_2$)$_p$—Z$_2$ or

—CH$_2$—Z$_2$, where
$R_5$ is hydrogen, C$_{1-4}$alkyl or C$_{1-4}$alkoxy;
$R_5'$ is C$_{1-4}$alkyl;
$n_o$ is 1, 2 or a number between 1 and 2 and each —CH$_2$—Z$_2$ group independently is attached to ring J or to ring K (When $n_o$ is not an integer, only mixtures of compounds wherein $n_o$ is 1 or 2 are contemplated although minor amounts of compounds wherein $n_o$ is 0 or 3 may be present);

$R_7$ is hydrogen, —OH, $C_{1-4}$ alkyl, $C_{1-4}$alkoxy, —NH—CO—NH$_2$ or —NH—CO—CH$_3$;

$R_8$ is hydrogen, —NH—CO—(CH$_2$)$_p$—Z$_2$ or

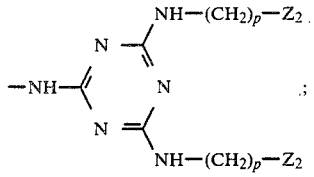

$R_4$ is hydrogen, —NO$_2$, $C_{1-4}$alkyl or $C_{1-4}$alkoxy;
$R_{100}$ is hydrogen, halo, hydroxy, $C_{1-4}$alkyl, $C_{1-4}$alkoxy or ureido,
$K_1$ is a group of the formula

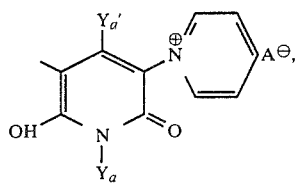

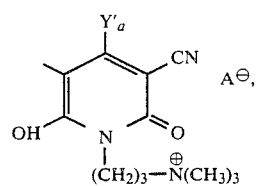

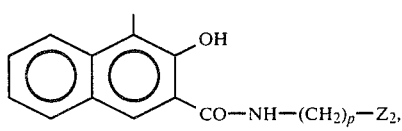

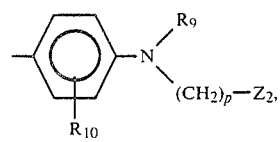

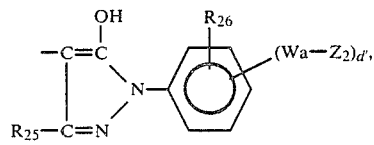

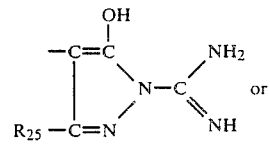

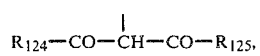

where
Wa is —(CH$_2$)$_s$—, —NHCO(CH$_2$)$_s$*—, —CONH—(CH$_2$)$_s$*— or —SO$_2$—NH—(CH$_2$)$_s$*—, in which the starred C atom is attached to the N atom of the group Z$_2$ defined above, and s is 1, 2, 3, 4, 5 or 6;

$R_{25}$ is $C_{1-4}$alkyl, —COO—R$_{25a}$ or —COOH, where $R_{25a}$ is $C_{1-4}$alkyl;
$R_{26}$ is hydrogen, halogen, $C_{1-4}$alkyl or $C_{1-4}$alkoxy;
$R_{124}$ is $C_{1-4}$alkyl or —(CH$_2$)$_p$—Z$_2$;
$Y_a$ is hydrogen, $C_{1-4}$alkyl, —C$_2$H$_4$OH or —(CH$_2$)$_p$—Z$_2$;
$Y_a'$ is $C_{1-4}$alkyl, preferably —CH$_3$;
$R_9$ is $C_{1-4}$alkyl or —(CH$_2$)$_p$—Z$_2$;
$R_{10}$ is hydrogen, $C_{1-4}$alkyl, $C_{1-4}$alkoxy, —NH—CO—CH$_3$ or —NH—CO—NH$_2$;
$d'$ is 0 or 1;
$R_{125}$ is —(CH$_2$)$_p$—Z$_2$, —NH—(CH$_2$)$_p$—Z$_2$ or

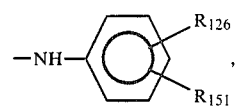

where
$R_{126}$ is hydrogen, —OH, $C_{1-4}$alkoxy, —NH—CO—(CH$_2$)$_p$—Z$_2$, —CO—NH—(CH$_2$)$_p$—Z$_2$, —SO$_2$—NH—(CH$_2$)$_p$—Z$_2$, —(CH$_2$)$_p$—Z$_2$ or

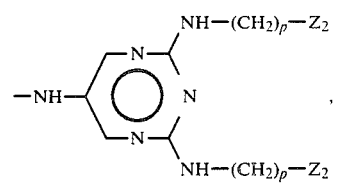

and $R_{151}$ is hydrogen or —(CH$_2$)$_p$—Z$_2$;
X' is one of the groups X$_1$ to X$_{48}$:
X$_1$ a direct bond,
X$_2$ straight or branched chain $C_{1-4}$alkylene,
X$_3$ —CO—, $X_4$—NH—$\overset{\overset{S}{\|}}{C}$—NH—, $X_5$—S—, $X_6$—O—, $X_7$—CH=CH—, $X_8$—S—S—, $X_9$—SO$_2$—, $X_{10}$—NH—, $X_{11}$—NH—CO—, $X_{12}$—$\underset{CH_3}{N}$—CO—, $X_{13}$ —C—,

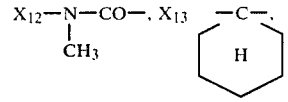

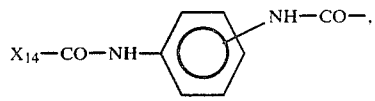

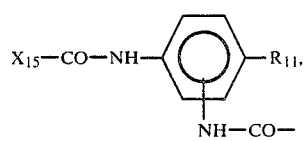

-continued $$X_{18}-SO_2-NH-\phantom{X}\!\!\bigcirc\!\!-NH-SO_2-,$$

$$X_{19}-\underset{R_{12}}{\overset{|}{N}}-CO-R_{14}-CO-\underset{R_{12}}{\overset{|}{N}}-,$$

$$X_{20}-\underset{R_{12}}{\overset{|}{N}}-CO-CH=CH-CO-\underset{R_{12}}{\overset{|}{N}}-, \quad X_{21}-\underset{R_{12}}{\overset{|}{N}}-CO-\underset{R_{12}}{\overset{|}{N}}-,$$

$$X_{22}-CO-NH-NH-CO-,$$
$$X_{23}-CH_2-CO-NH-NH-CO-CH_2-,$$
$$X_{24}-CH=CH-CO-NH-NH-CO-CH=CH-,$$

$$X_{25}-N\overset{CH_2-CH_2}{\underset{CH_2-CH_2}{\diagdown\diagup}}N-,$$

$$X_{26}-O-CO-N\overset{CH_2-CH_2}{\underset{CH_2-CH_2}{\diagdown\diagup}}N-CO-O-,$$

$$X_{27}-\underset{O}{\overset{N=N}{\overset{||\phantom{XX}||}{C\diagdown\phantom{X}C}}}-, \quad X_{28}-O-\underset{O}{\overset{||}{C}}-O-, \quad X_{29}-\underset{O}{\overset{||}{C}}-O-,$$

$$X_{30}-\underset{O}{\overset{||}{C}}-\underset{O}{\overset{||}{C}}-, \quad X_{31}-O-(CH_2)_q-O-,$$

$$X_{32}-\underset{R_{12}}{\overset{|}{N}}-\underset{\underset{\underset{R_{13}}{C}}{||}}{\overset{N}{\overset{\diagup\diagdown}{C}}}\overset{N}{\underset{N}{\overset{\diagdown\diagup}{C}}}-\underset{R_{12}}{\overset{|}{N}}-, \quad X_{33}-O-\underset{\underset{\underset{R_{13}}{C}}{||}}{\overset{N}{\overset{\diagup\diagdown}{C}}}\overset{N}{\underset{N}{\overset{\diagdown\diagup}{C}}}-O-,$$

$$X_{34}-CO-\underset{R_{12}}{\overset{|}{N}}-R_{14}-\underset{R_{12}}{\overset{|}{N}}-CO-,$$

$$X_{35}-CO-\underset{R_{12}}{\overset{|}{N}}-(CH_2)_q-O-(CH_2)_q-\underset{R_{12}}{\overset{|}{N}}-CO-,$$

$$X_{36}-CO-\underset{R_{12}}{\overset{|}{N}}-(CH_2)_q-\underset{R_{12}}{\overset{|}{N}}-(CH_2)_q-\underset{R_{12}}{\overset{|}{N}}-CO-,$$

$$X_{37}-CO-\underset{R_{12}}{\overset{|}{N}}-(CH_2)_q-O-(CH_2)_q-O-(CH_2)_q-\underset{R_{12}}{\overset{|}{N}}-CO-,$$

$$X_{38}-CH_2-CO-\underset{R_{12}}{\overset{|}{N}}-, \quad X_{39}-CH=CH-CO-\underset{R_{12}}{\overset{|}{N}}-,$$

$$X_{40}-N=N-, \quad X_{41}-CH_2-S-CH_2-, \quad X_{42}-SO-,$$
$$X_{43}-CH_2-SO-CH_2-, \quad X_{44}-CH_2-SO_2-CH_2-,$$
$$X_{45}-CH_2-NH-CO-NH-CH_2-,$$
$$X_{46}-CH_2-NH-CS-NH-CH_2-,$$

$$X_{47}-CO-N\overset{CH_2-CH_2}{\underset{CH_2-CH_2}{\diagdown\diagup}}N-C_2H_4NH-CO-,$$

$$X_{48}-CH_2-CH_2-CO-\underset{R_{12}}{\overset{|}{N}}-,$$

where $R_{11}$ is halogen, $C_{1-4}$alkyl or $C_{1-4}$alkoxy, each $R_{12}$ is independently hydrogen or $C_{1-4}$alkyl, preferably hydrogen or methyl, $R_{13}$ is halogen, $-NH-CH_2-CH_2-OH$ or $-N(CH_2-CH_2OH)_2$, and $R_{14}$ is straight or branched chain $C_{1-4}$alkylene, preferably straight chain $C_{2-4}$alkylene, and each q is independently 1, 2, 3 and 4, preferably 2, 3 or 4, with the provisos that (i) the azo bridges on ring B' are ortho to $A_1$ or $A_2$ or to both $A_1$ and $A_2$, (ii) when c is 2, d' is 1 and $R_t''$ is a group of formula $a\alpha$, X' is attached to $R_t''$ or to ring C', (iii) X' may not be attached to a B' ring bearing an $R_t''$ group, (iv) when a B' ring does not contain an $R_t''$ group, the $R_{100}$ on the adjacent ring C' must be hydrogen, (v) when X' is attached to a ring C', at least one of $R_2$, $R_3$ and $R_{100}$ on that ring is hydrogen, and (vi) when $A_1$ and $A_3$ form a metal-containing radical, the $A_3$-bearing phenylazo group is ortho to $A_1$.

Still further the invention provides sulpho-free azo compounds in metal-free, 1:1 metal complex or 1:2 metal complex form having at least 2 water-solubilizing basic groups per dyestuff unit, the compounds being of formula III $$\underset{R_{22}}{\overset{R_{20}}{\phantom{X}}}\!\!\!\!\!\!\!\underset{R_{23}}{\overset{A_4}{\phantom{X}}}\!\!\!\!\bigcirc\!\!\!\!-N=N-K_2, \quad (III)$$

in which $A_4$ is hydrogen, $-OH$, $-NH_2$, $C_{1-4}$ alkoxy or $-COOH$ or $A_4$ and a hydroxy or amino group on $K_2$ together form the group $-NH-Me-O-$, $-NH-Me-NH-$, $-O-Me-O-$, $-O-Me-NH-$, $-COO-Me-O-$ or $-COO-Me-NH-$, where Me is a metal capable of forming a 1:1 metal complex or a 1:2 metal complex or capable of forming both a 1:1 and a 1:2 metal complex, $K_2$ is a group of the formula $$\underset{HO}{\phantom{X}}\!\!\!\!\!\!\!\!\overset{R_{24a}}{\underset{\underset{R_{24}}{N}}{\phantom{X}\!\!\!\bigcirc\!\!\!\phantom{X}}}\!\!\!\!\!\!\overset{T}{\underset{O}{\phantom{X}}},$$

-continued

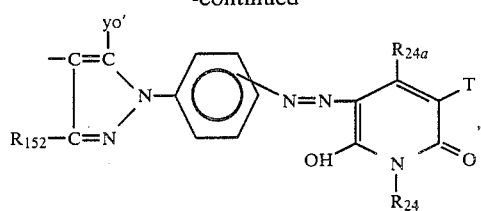

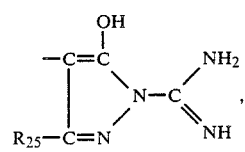

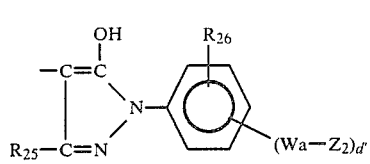

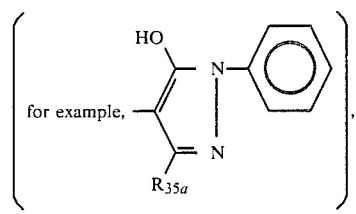

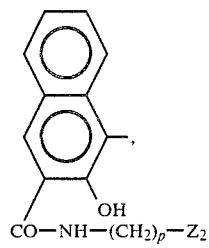

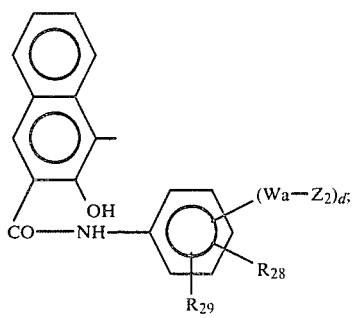

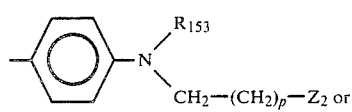

where $R_{152}$ is —CH$_3$ or —COOH, and yo' is —OH or —NH$_2$, in which $R_{20}$ is hydrogen or —NO$_2$,
$R_{21}$ is hydrogen, —NO$_2$, —NH—CO—(CH$_2$)$_s$—Z$_2$, —CH$_2$—Z$_2$, —SO$_2$—NH—(CH$_2$)$_s$—Z$_2$, —SO$_2$—NH$_2$, —CO—CH$_2$—Z$_2$, —CO—NH—(CH$_2$)$_s$—Z$_2$,

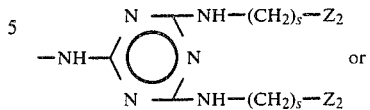

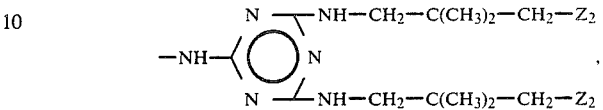

$R_{22}$ is hydrogen, —NO$_2$, —SO$_2$—NH$_2$, —SO$_2$—N(R$_{22a}$)$_2$, —SO$_2$—NH—(CH$_2$)$_s$—OH, —CH$_2$—Z$_2$, —SO$_2$—NH—(CH$_2$)$_s$—Z$_2$, —CO—NH—(CH$_2$)$_s$—Z$_2$, —NH—CO—(CH$_2$)$_s$—Z$_2$,

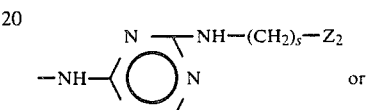

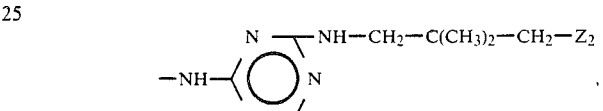

where
$R_{22a}$ is C$_{1-4}$alkyl,
$R_{23}$ is hydrogen or —CH$_3$,
T is

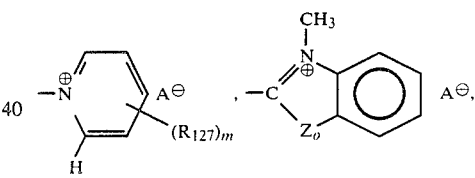

—CO—NH$_2$, —NH$_2$, —N(CH$_3$)$_2$, —$\overset{\oplus}{N}$(CH$_3$)$_3$ A$^\ominus$ or —CN, where Z$_0$ is —S—, —O—, or —N—R'$_{35}$, where
R'$_{35}$ is hydrogen, C$_{1-4}$alkyl or —CH$_2$—COO—R$_{35a}$, where R$_{35a}$ is C$_{1-4}$alkyl,
$R_{24}$ is hydrogen, C$_{1-4}$alkyl, —C$_2$H$_4$OH, —(CH$_2$)$_p$—Z$_2$, benzyl,

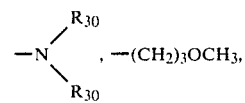

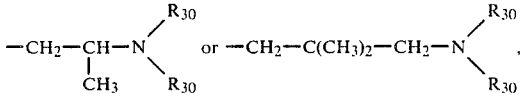

where
$R_{24a}$ is C$_{1-4}$alkyl, preferably —CH$_3$,
$R_{25}$ is C$_{1-4}$alkyl, —COO—R$_{25a}$ or —COOH, where $R_{25a}$ is C$_{1-4}$alkyl, s is 1, 2, 3, 4, 5 or 6,
$R_{28}$ is hydrogen, $C_{1-4}$alkyl, $(C_{1-4})$alkoxy or halogen,
$R_{29}$ is hydrogen, $C_{1-4}$alkyl, $C_{1-4}$alkoxy, halogen, —NH—$(CH_2)_s$—$Z_2$ or —NH—$C_2H_4OH$,
each
$R_{30}$ independently is hydrogen or $C_{1-4}$alkyl,
$R_{32}$ is hydrogen,

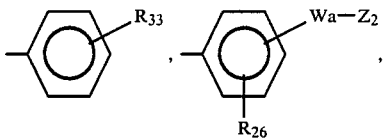

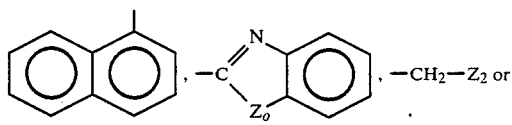

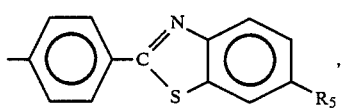

$R_{153}$ is $C_{1-4}$alkyl,
where
d', $Z_o$, Wa and $R_5$ are defined above, and
$R_{33}$ is hydrogen, halogen, $C_{1-4}$alkyl, $C_{1-4}$alkoxy, —$SO_2NH_2$ or —$SO_2N(CH_3)_2$;
with the provisos that
(i) $R_{20}$ and $R_{21}$ cannot both be —$NO_2$,
(ii) $R_{21}$ and $R_{22}$ cannot be the same group unless $R_{21}$ and $R_{22}$ are both hydrogen,
(iii) when $R_{21}$ and $R_{22}$ are both hydrogen, $R_{20}$ cannot be —$NO_2$,
(iv) at least one of $R_{20}$, $R_{21}$, $R_{22}$ and $R_{23}$ must be hydrogen, and
(v) when $K_2$ is a group of the formula

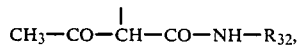

at least one of $R_{21}$ and $R_{22}$ must contain at least one $Z_2$ group.

Still further the invention provides sulpho group-free azo compounds in metal-free, 1:1 metal complex or 1:2 metal complex form having at least 2 water-solubilizing basic groups, the compounds being of formula IV

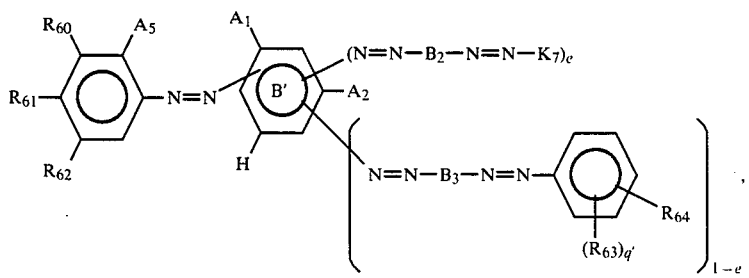

in which
$A_1$ is —OH or —$NH_2$, and
$A_5$ is —OH, $C_{1-4}$alkoxy or —COOH or
$A_1$ and $A_5$ together form the group —NH—Me—OOC—, —NH—Me—O—, —O—Me—O— or —O—Me—OOC—, where Me is a metal capable of forming a 1:1 metal complex, a 1:2 metal complex or both a 1:1 metal complex and a 1:2 metal complex, both,
e's are 0 or 1,
$R_{60}$ is hydrogen or —$NO_2$,
$R_{61}$ and $R_{62}$, independently, are hydrogen, —$NO_2$, —$CH_2$—$Z_2$, —$SO_2$—$NH_2$, —$SO_2$—NH—$(CH_2)_p$—$Z_2$, —$SO_2$—NH—$C_2H_4OH$, —$SO_2$—$N(R_{62}')_2$, —CO—NH—$(CH_2)_p$—$Z_2$, —NH—CO—$(CH_2)_p$—$Z_2$

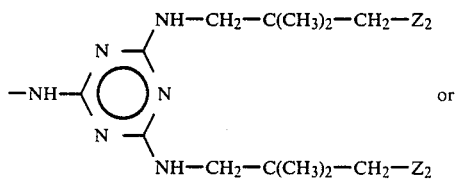

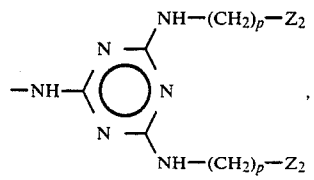

wherein each
$R_{62}'$ is independently $C_{1-4}$alkyl,
$R_{63}$ is —$SO_2$—NH—$(CH_2)_p$—$Z_2$, —CO—NH—$(CH_2)_p$—$Z_2$, —NH—CO—$(CH_2)_p$—$Z_2$,

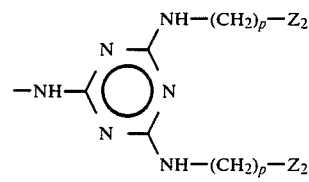

or —$CH_2$—$Z_2$,
$R_{64}$ is hydrogen or $C_{1-4}$alkoxy,
each
$R_{65}$ independently is hydrogen, $C_{1-4}$alkyl or $C_{1-4}$alkoxy,
p is 1, 2 or 3,
q' is 1 or 2, with the proviso that when an $R_{63}$ is —CO—NH—$(CH_2)_p$—$Z_2$, q' is 2,
$K_7$ is a group of the formula

[IV]

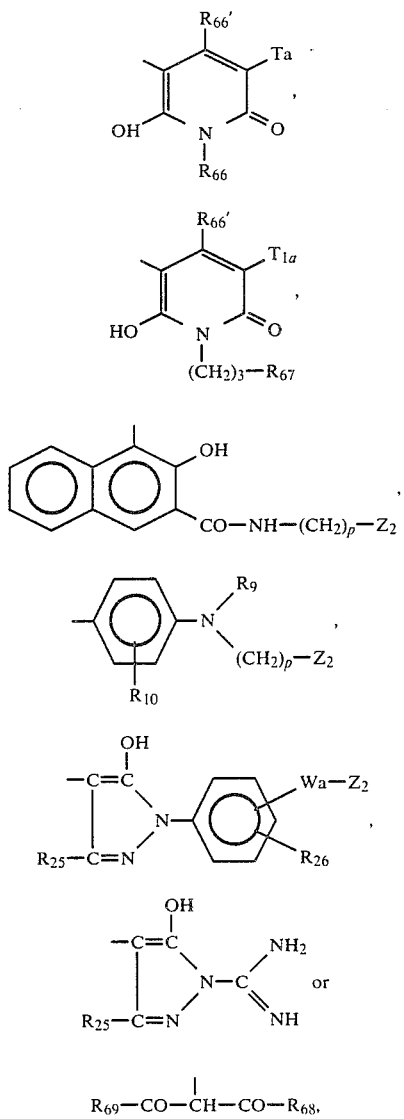

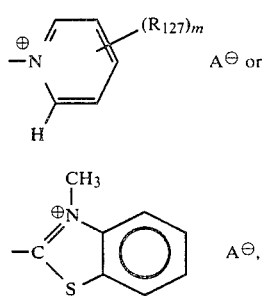

where $R_9$, $R_{10}$, $R_{25}$ and $Z_2$ are as defined above,
$R_{66}$ is hydrogen, $C_{1-4}$alkyl, $-C_2H_4OH$ or $-(CH_2)_p-Z_2$,
$R_{66}'$ is $C_{1-4}$alkyl,
$T_a$ is a group of the formula

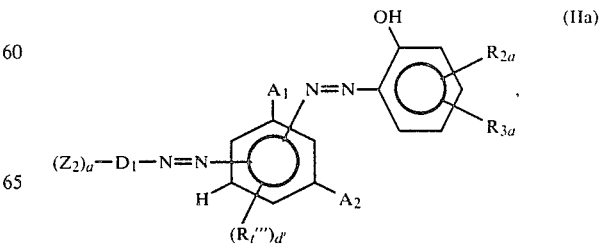

where d, $R_{127}$ and $A^\ominus$ are defined above,
$T_{1a}$ is $-CN$ or $-CO-NH_2$,
$R_{67}$ is $-N(CH_3)_2$ or $-N^\oplus(CH_3)_3 \ A^\ominus$,
$R_{68}$ is $-CH_2)_p-Z_2$, $-NH-(CH_2)_p-Z_2$ or

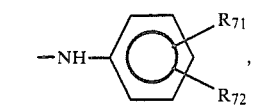

where
$R_{71}$ is hydrogen, $-OH$, $C_{1-4}$alkoxy, $-N-H-CO-(CH_2)_p-Z_2$, $-CO-NH-(CH_2)_p-Z_2$, $-SO_2-NH-(CH_2)_p-Z_2$, $-(CH_2)_p-Z_2$ or

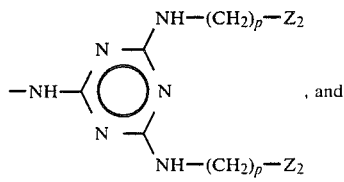

$R_{72}$ is hydrogen or $-(CH_2)_p-Z_2$,
$R_{69}$ is $C_{1-4}$alkyl or $-(CH_2)_p-Z_2$, where p and $Z_2$ are as defined above, with the proviso that at least one of $R_{68}$ and $R_{69}$ contains at least one $Z_2$ group,

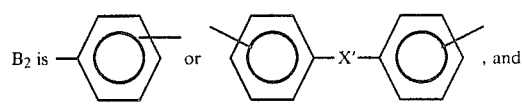

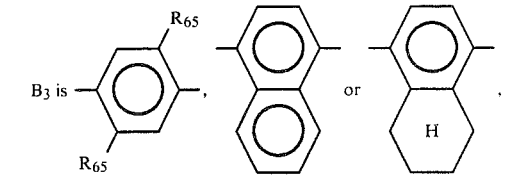

where each
$R_{65}$ independently is hydrogen, $C_{1-4}$alkyl or $C_{1-4}$alkoxy, and X' is as defined above,
with the provisos
(i) that $R_{60}$ and $R_{61}$ cannot both be $-NO_2$,
(ii) that when $R_{61}$ and $R_{62}$ are both hydrogen, $R_{60}$ cannot be $-NO_2$,
(iii) that $R_{61}$ and $R_{62}$ are not the same group unless both are hydrogen,
(iv) that each azo bridge on ring B' is ortho to $A_1$ or $A_2$ or to both $A_1$ and $A_2$, and
(v) that when $A_1$ and $A_5$ together form a metal-containing radical, the $A_5$-bearing phenylazo group is ortho to $A_1$.

A group of preferred metal-free azo compounds of formula II' are those of formula IIa (IIa)

in which $R_t'''$ is 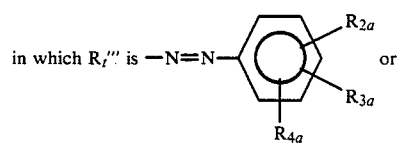 or

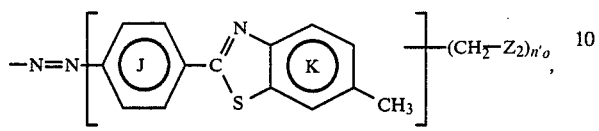

where each $R_{2a}$ independently is hydrogen, $-NO_2$, $-SO_2NH_2$, $-SO_2-NH-CH_3$, $-SO_2-N(CH_3)_2$,

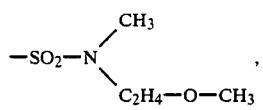

$-SO_2NH-C_2H_4OH$, $-SO_2-N(C_2H_4OH)_2$, $-SO_2-N[C_2H_4-N(CH_3)_2]_2$ or $-SO_2-NH-(CH_2)_3-Z_2$, each $R_{3a}$ independently is hydrogen, $-NO_2$, $-SO_2NH_2$, $-SO_2-NH-CH_3$, $-SO_2-N(CH_3)_2$,

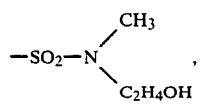

$-SO_2NH-C_2H_4OH$, $-N(C_2H_4OH)_2$, $-NH-CO-(CH_2)_p-Z_2$, $-CO-NH-(CH_2)_p-Z_2$, $-CH_3$, $-OCH_3$, $-SO_2-NH-(CH_2)_p-Z_2$,

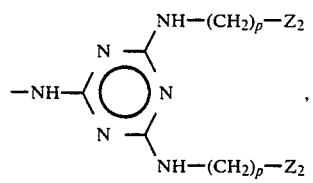

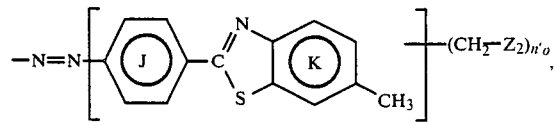

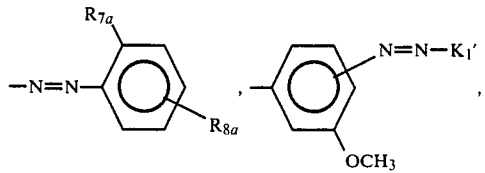

$-N=K_1'$ or $-CH_2-Z_2$, in which $R_{7a}$ is hydrogen, $-OH$, $-CH_3$, $-OCH_3$, $-NHCOCH_3$ or $-NHCONH_2$, $R_{8a}$ is hydrogen, $-NHCO-(CH_2)_p-Z_2$ or

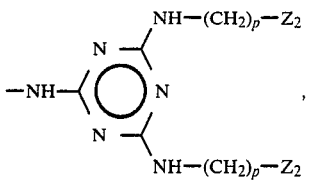

$n_o'$ is 1, 2 or an average number between 1.0 and 1.7, inclusive, $K_1'$ is

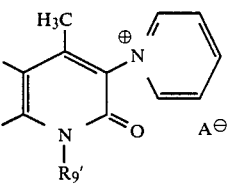

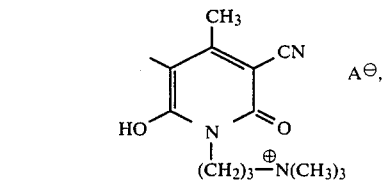

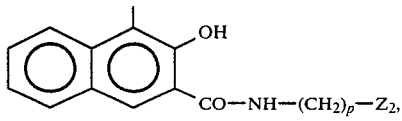

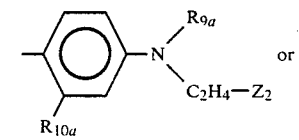

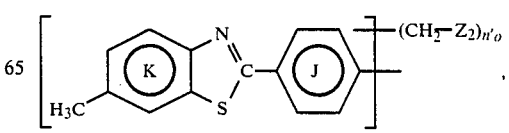

in which $R_{9a}$ is $-CH_3$ or $-C_2H_5$, $R_{10a}$ is hydrogen, $-CH_3$, $-OCH_3$, $-NH-CO-CH_3$ or $-NH-CO-NH_2$ and $R_9'$ is hydrogen, $-CH_3$, $-C_2H_5$, n$-C_3H_7$, n$-C_4H_9$, i$-C_3H_7$, i$-C_4H_9$, $-C_2H_4OH$ or $-(CH_2)_p-Z_2$;

$R_{4a}$ is hydrogen, $-NO_2$, $-CH_3$ or $-OCH_3$, $(Z_2)_a-D_1-$ is

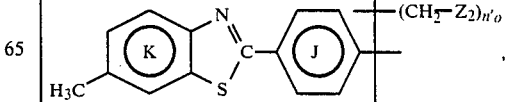

-continued

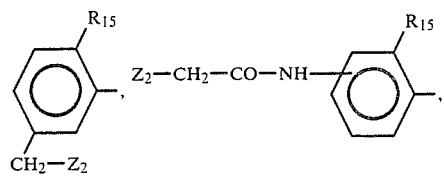

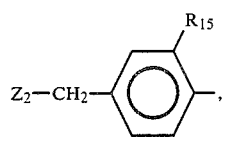

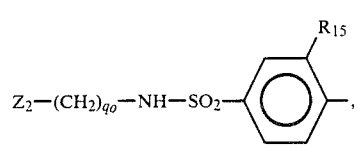

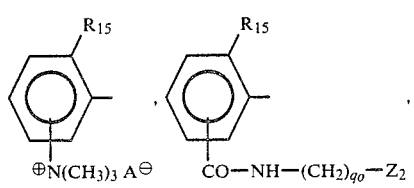

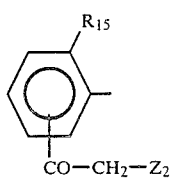

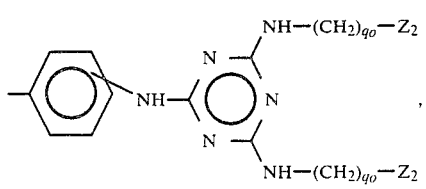

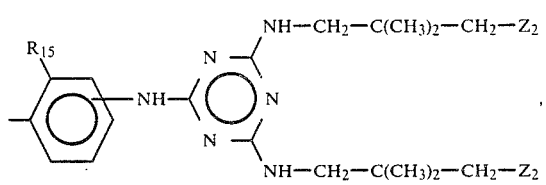

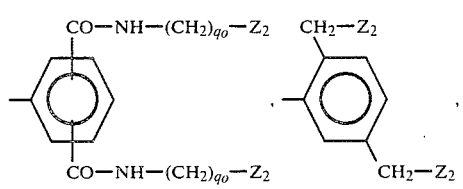

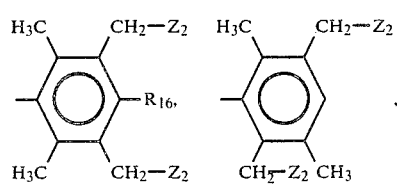

-continued

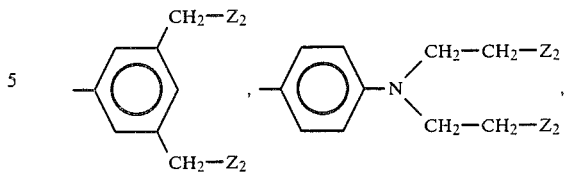

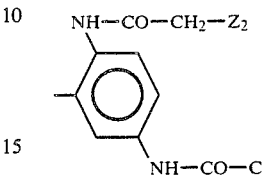

wherein
$R_{15}$ is hydrogen, —OH, —OCH$_3$, —CH$_3$ or Cl,
$R_{16}$ is hydrogen or —CH$_3$, and
each
$q_o$ is independently 2 to 5, preferably 2 or 3,
and all the other symbols are as defined above, with the proviso that the compound contains on average at least 1.3, preferably at least 2, basic water-solubilizing groups.

A further group of preferred metal-free azo compounds of formula II' are those of formula IIb

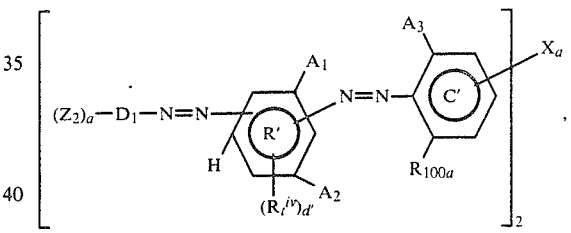 (IIb)

in which $R_i^{iv}$ is

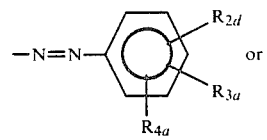

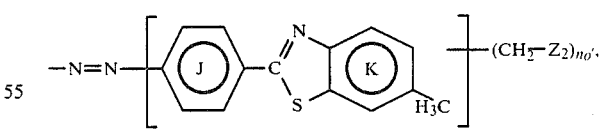

where
$R_{2d}$ is hydrogen, —OH, —CH$_3$ or —OCH$_3$, and
$R_{100a}$ is hydrogen, chloro, —CH$_3$ or —OCH$_3$, the group $X_a$ is meta or para to the azo bridge of ring C', and each azo bridge on ring B' (three when d' is 1) is ortho to $A_1$ or $A_2$ or to both $A_1$ and $A_2$,
$X_a$ is $X_1$, $X_5$, $X_6$, $X_7$, $X_{10}$, $X_{11}$, $X_{12}$, $X_{16}$, $X_{17}$, $X_{22}$, $X_{25}$, $X_{26}$, $X_{27}$, $X_{30}$, $X_{31}$ (wherein q is preferably 2), or one of the following groups:
$X_2'$—CH$_2$—, $X_2''$—(CH$_2$)$_2$—, $X_2'''$—(CH$_2$)$_3$—,

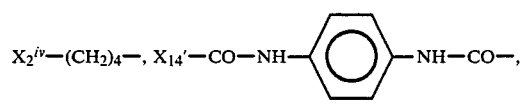

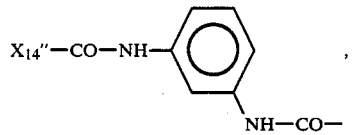

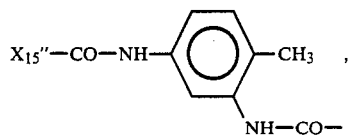

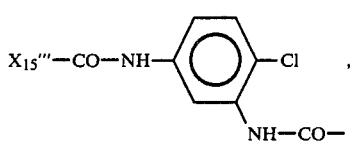

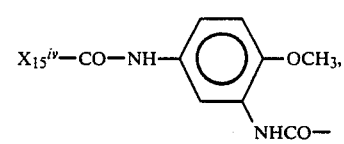

$X_{19}'$—NH—CO—CH$_2$—CH$_2$—CO—NH—,
$X_{19}''$—NH—CO—(CH$_2$)$_4$—CO—NH—,

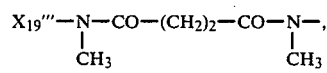

$X_{20}'$—NH—CO—CH=CH—CO—NH—,

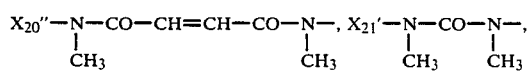

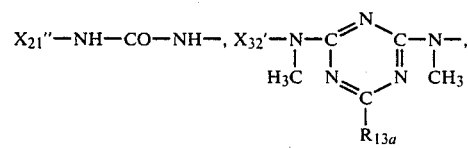

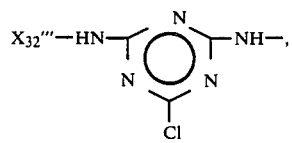

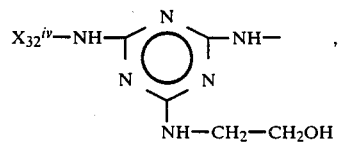

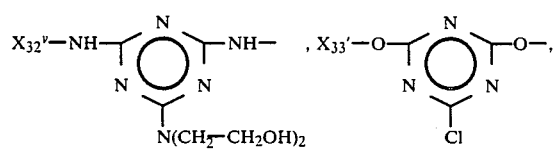

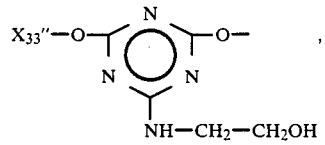

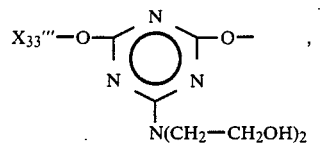

$X_{34}'$—CO—NH—(CH$_2$)$_2$—NH—CO—,
$X_{34}''$—CO—NH—(CH$_2$)$_3$—NH—CO—,
$X_{34}'''$—CO—NH—(CH$_2$)$_4$—NH—CO—,

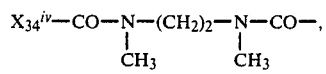

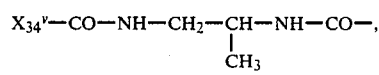

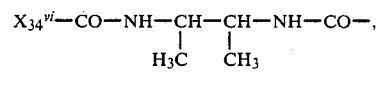

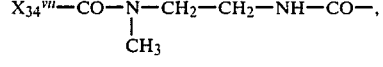

$X_{35}'$—CO—NH—(CH$_2$)$_2$—O—(CH$_2$)$_2$—NH—CO—,
$X_{36}'$—CO—NH—(CH$_2$)$_2$—NH—(CH$_2$)$_2$—NH—CO—,

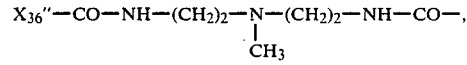

$X_{37}'$—CO—NH—(CH$_2$)$_2$—O—(CH$_2$)$_2$—O—(CH$_2$)$_2$—NH—CO—,

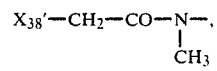

$X_{39}'$—CH=CH—CO—NH—,

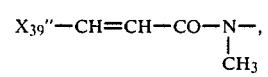

$X_{48}'$—CH$_2$—CH$_2$—CO—NH—,

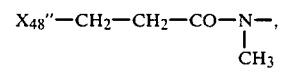

where
$R_{13a}$ is Cl, —NH—CH$_2$—CH$_2$—OH or —N(CH$_2$—CH$_2$—OH)$_2$, and
all the other symbols have been defined above,
with the proviso that the compound contains on average at least 1.3, preferably at least 2, basic water-solubilizing groups.

Preferred compounds of formula IIb are of formula IIc

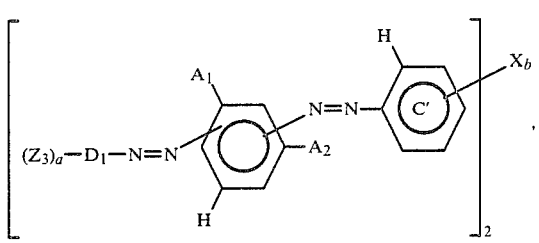

(IIc)

in which
$X_b$ is $X_1$, $X_{11}$, $X_{12}$, $X_{17}$, $X_{27}$, $X_{21}''$, $X_2''$, $X_{14}'$, $X_{19}'$, $X_{19}''$, $X_{19}'''$, $X_{20}'$, $X_{20}''$, $X_{32}'$, $X_{34}'$, $X_{34}^{iv}$, $X_{34}^v$ or $X_{34}^{vi}$, $Z_3$ is $-N(CH_3)_2$, $-\overset{\oplus}{N}(CH_3)_3$ $A^\ominus$, $-\underset{\underset{C_2H_4OH}{|}}{\overset{\oplus}{N}}(CH_3)_2$ $A^\ominus$,

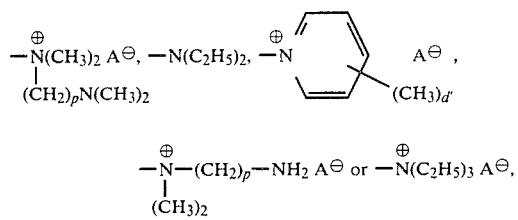

$-\underset{\underset{(CH_3)_2}{|}}{\overset{\oplus}{N}}-(CH_2)_p-NH_2$ $A^\ominus$ or $-\overset{\oplus}{N}(C_2H_5)_3$ $A^\ominus$, where $(Z_3)_a-D_1-$ has the significances of $(Z_2)_a-C_1-$, but wherein $Z_2$ is replaced by $Z_3$, with the provisos that (i) in ring C' the group $X_b$ is meta or para to the azo bridge and (ii) the compound contains on average, at least 1.3, preferably at least 2, basic water-solubilizing groups.

Preferred compounds of formula IIc are symmetric and contain at least 4 basic water-solubilizing groups, more preferably 4–6 such groups.

Preferred azo compounds of formula II' in 1:1 metal complex form wherein c is 1 are of formula IId

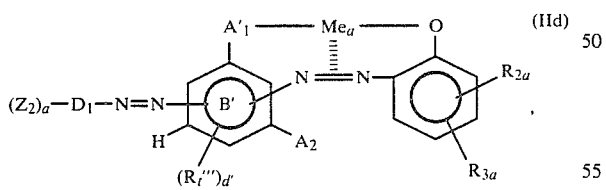

in which $(Z_2)_a-D_1-$, $R_t'''$, $A_2$, $R_{2a}$ and $R_{3a}$ are as defined above, $A_1'$ is $-NH-$ or $-O-$, in ring B' each azo bridge is ortho to $A_1'$ or $A_2$ or both $A_1'$ and $A_2$, and $Me_a$ is copper, cobalt, iron or chromium, with the provisos that (i) the complex of formula IId contains an average of at least 1.3, preferably at least 2, basic water-solubilizing groups, and (ii) the $R_{2a}$-bearing phenylazo group is ortho to $A_1'$.

Preferred complexes of formula IId are of formula IIe

(IIe)

in which $R_t^v$ is hydrogen,

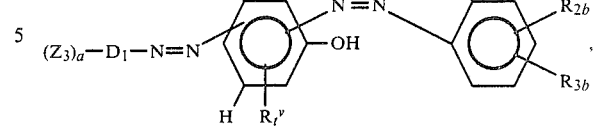

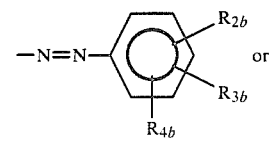

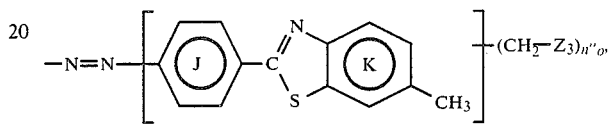

$Me_c$ is copper, cobalt or chromium, preferably copper,
$R_{2b}$ is hydrogen, $-NO_2$ or $-SO_2-NH_2$,
$R_{3b}$ is hydrogen, $-NO_2$, $-CH_3$, $-OCH_3$, $-SO_2NH_2$, $-NH-CO-(CH_2)_p-Z_3$, $-CH_2-Z_3$, $-SO_2NH(CH_2)_pZ_3$,

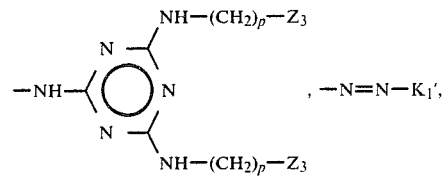

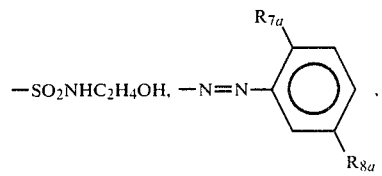

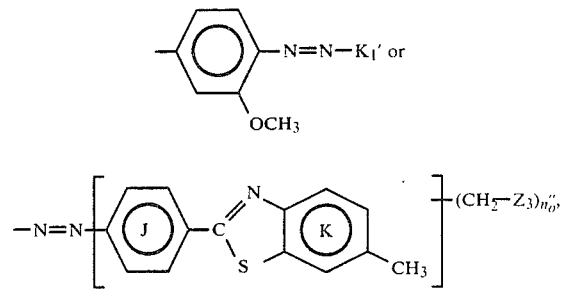

$n_o''$ is 1, 2 or an average number between 1.3 and 1.5, inclusive,
$R_{4b}$ is hydrogen or $-NO_2$, and
all the other symbols are as defined above, with the provisos that (i) the complex of formula IIe contains an average of at least 1.3, preferably at least 2, basic water-solubilizing groups, and (ii) the $R_{2b}$-bearing phenylazo group is ortho to the complexed $-O-$ radical.

Alternatively preferred compounds of formula II' in 1:1 metal complex form wherein c is 2 are of formula IIf

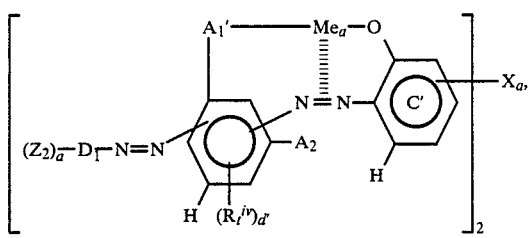

(IIf)

in which the symbols are as defined above and the group $X_a$ is attached to each ring C' in a meta or para position with respect to the azo bridge, with the provisos that (i) the complex of formula IIf contains an average of at least 1.3, preferably at least 2, basic water-solubilizing groups, and (ii) each $X_a$-bearing phenylazo group is ortho to $A_1'$.

Preferred complexes of formula IIf are of formula IIg

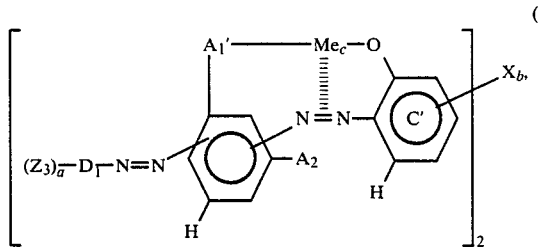

(IIg)

in which the symbols are as above defined, with the provisos that (i) $X_b$ is meta or para to the azo bridge, (ii) the complex of formula IIg contains an average of at least 1.3, preferably at least 2, basic water-solubilizing groups, and (iii) each $X_b$-bearing phenylazo group is ortho to $A_1'$.

Preferred complexes of formula IIg are symmetric and contain at least 4 basic water-solubilizing groups, more preferably 4–6 such groups.

A further group of preferred compounds of formula II' in 1:1 metal complex form are of formula IIh

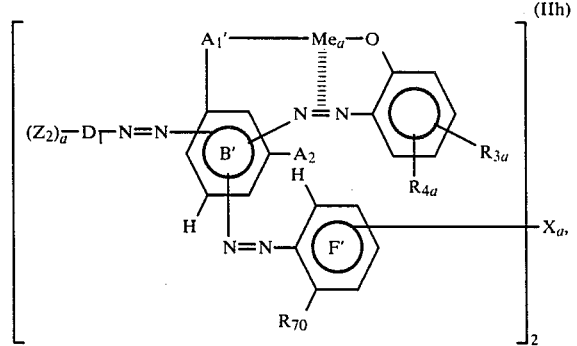

(IIh)

in which $(Z_2)_a$—$D_1$—, $A_1'$, $R_{3a}$, $R_{4a}$, $Me_a$ and $X_a$ are as defined above, $R_{70}$ is hydrogen, methyl or methoxy, the group $X_a$ is attached to a meta or para position of ring F' with the provisos that (i) each —N=N— radical on a ring B' is ortho to $A_1'$ or $A_2$ or to both $A_1'$ and $A_2$, (ii) the complex of formula IIh contains an average of at least 1.3, preferably at least 2, basic water-solubilizing groups, and (iii) each $R_{3a}$-bearing phenylazo group is ortho to $A_1'$. More preferred complexes of formula IIh are of formula IIi

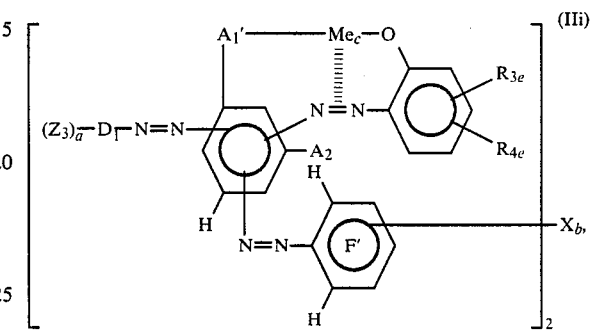

(IIi)

in which $R_{3e}$ is hydrogen, —CH$_3$, —NO$_2$, —SO$_2$—NH$_2$, —CH$_2$—Z$_3$,

—NH—CO—(CH$_2$)$_p$—Z$_3$, —OCH$_3$,

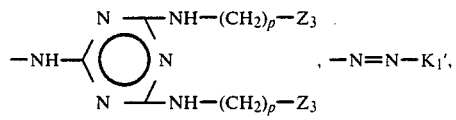

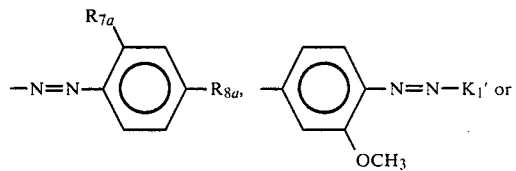

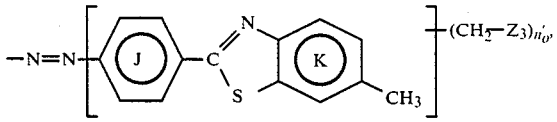

$R_{4e}$ is hydrogen or —NO$_2$, each of the other symbols is as defined above, and $X_b$ is in a meta or para position of ring F', with the provisos that (i) each metal complex of formula IIi contains an average of at least 1.3, preferably at least 2, basic water-solubilizing groups, and (ii) each $R_{3e}$-bearing phenylazo group is ortho to $A_1'$.

Preferred complexes of formula IIi are symmetric, i.e., both "halves" of the complex joined to $X_b$ are identical, and contain at least 4 basic water-solubilizing groups, more preferably 4–6 such groups.

Preferred 1:2 metal complex azo compounds of formula II' are those wherein c is 1, especially those of formulae IIj to IIm:

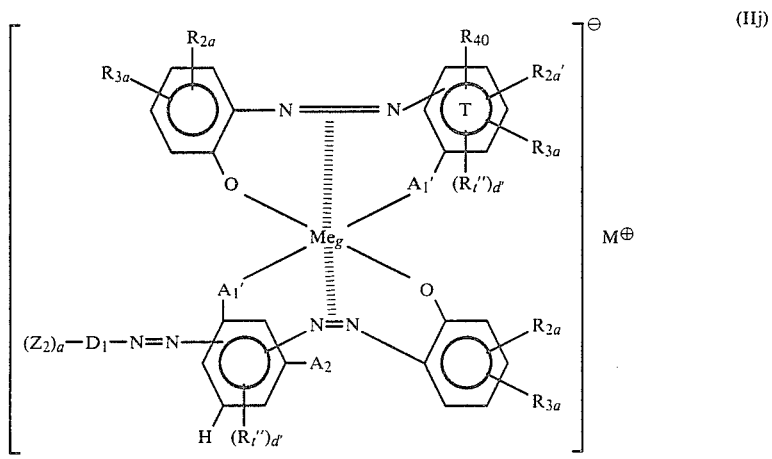
(IIj)
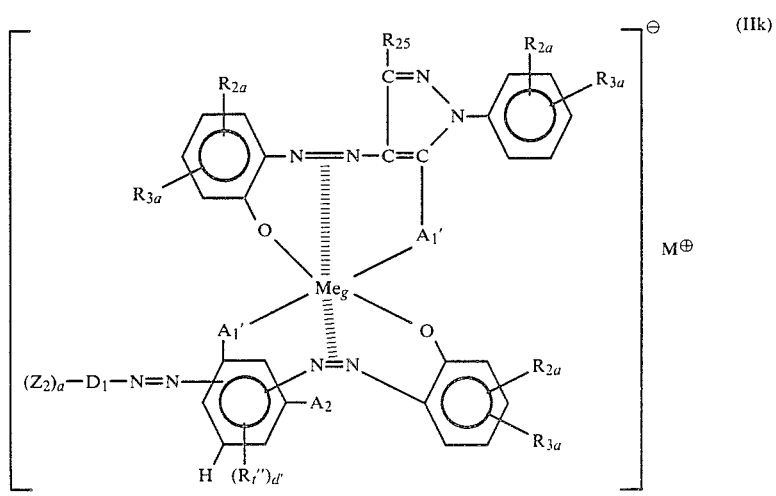
(IIk)
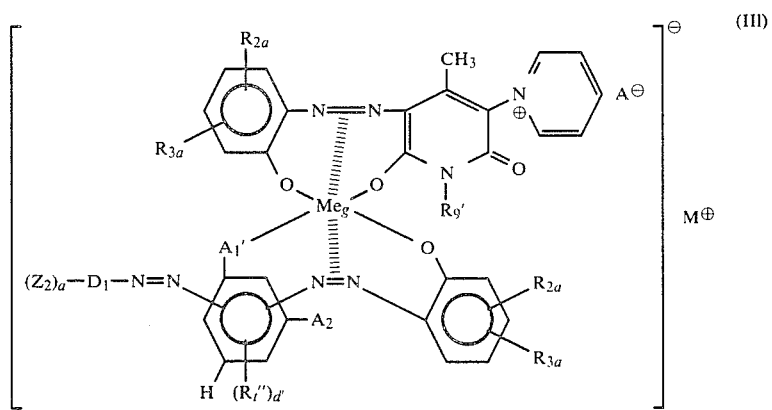
(III)

-continued

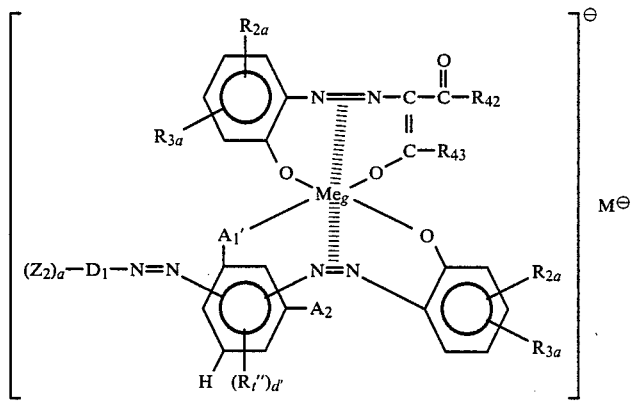
(IIm)

in which
R$_{40}$ is hydrogen or (Z$_2$)$_a$—D$_1$—N=N—,
Me$_g$ is cobalt, iron or chromium, preferably iron,
R$_{42}$ is —(CH$_2$)$_p$—Z$_2$, —NH—(CH$_2$)$_p$—Z$_2$ or

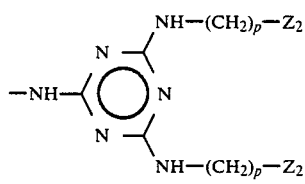

R$_{43}$ is —CH$_3$, —C$_2$H$_5$ or —(CH$_2$)$_p$—Z$_2$,
R$_{44}$ is hydrogen, —OH, C$_{1-4}$ alkoxy, —NH—CO—(CH$_2$)$_p$—Z$_2$, —CO—NH—(CH$_2$)$_p$—Z$_2$, —SO$_2$—NH—(CH$_2$)$_p$—Z$_2$,

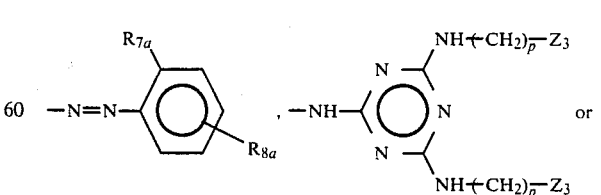

or —(CH$_2$)$_p$—Z$_2$,
R$_{45}$ is hydrogen or —(CH$_2$)$_p$—Z$_2$,
R$_{2a}'$ has a significance of R$_{2a}$ or is —OH or —NH$_2$, and the other symbols are as defined above, with the provisos that (i) each metal-free azo compound of each 1:2 metal complex contains an average of at least 1.3, preferably at least 2, basic water-solubilizing groups, (ii) each —N=N— radical on ring T is ortho or para to an —OH or —NH$_2$ group or to A$_1'$ and meta to every other —N=N— radical on said ring, (iii) the maximum number of —N=N— radicals on ring T is 3, and (iv) each R$_{2a}$-bearing phenylazo group attached to an A$_1'$-bearing ring is ortho to A$_1'$.

Preferred complexes of formula IIj are symmetric and are of formula IIn

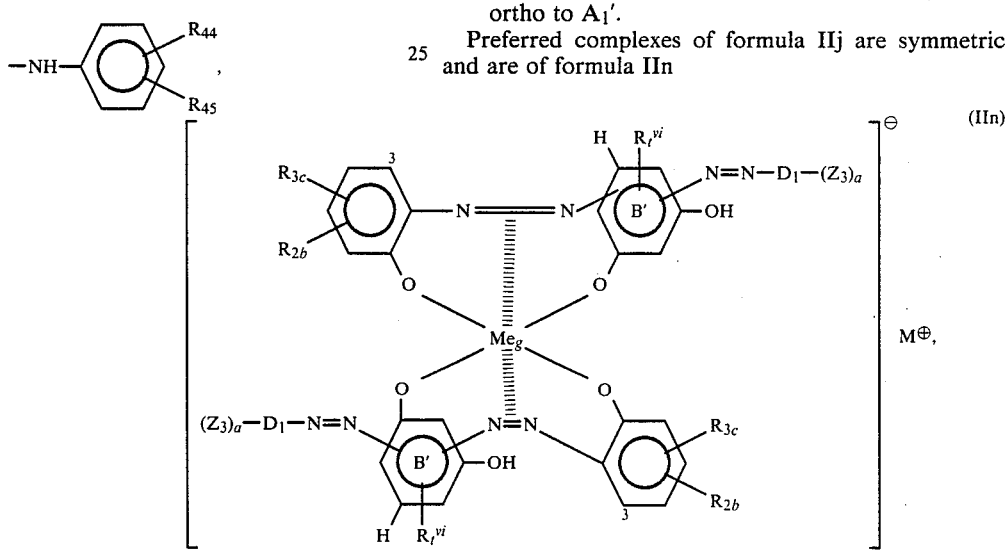
(IIn)

in which
R$_{3c}$ is hydrogen, —NO$_2$, —CH$_3$, —OCH$_3$, —SO$_2$—NH$_2$, —SO$_2$NH(CH$_2$)$_3$N(CH$_3$)$_2$, —SO$_2$NHC$_2$H$_4$OH, —NH—CO—(CH$_2$)$_p$—Z$_3$, —CH$_2$—Z$_3$, —N=N—K$_1'$, —SO$_2$NH(CH$_2$)$_2$N(CH$_3$)$_2$,
R$_t^{vi}$ is hydrogen and,
where the group (Z$_3$)$_a$—D$_1$—N=N— has the significance

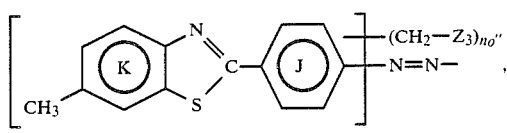

$R_1^{vi}$ may also be

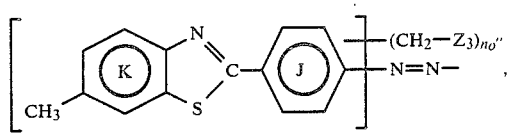

and the other symbols are as defined above, with the provisos that (i) each —N=N— radical on each ring B′ is ortho to the —O— radical and/or the —OH group, (ii) each metal-free azo compound of the 1:2 metal complex contains an average of at least 1.3, preferably at least 2, basic water-solubilizing groups, and (iii) each $R_{2b}$-bearing phenylazo group is ortho to the complexed —O— radical.

Preferred complexes of formula IIn are those wherein each $R_{3c}$, when it is an azo group, is in a position other than the 3-position and containing 2-4 basic water-solubilizing groups on each "half" (i.e., on each metal-free azo compound).

Preferred azo compounds of formula III in metal-free form have formula IIIa

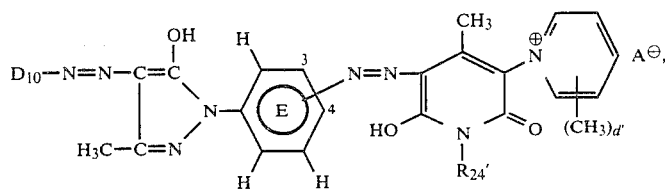

in which $R_{24}'$ is hydrogen, —N(CH$_3$)$_2$, —CH$_3$, —C$_2$H$_5$, n—C$_3$H$_7$, n—C$_4$H$_9$, i—C$_3$H$_7$, i—C$_4$H$_9$, benzyl, —C$_2$H$_4$OH, —(CH$_2$)$_{m'}$—Z$_2$, —CH$_2$—CH(CH$_3$)—N(CH$_3$)$_2$ or

—CH$_2$—C(CH$_3$)$_2$—CH$_2$—N(CH$_3$)$_2$, m′ is 2 or 3, $D_{10}$ is

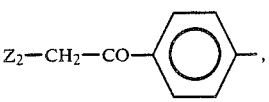

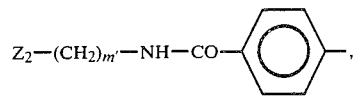

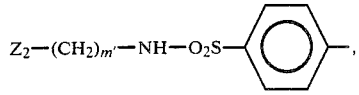

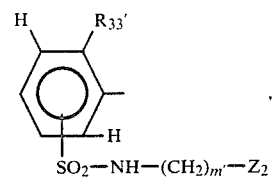

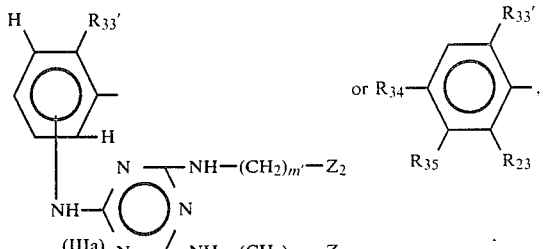

$R_{33}'$ is —OH, —OCH$_3$, —OC$_2$H$_5$ or —COOH, $R_{34}$ is hydrogen, —NO$_2$, —SO$_2$—NH$_2$ or —CH$_2$—Z$_2$, $R_{35}$ is hydrogen, —NO$_2$, —SO$_2$NH—(CH$_2$)$_2$—OH, —SO$_2$—NH$_2$, —SO$_2$—NH(CH$_2$)$_3$N(CH$_3$)$_2$ or

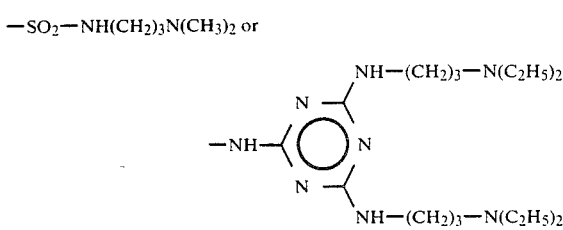

and the other symbols are above defined with the provisos (i) that when $R_{35}$ is 2,4-(bis-(3′-diethylamino)-propylamino)-1,3,5-triazin-6-ylamino or —SO$_2$—NH—(CH$_2$)$_3$—N(CH$_3$)$_2$, at least one of $R_{23}$ and $R_{34}$ is other than hydrogen, (ii) that the azo bridge on ring E is in the 3- or 4-position,
(iii) that $R_{34}$ and $R_{35}$ are different or both are hydrogen,
(iv) that the compound of formula IIIa contains at least two water-solubilising basic groups.

Preferred azo compounds of formula IIIa are of formula IIIb

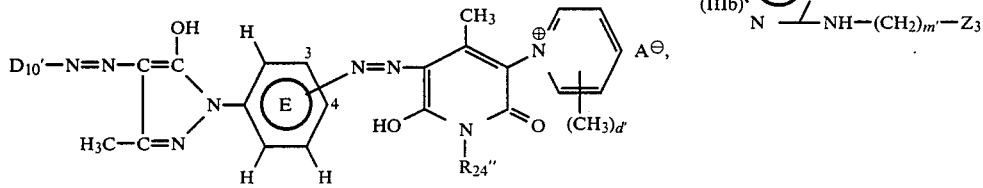

in which
$R_{24}''$ is hydrogen, $-CH_3$, $-C_2H_5$, $-C_2H_4OH$ or $-(CH_2)_{m'}-Z_3$,
$D_{10}'$ is

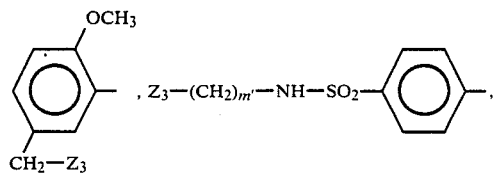

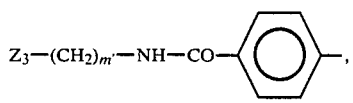

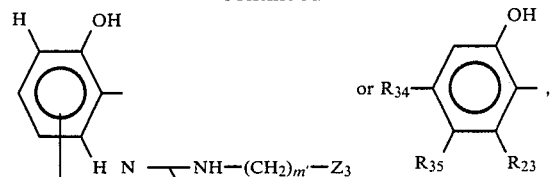

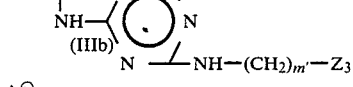

and all the other symbols are above defined, with the provisos that (i) the azo radical on ring E is in the 3- or 4-position, (ii) $R_{34}$ and $R_{35}$ are different or both are hydrogen, (iii) when $R_{35}$ is 2,4-(bis-(3'-diethylamino)-propylamino)-1,3,5-triazin-6-ylamino or $-SO_2-NH-(CH_2)_3-N(CH_3)_2$, at least one of $R_{23}$ and $R_{34}$ is other than hydrogen, and (iv) the compound of formula IIIb contains at least two basic water-solubilizing groups.

Most preferred azo compounds of formula III are of formula IIIc

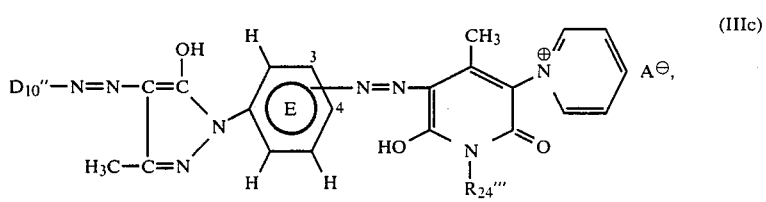

in which
$R_{24}'''$ is hydrogen, $-C_2H_4OH$, $-(CH_2)_3-N(CH_3)_2$, $-(CH_2)_3-N(C_2H_5)_2$ or $-(CH_2)_3-^{\oplus}N(CH_3)_3 \ A^{\ominus}$, $D_{10}''$ is

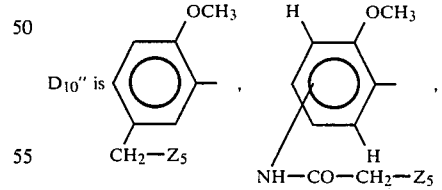

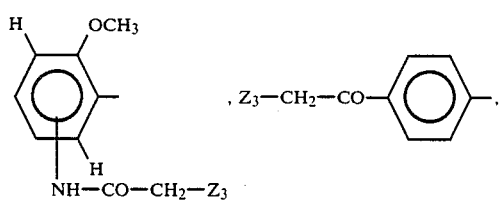

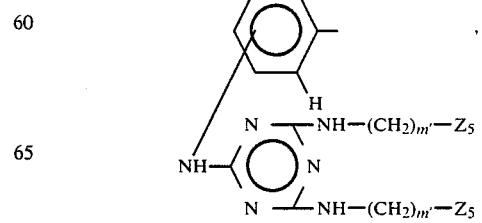

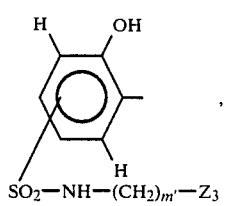

-continued

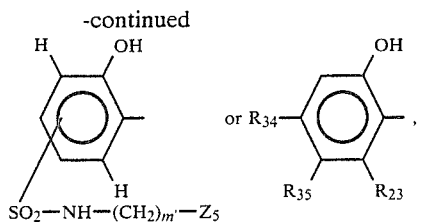

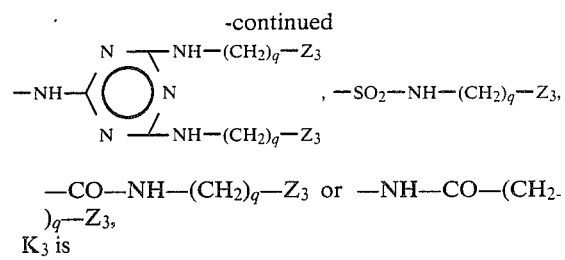

$Z_5$ is —N(CH$_3$)$_2$, —N(C$_2$H$_5$)$_2$, —⊕N(CH$_3$)$_3$ A⊖

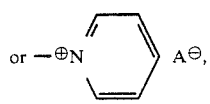

—CO—NH—(CH$_2$)$_q$—Z$_3$ or —NH—CO—(CH$_2$)$_q$—Z$_3$,

K$_3$ is

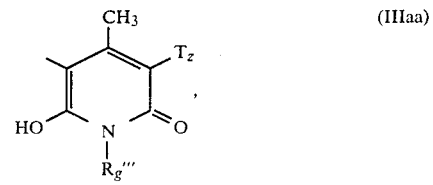 (IIIaa)

and where all the other symbols are above defined, with the provisos that (i) the azo radical on ring E is in the 3- or 4-position, (ii) R$_{34}$ and R$_{35}$ are different or both are hydrogen, (iii) when R$_{35}$ is 2,4-(bis-(3'-dimethylamino)-propylamino-1,3,5-triazin-6-ylamino or —SO$_2$—N-H—(CH$_2$)$_3$—N(CH$_3$)$_2$, at least one of R$_{23}$ and R$_{34}$ is other than hydrogen, and (iv) the compound of formula IIIc contains at least two basic water-solubilizing groups.

Alternatively preferred compounds of formula III in metal-free form are of formula IIId

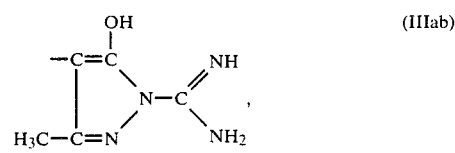 (IIIab)

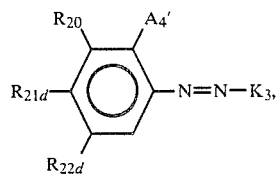 (IIId)

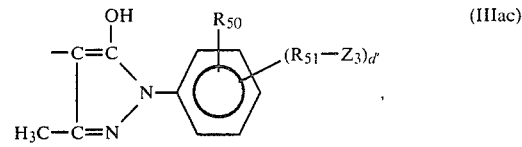 (IIIac)

in which
 A$_4'$ is hydrogen, —OH, —OCH$_3$ or —COOH,
 R$_{20}$ is hydrogen or —NO$_2$,
 R$_{21d}$ is hydrogen, —NO$_2$, —NH—CO—(CH$_2$)$_q$—Z$_3$, —CH$_2$—Z$_3$, —SO$_2$—NH$_2$, —SO$_2$—NH—(CH$_2$)$_q$—Z$_3$,

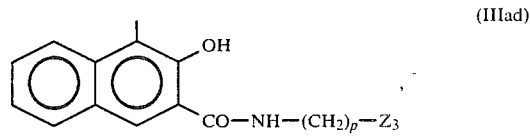 (IIIad)

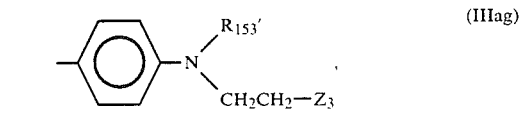 (IIIag)

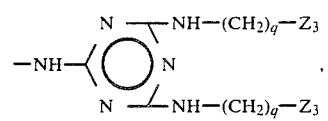

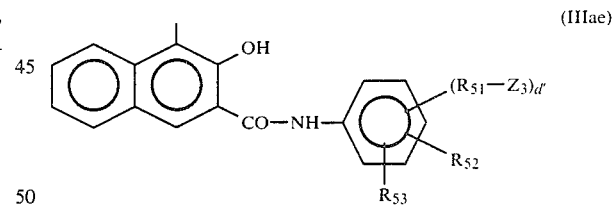 (IIIae)

—CO—NH—(CH$_2$)$_q$—Z$_3$ or

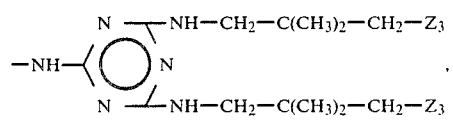

or

R$_{22d}$ is hydrogen, —CH$_2$—Z$_3$, —SO$_2$—N(CH$_3$)$_2$, —NO$_2$, —SO$_2$—NH—(CH$_2$)$_q$—OH, $$CH_3-CO-\overset{|}{CH}-CO-NH-R_{54},$$ (IIIaf)

where
T$_z$ is

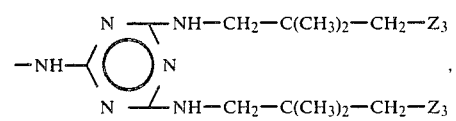

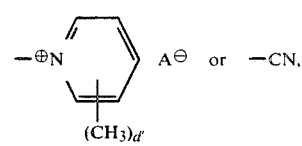

R$_g'''$ is hydrogen, —CH$_3$, —C$_2$H$_5$, i—C$_3$H$_7$, i—C$_4$H$_9$, n—C$_3$H$_7$, n—C$_4$H$_9$, —C$_2$H$_4$OH, —(CH$_2$)$_p$—Z$_3$, $R_{50}$ is hydrogen, —Cl, —Br, —$CH_3$ or —$OCH_3$,
$R_{51}$ is —$(CH_2)_q$—, —NH—CO—$(C^*H_2)_q$—, —CO—NH—$(C^*H_2)_q$— or —$SO_2$—NH—$(C^*H_2)_q$—,
$R_{52}$ is hydrogen, —Cl, —Br, —$CH_3$ or —$OCH_3$,
$R_{53}$ is hydrogen, —NH—$(CH_2)_q$—$Z_3$, —NH—$C_2H_4OH$, —Cl, —Br, —$CH_3$ or —$OCH_3$,
$R_{54}$ is hydrogen, —$CH_2$—$N^\oplus(CH_3)_3$ $A^\ominus$,

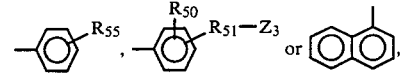

$R_{55}$ is hydrogen, —Cl, —Br, —$CH_3$, —$OCH_3$, —$SO_2NH_2$ or —$SO_2$—$N(CH_3)_2$, and
$R_{153}'$ is n—$C_{1-3}$alkyl,
with the provisos
(i) that $R_{21d}$ and $R_{22d}$ are not the same unless both are hydrogen,
(ii) that $R_{20}$ and $R_{21d}$ are not both —$NO_2$,
(iii) that the starred carbon atoms are attached to the N-atom of the basic of quaternary ammonium group,
(iv) that $R_{20}$ is not —$NO_2$ when $R_{21d}$ and $R_{22d}$ are both hydrogen,
(v) that the compound of formula IIId contains at least two basic water-solubilizing groups, and
(vi) when $K_3$ is a group of formula IIIaf, at least one of $R_{21d}$ and $R_{22d}$ contains at least one $Z_3$ group.

Preferred compounds of formula IIId are of formula IIIe

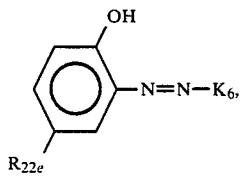 (IIIe)

in which
$R_{22e}$ is hydrogen, —$CH_2$—$Z_5$, —$SO_2$—NH—$(CH_2)_{m'}$—$Z_5$, —CO—NH—$(CH_2)_{m'}$—$Z_5$, —$NO_2$, —NH—CO—$(CH_2)_a$—$Z_5$ or

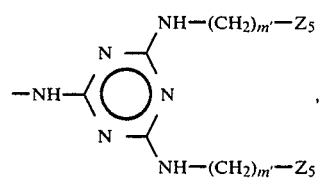

m' is 2 or 3,
$Z_5$ is —$N(CH_3)_2$, —$N(C_2H_5)_2$, —$^\oplus N(CH_3)_3 A^\ominus$,

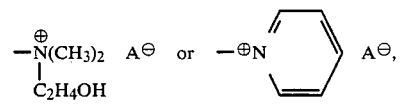

$K_6$ is

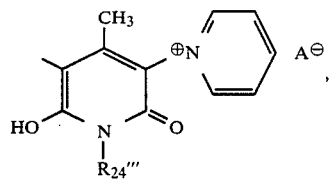 (IIIa₁)

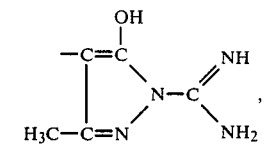 (IIIb₁)

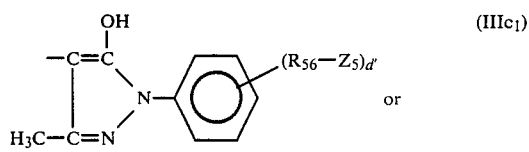 (IIIc₁)

or

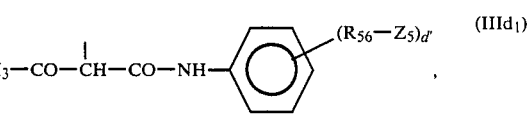 (IIId₁)

wherein
$R_{56}$ is —$(CH_2)_{m'}$—, —NH—CO—$(C^*H_2)_a$—, —CO—NH—$(C^*H_2)_{m'}$— or —$SO_2NH$—$(C^*H_2)_{m'}$— where the starred carbon atoms are attached to the $Z_5$ group and all the other symbols are as above defined,
with the provisos that (i) the compound of formula IIIe contains at least two basic water-solubilizing groups, and (ii) when $K_6$ is a group of formula IIId₁, $R_{22e}$ contains at least one $Z_5$ group.

Preferred azo compounds of formula III in 1:1 metal complex form are of formula IIIf

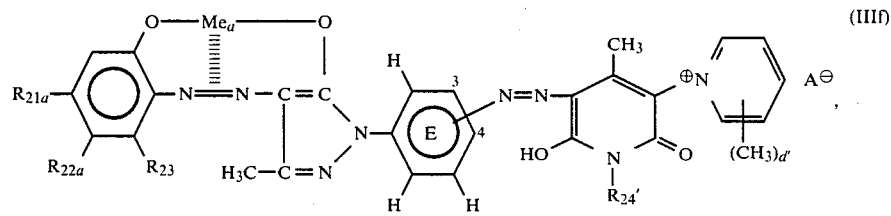 (IIIf)

in which
$R_{21a}$ is hydrogen, —$CH_2$—$Z_2$, —NH—CO—$(CH_2)_a$—$Z_2$, —CO—$CH_2$—$Z_2$, —$NO_2$, —$SO_2$—$NH_2$, —CO—NH—$(CH_2)_{m'}$—$Z_2$, —$SO_2$—NH—$(CH_2)_{m'}$—$Z_2$ or unless both are hydrogen, (ii) the complex of formula IIIg contains at least two basic water-solubilizing groups, and (iii) the azo radical on ring E is in the 3- or 4-position.

More preferred 1:1 complexes of formula IIIf are of formula IIIh

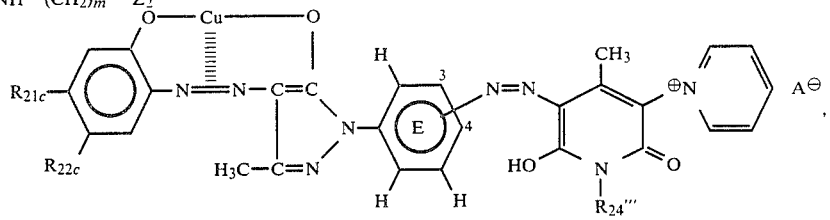
(IIIh)

in which $R_{21c}$ and $R_{22c}$ independently are hydrogen, —CH$_2$—Z$_5$, —NO$_2$, —SO$_2$—NH$_2$, —NH—CO—CH$_2$—Z$_5$, —SO$_2$—NH—(CH$_2$)$_{m'}$—Z$_5$ or

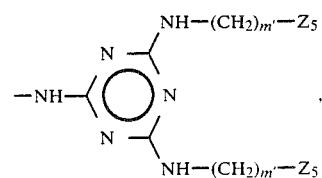

$R_{24'''}$ is hydrogen, —C$_2$H$_4$OH, —(CH$_2$)$_3$—N(CH$_3$)$_2$, —(CH$_2$)$_3$—N(C$_2$H$_5$)$_2$ or —(CH$_2$)$_3$—N$^⊕$(CH$_3$)$_3$A$^⊖$, and all the other symbols are as defined above, with the provisos that (i) $R_{21c}$ and $R_{22c}$ cannot be the same group unless both are hydrogen, (ii) the complex of formula IIIh contains at least two basic water-solubilizing groups, and (iii) the azo radical on ring E is in the 3- or 4-position.

Alternatively preferred compounds of formula III in 1:1 metal complex form are of formula IIIi

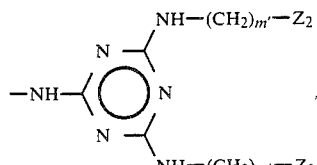

$R_{22a}$ is hydrogen, —NO$_2$, —SO$_2$—NH$_2$, —SO$_2$—NH—(CH$_2$)$_2$—OH, —CH$_2$—Z$_2$, —NH—CO—(CH$_2$)$_a$—Z$_2$, —SO$_2$—NH—(CH$_2$)$_{m'}$—Z$_2$ or

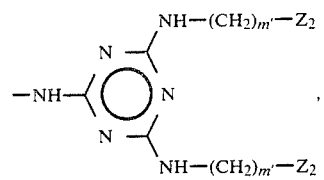

and the other symbols are defined above, with the provisos (i) that in ring E the azo bridge is in the 3- or 4-position,
(ii) that $R_{21a}$ and $R_{22a}$ cannot be the same group unless both are hydrogen, and
(iii) the complex of formula IIIf contains at least two basic water-solubilizing groups.

Preferred 1:1 complexes of formula IIIf are of formula IIIg

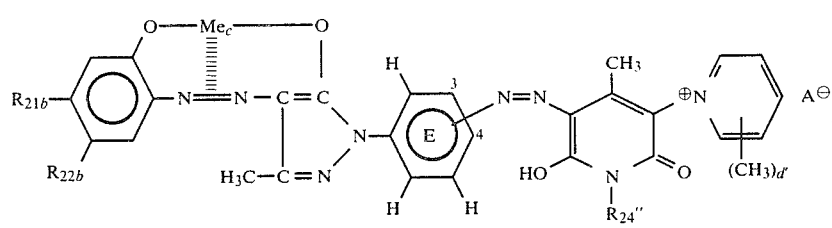
(IIIg)

in which $R_{21b}$ and $R_{22b}$ are independently hydrogen, —CH$_2$—Z$_3$, —NO$_2$, —SO$_2$—NH$_2$, —NH—CO—CH$_2$—Z$_3$, —SO$_2$—NH—(CH$_2$)$_{m'}$—Z$_3$ or

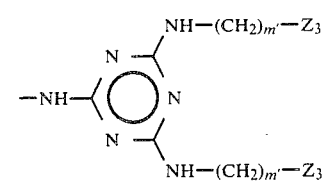

and the other symbols are as defined above, with the provisos that (i) $R_{21b}$ and $R_{22b}$ cannot be the same group

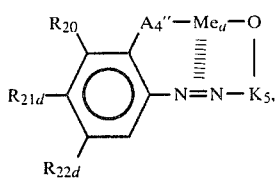
(IIIi)

in which $A_4''$ is —O— or —COO—, —K$_5$—O— is one of the following formulae IIIba to IIIbf

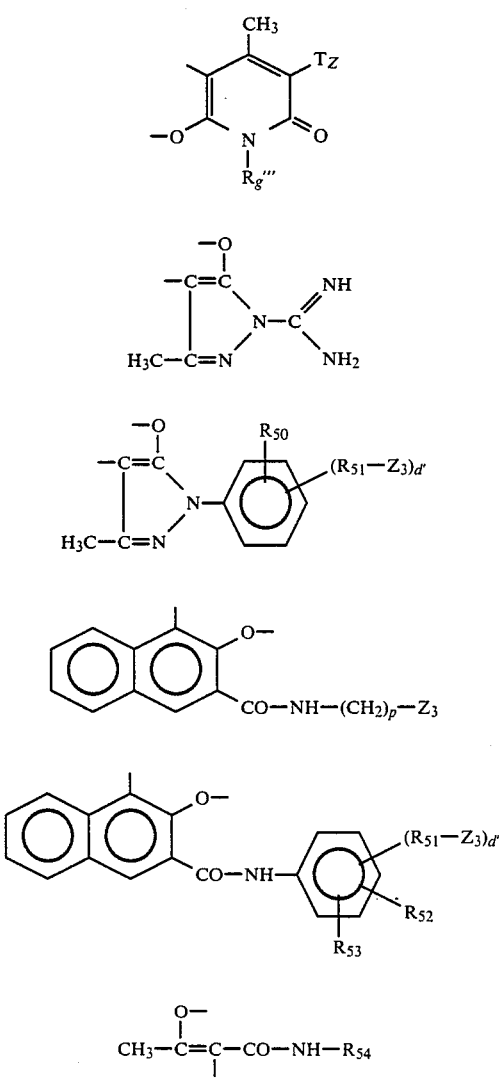

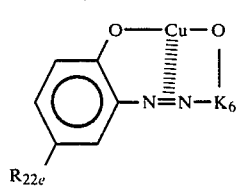

and the other symbols are as defined above,
with the provisos that (i) $R_{20}$ and $R_{21d}$ cannot both be —$NO_2$, (ii) $R_{21d}$ and $R_{22d}$ cannot be the same group unless both are hydrogen, (iii) when $R_{21d}$ and $R_{22d}$ are both hydrogen, $R_{20}$ must be hydrogen, (iv) the complex of formula IIIl contains at least two basic water-solubilizing groups, and (v) when —$K_5$—O— is a group of formula IIIbf, at least one of $R_{21d}$ and $R_{22d}$ contains at least one $Z_3$ group.

Preferred complexes of formula IIIi are of formulae IIIk and IIIl

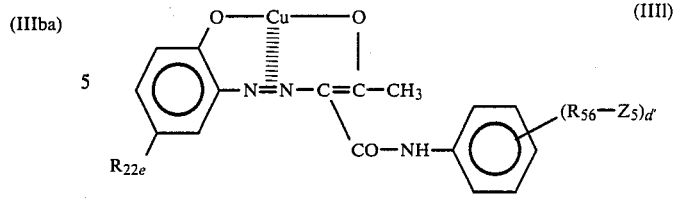

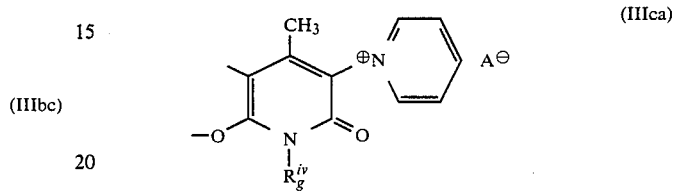

in which
  —O—$K_6$— is

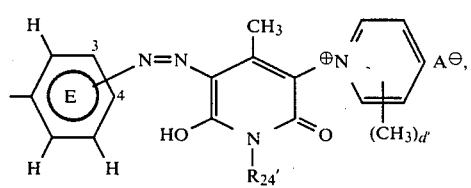

or a group of formula IIIbb or IIIbc wherein $R_{51}$ is $R_{56}$ and $Z_3$ is $Z_5$,
where
  $R_g^{iv}$ is hydrogen, —$CH_3$ or —$(CH_2)_3$—$Z_5$, and
  the other symbols are as defined above,
with the provisos that (i) the complexes of formulae IIIk and IIIl contain at least two basic water-solubilizing groups, and (ii) $R_{22e}$ of the complex of formula IIIl contains at least one $Z_5$ group.

Preferred azo compounds of formula III in 1:2 metal complex form are symmetric or asymmetric and are of formula IIIm

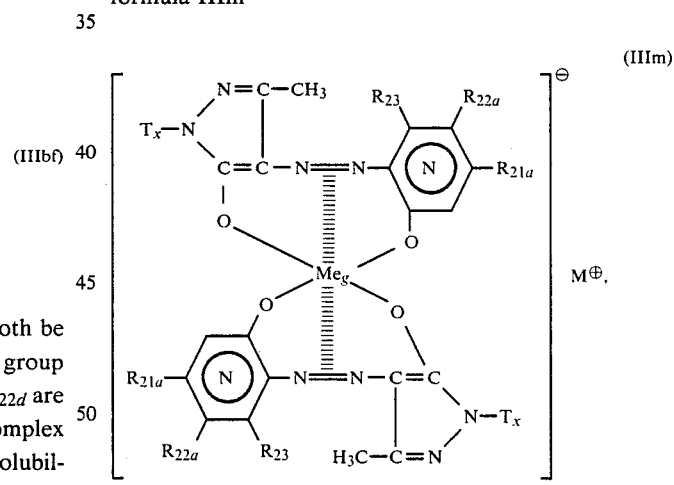

in which each $T_x$ independently is and $Me_g$ is chromium, iron or cobalt, and all the other symbols are as defined above, with the provisos
  (i) that on ring E the azo bridge is in the 3- or 4-position, (ii) that $R_{21a}$ and $R_{22a}$ on the same ring N cannot be the same group unless both are hydrogen, and (iii) each metal-free disazo compound of the 1:2 metal complex contains at least two basic water-solubilizing groups.

Preferably $Me_g$ is iron.

Preferred 1:2 complexes of formula IIIm are of formula IIIn and are symmetric or asymmetric, preferably the former,

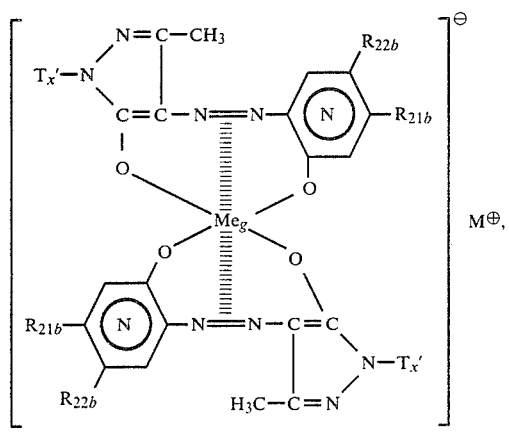

(IIIn)

in which each $T_x'$ independently is

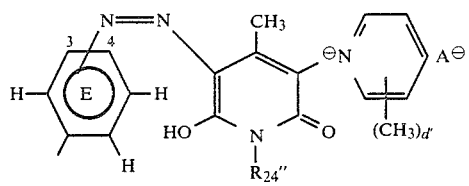

and all the other symbols are as defined above, with the provisos that (i) the azo radical is in the 3- or 4-position of each ring E, (ii) $R_{21b}$ and $R_{22b}$ on the same ring N cannot be the same group unless both are hydrogen, and (iii) each metal-free disazo compound of the 1:2 metal complex contains at least two basic water-solubilizing groups.

More preferred complexes of formula IIIm are symmetric or asymmetric, preferably symmetric, and are of formula IIIo

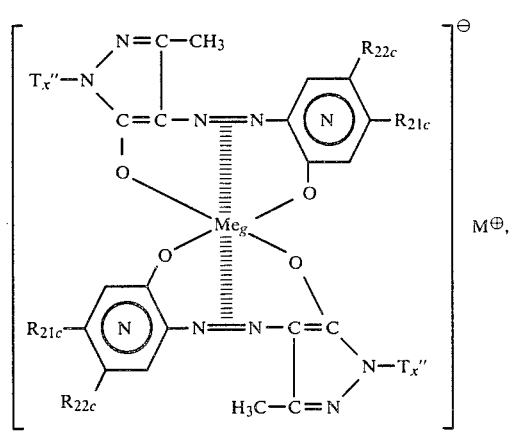

(IIIo)

in which each $T_x''$ independently is

H, CH$_3$, N=N, E, HO, N, R$_{24}'''$, ⊕N, A⊖ and all the other symbols are as defined above, with the provisos that (i) the azo radical is in the 3- or 4-position of each ring E, (ii) $R_{21c}$ and $R_{22c}$ on the same ring cannot be the same group unless both are hydrogen, and (iii) each metal-free disazo compound of the 1:2 metal complex contains at least two basic water-solubilizing groups.

Alternatively preferred azo compounds in 1:2 metal complex form are symmetric or assymetric, preferably symmetric, and are of formula IIIp (IIIp)

[structure with $K_5$—N≡N—, $R_{22d}$, $R_{21d}$, $A_4''$, $R_{20}$, $Me_g$, $K_5$] M⊕, wherein all of the symbols are as defined above, with the provisos that (i) $R_{20}$ and $R_{21d}$ on the same ring N cannot both be —NO$_2$, (ii) $R_{21d}$ and $R_{22d}$ on the same ring N cannot be the same group unless both are hydrogen, (iii) when $R_{21d}$ and $R_{22d}$ on the same ring N are both hydrogen, $R_{20}$ on that ring N must be hydrogen, (iv) each metal-free monoazo compound of the 1:2 metal complex contains at least two basic water-solubilizing groups, and (v) when a —K$_5$—O— is a group of formula IIIbf, at least one of $R_{21d}$ and $R_{22d}$ of the same monoazo compound contains at least one Z$_3$ group.

More preferred 1:2 complexes of formula IIIp are symmetric or asymmetric, preferably symmetric, and are of formula IIIr or IIIs

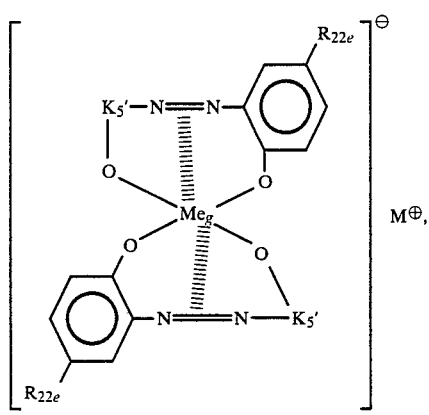

(IIIr)

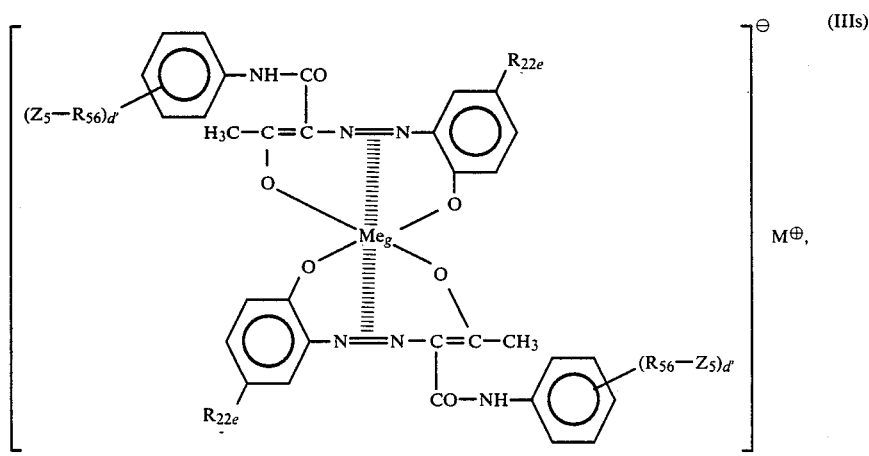

(IIIs)

in which —K$_5'$—O— is a group of formula IIIba, IIIob or IIIbc wherein any R$_{51}$ is R$_{56}$ and Z$_3$ is Z$_5$ and all the other symbols are as defined above, with the provisos that (i) each metal-free monoazo compound of the 1:2 metal complex contains at least two basic water-solubilizing groups, and (ii) in the complex of formula IIIs, each R$_{22e}$ contains at least one Z$_5$ group.

Preferred azo compounds of formula IV in metal-free form are of formula IVa

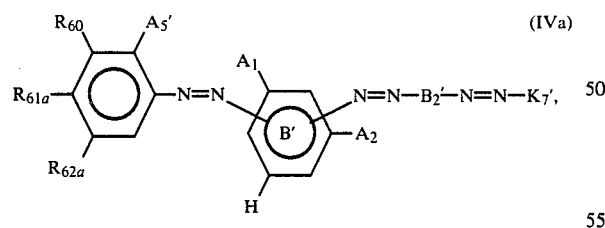

(IVa)

in which
A$_5'$ is —OH, —OCH$_3$ or —COOH, preferably —OH or —OCH$_3$,
R$_{61a}$ is hydrogen, —NO$_2$, —CH$_2$—Z$_2$, —SO$_2$—NH—(CH$_2$)$_p$—Z$_2$, —SO$_2$NH$_2$, —NH—CO—(CH$_2$)$_p$—Z$_2$,

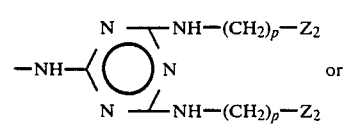

-continued

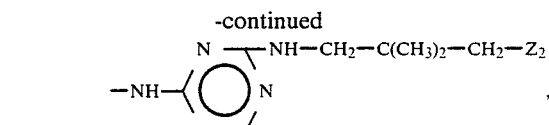

R$_{62a}$ is hydrogen, —NO$_2$, —CH$_2$—Z$_2$, —SO$_2$—NH$_2$, —SO$_2$—NH—(CH$_2$)$_p$—Z$_2$, —CO—NH—(CH$_2$)$_p$—Z$_2$, —NH—CO—(CH$_2$)$_p$—Z$_2$,

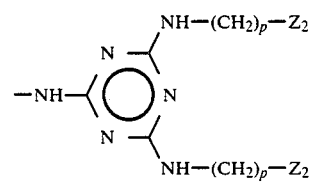 or

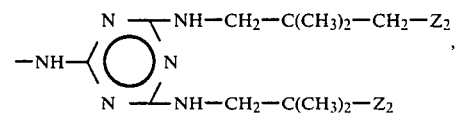

B'$_2$ is 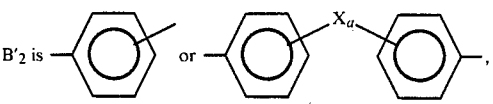

K$_7'$ is one of groups IVaa to IVaf

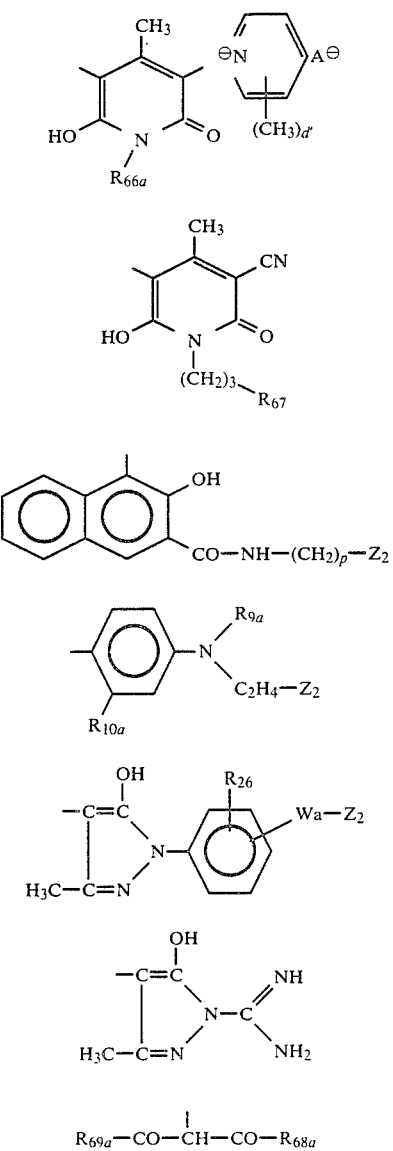

(IVaa)

(IVab)

(IVac)

(IVad)

(IVae)

(IVaf)

(IVag)

in which
R$_{9a}$ is —CH$_3$, —C$_2$H$_5$ or —C$_2$H$_4$—Z$_2$,
R$_{10a}$ is hydrogen, —CH$_3$, —OCH$_3$, —NH—CO—CH$_3$ or —NH—CO—NH$_2$,
R$_{66a}$ is hydrogen, —CH$_3$, —C$_2$H$_5$, n—C$_3$H$_7$, n—C$_4$H$_9$, i—C$_3$H$_7$, i—C$_4$H$_9$, —C$_2$H$_4$OH or —(CH$_2$)$_p$—Z$_2$,
R$_{68a}$ is —(CH$_2$)$_p$—Z$_2$, —NH—(CH$_2$)$_p$—Z$_2$ or

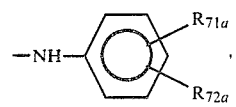

R$_{69a}$ is —CH$_3$, —C$_2$H$_5$ or —(CH$_2$)$_p$—Z$_2$, with the proviso that at least one of R$_{68a}$ and R$_{69a}$ contains at least one Z$_2$ group,
R$_{71a}$ is hydrogen, —OH, —OCH$_3$, —NH—CO—(CH$_2$)$_p$—Z$_2$, —CO—NH—(CH$_2$)$_p$—Z$_2$, —SO$_2$—NH—(CH$_2$)$_p$—Z$_2$ or

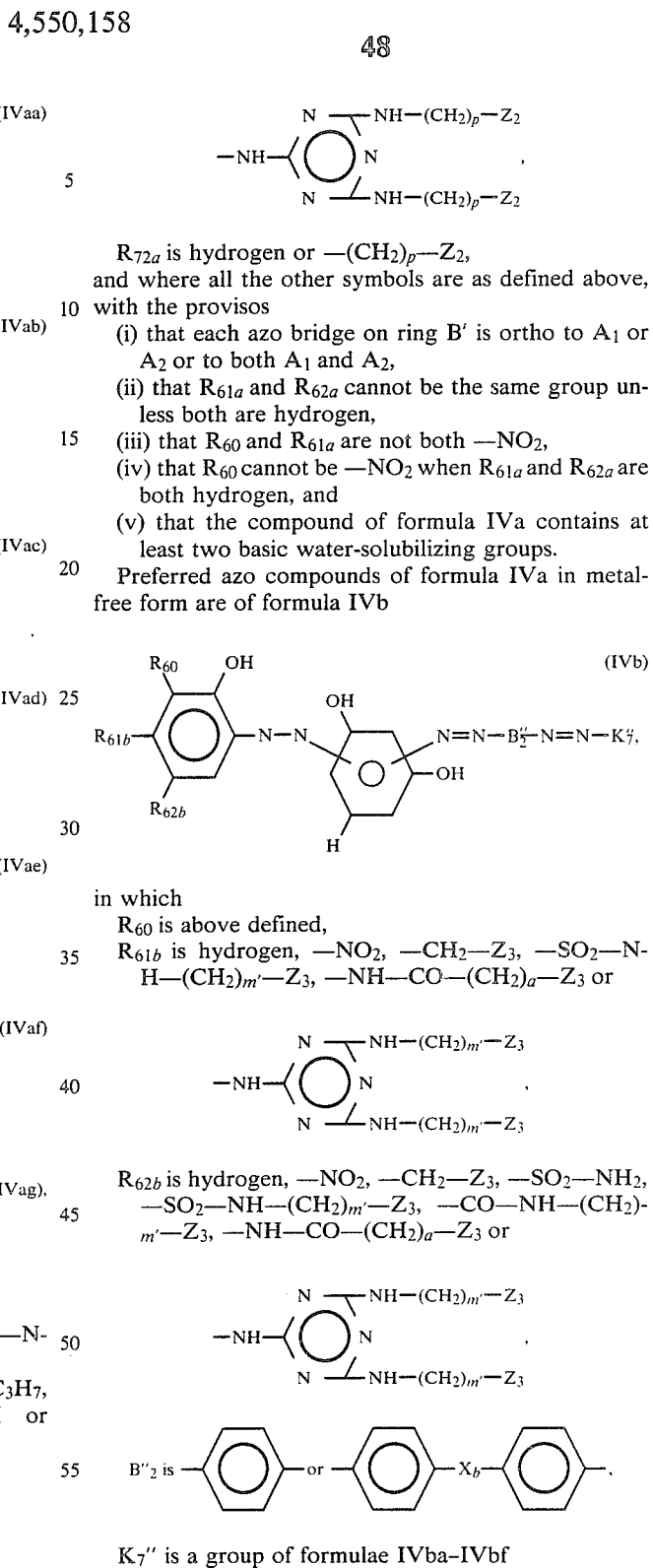

R$_{72a}$ is hydrogen or —(CH$_2$)$_p$—Z$_2$,
and where all the other symbols are as defined above, with the provisos
  (i) that each azo bridge on ring B' is ortho to A$_1$ or A$_2$ or to both A$_1$ and A$_2$,
  (ii) that R$_{61a}$ and R$_{62a}$ cannot be the same group unless both are hydrogen,
  (iii) that R$_{60}$ and R$_{61a}$ are not both —NO$_2$,
  (iv) that R$_{60}$ cannot be —NO$_2$ when R$_{61a}$ and R$_{62a}$ are both hydrogen, and
  (v) that the compound of formula IVa contains at least two basic water-solubilizing groups.

Preferred azo compounds of formula IVa in metal-free form are of formula IVb in which
R$_{60}$ is above defined,
R$_{61b}$ is hydrogen, —NO$_2$, —CH$_2$—Z$_3$, —SO$_2$—NH—(CH$_2$)$_{m'}$—Z$_3$, —NH—CO—(CH$_2$)$_a$—Z$_3$ or R$_{62b}$ is hydrogen, —NO$_2$, —CH$_2$—Z$_3$, —SO$_2$—NH$_2$, —SO$_2$—NH—(CH$_2$)$_{m'}$—Z$_3$, —CO—NH—(CH$_2$)$_{m'}$—Z$_3$, —NH—CO—(CH$_2$)$_a$—Z$_3$ or K$_7''$ is a group of formulae IVba–IVbf

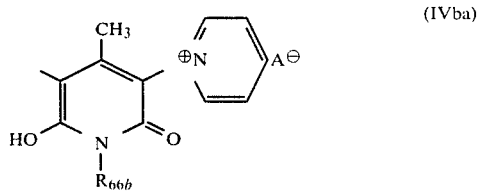

-continued

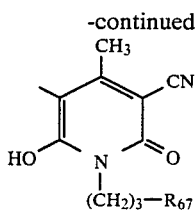

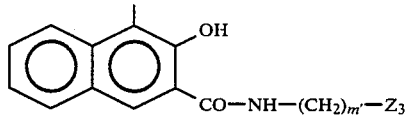

(IVbc)

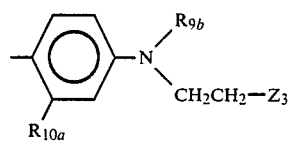

(IVbd)

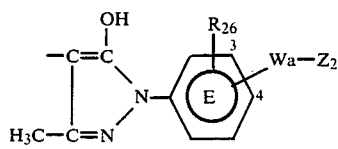

(IVbe)

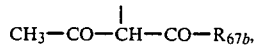  (IVbf)

where
$R_{9b}$ is —CH$_3$, —C$_2$H$_5$ or —CH$_2$CH$_2$—Z$_3$,
$R_{66b}$ is hydrogen, —CH$_3$, —C$_2$H$_5$, —CH$_2$CH$_2$OH or —(CH$_2$)$_{m'}$—Z$_3$,
$R_{67b}$ is —(CH$_2$)$_{m'}$—Z$_3$, —NH—(CH$_2$)$_{m'}$—Z$_3$ or

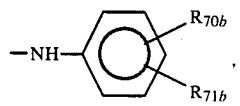

$R_{70b}$ is hydrogen, —OH, —OCH$_3$, —NH—CO—(CH$_2$)$_a$—Z$_3$, —CO—NH—(CH$_2$)$_{m'}$—Z$_3$, —SO$_2$—NH—(CH$_2$)$_{m'}$—Z$_3$ or

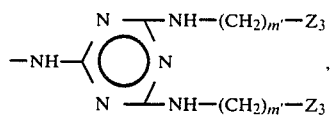

$R_{71b}$ is hydrogen or —(CH$_2$)$_{m'}$—Z$_3$, with the proviso that at least one of $R_{70b}$ and $R_{71b}$ contains at least one Z$_3$ group,
and all the other symbols are as defined above, with the provisos that
(i) $R_{61b}$ and $R_{62b}$ cannot be the same group unless both are hydrogen,
(ii) $R_{60}$ and $R_{61b}$ are not both —NO$_2$,
(iii) $R_{60}$ is not —NO$_2$ when $R_{61b}$ and $R_{62b}$ are both hydrogen, and
(iv) the compound of formula IVb contain at least two basic water-solubilizing groups.

Alternatively preferred azo compounds of formula IV in metal-free form are of formula IVc.

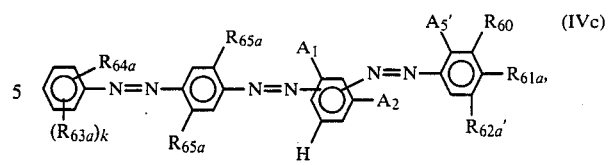

in which
$R_{63a}$ is —SO$_2$—NH—(CH$_2$)$_{m'}$—Z$_2$, —CO—NH—(CH$_2$)$_{m'}$—Z$_2$, —NH—CO—(CH$_2$)$_a$—Z$_2$, —CH$_2$—Z$_2$ or

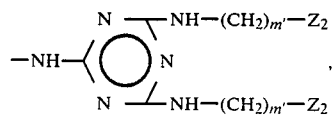

each
$R_{65a}$ independently is —CH$_3$, —C$_2$H$_5$, —OCH$_3$ or —OC$_2$H$_5$,
$R_{64a}$ is hydrogen or —OCH$_3$, preferably hydrogen,
k is 1 or 2, with the proviso that when an $R_{63a}$ is —CO—NH—(CH$_2$)$_{m'}$—Z$_2$, k must be 2,
$R_{61a}'$ is hydrogen, —NO$_2$, —NH—CO—(CH$_2$)$_a$—Z$_2$ or

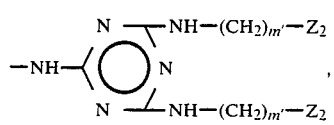

$R_{62a}'$ is hydrogen, —NO$_2$, —SO$_2$—NH$_2$, —SO$_2$—N(CH$_3$)$_2$, —SO$_2$—N(C$_2$H$_5$)$_2$, —SO$_2$—NH—C$_2$H$_4$OH, —SO$_2$—NH—(CH$_2$)$_{m'}$—Z$_2$, or when $R_{60}$ and $R_{61a}'$ are both hydrogen, it may also be —CO—NH—(CH$_2$)$_{m'}$—Z$_2$, or —NH—CO—(CH$_2$)$_a$—Z$_2$ or

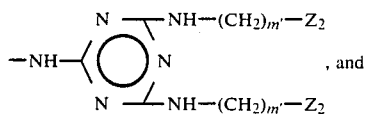, and all other symbols are as above defined, with the provisos
(i) that $R_{60}$ and $R_{61a}'$ are not both —NO$_2$,
(ii) that $R_{61a}'$ and $R_{62a}'$ cannot be the same group unless both are hydrogen,
(iii) that $R_{60}$ is not —NO$_2$ when $R_{61a}'$ and $R_{62a}'$ are both hydrogen, and
(iv) that the compound of formula IVc contains at least two basic water-solubilizing groups.

Preferred azo compounds of formula IVc are of formula IVd

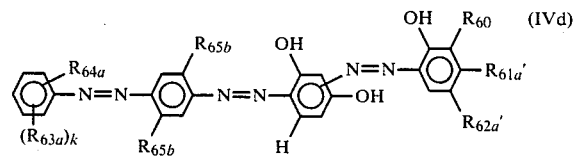

in which each,
$R_{65b}$ independently is —CH$_3$ or —OCH$_3$, $R_{61a}''$ is hydrogen, $-NO_2$, $-NH-CO-CH_2-Z_3$ or

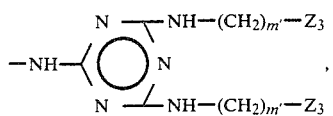

$R_{62a}''$ is hydrogen, $-NO_2$, $-SO_2-NH_2$, $-SO_2-N(CH_3)_2$, $-SO_2-NH-(CH_2)_{m'}-Z_3$, $-SO_2NH-C_2H_4OH$, or when $R_{60}$ and $R_{61a}''$ are both hydrogen, $R_{62a}''$ may also be $-CO-NH-(CH_2)_{m'}-Z_3$, $-NH-CO-CH_2-Z_3$ or

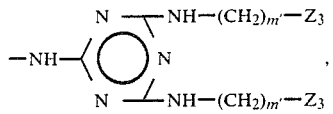

all the other symbols are as above defined, and the same provisos apply as to compounds of formula IVc.

Preferred azo compounds of formula IV in 1:1 metal complex form are of formula IVe

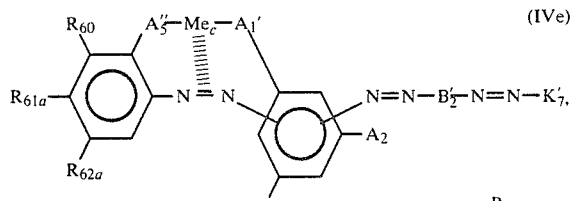

(IVe)

wherein, $A_5''$ is $-O-$ or $-COO-$, preferably $-O-$, and all other symbols are defined above, with the provisos (i) that $R_{61a}$ and $R_{62a}$ cannot both be the same group unless both are hydrogen, (ii) that $R_{60}$ and $R_{61a}$ are not both $-NO_2$, (iii) that $R_{60}$ is not $-NO_2$ when $R_{61a}$ and $R_{62a}$ are both hydrogen, (iv) that the $A_5''$-bearing phenylazo group is ortho to $A_1'$, and (v) that the metal complex of formula IVe contains at least two basic water-solubilizing groups.

Most preferred 1:1 complexes of formula IVe are of formula IVf

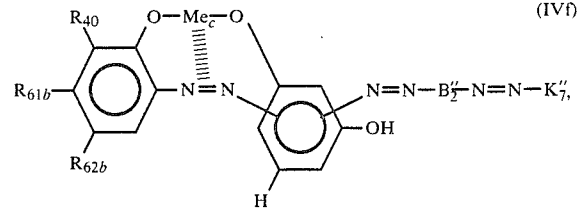

(IVf)

in which all the symbols are as defined above, with the provisos (i) that $R_{61b}$ and $R_{62b}$ cannot be the same group unless both are hydrogen, (ii) that $R_{60}$ and $R_{61b}$ are not both $-NO_2$, (iii) that $R_{60}$ is not $-NO_2$ when $R_{61b}$ and $R_{62b}$ are both hydrogen, (iv) that the $R_{60}$-bearing phenylazo group is ortho to $A_1'$, and (v) that the metal complex of formula IVf contains at least two basic water-solubilizing groups. Preferably, $Me_c$ is copper.

Alternatively preferred azo compounds of formula IV in 1:1 metal complex form are of formula IVg

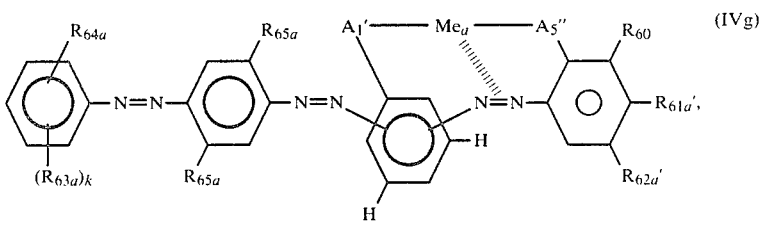

(IVg)

in which all the symbols are as above defined, with the provisos (i) that $R_{60}$ and $R_{61a}'$ are not both $-NO_2$, (ii) that $R_{61a}'$ and $R_{62a}'$ are not the same group unless both are hydrogen, (iii) that $R_{60}$ is not $-NO_2$ when $R_{61a}'$ and $R_{62a}'$ are both hydrogen, (iv) that the $A_5''$-bearing phenylazo group is ortho to $A_1'$, and (v) that the metal complex of formula IVg contains at least two basic water-solubilizing groups.

Preferred complexes of formula IVg are of formula IVh

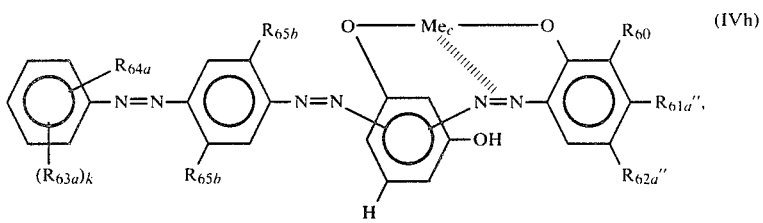

(IVh)

in which all symbols are above defined and the provisos correspond to those given for formula IVg.

Preferred azo compounds of formula IV in 1:2 metal complex form are of formula IVi

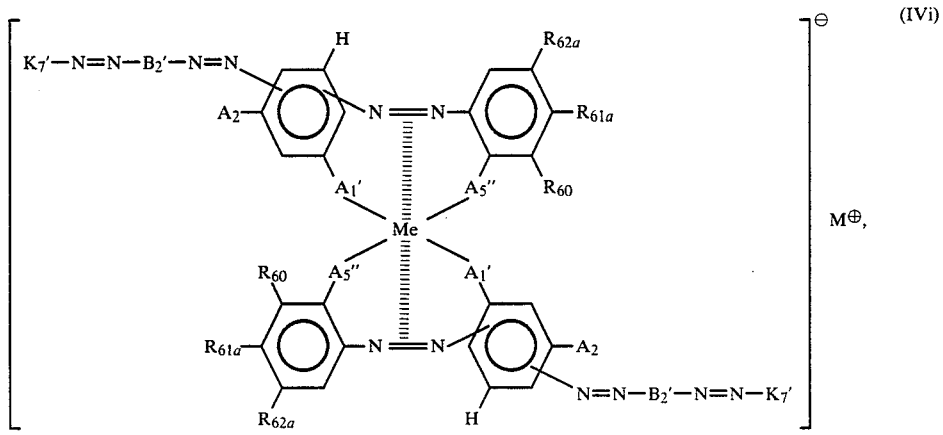

(IVi)

in which Me is chromium, iron or cobalt and all the other symbols are as above defined, with the provisos (i) that $R_{61a}$ and $R_{62a}$ are not the same unless both are hydrogen, (ii) that $R_{60}$ and $R_{61a}$ are not both $-NO_2$, (iii) that $R_{60}$ is not $-NO_2$ when $R_{61a}$ and $R_{62a}$ are both hydrogen, (iv) that each $A_5''$-bearing phenylazo group is ortho to $A_1'$, and (v) that each metal-free azo compound of the 1:2 metal complex contains at least two basic water-solubilizing groups, Provisos (i)–(iii) apply to each metal-free azo compound separately.

Preferred 1:2 complexes of formula IVi are of formula IVj in which all the symbols are as above defined with the provisos (i) that $R_{61b}$ and $R_{62b}$ are not both the same unless both are hydrogen, (ii) that $R_{60}$ and $R_{61b}$ are not both $-NO_2$, (iii) that $R_{60}$ is not $-NO_2$ when $R_{61b}$ and $R_{62b}$ are both hydrogen, (iv) that each $R_{60}$-bearing phenylazo group is ortho to the complexed $-O-$ radical, and (v) that each metal-free azo compound of the 1:2 metal complex contains at least two basic water-solubilizing groups. Provisos (i)–(iii) apply to each metal-free azo compound separately.

Alternatively preferred compounds of formula IV in 1:2 metal complex form are of formula IVl

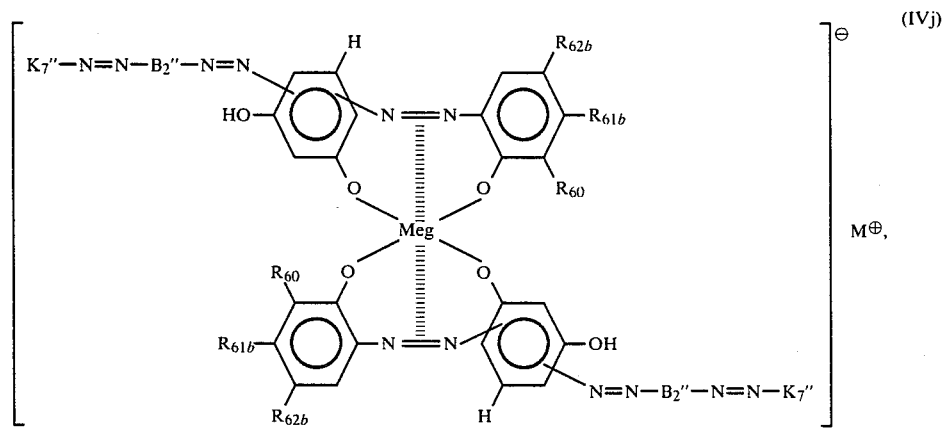

(IVj)

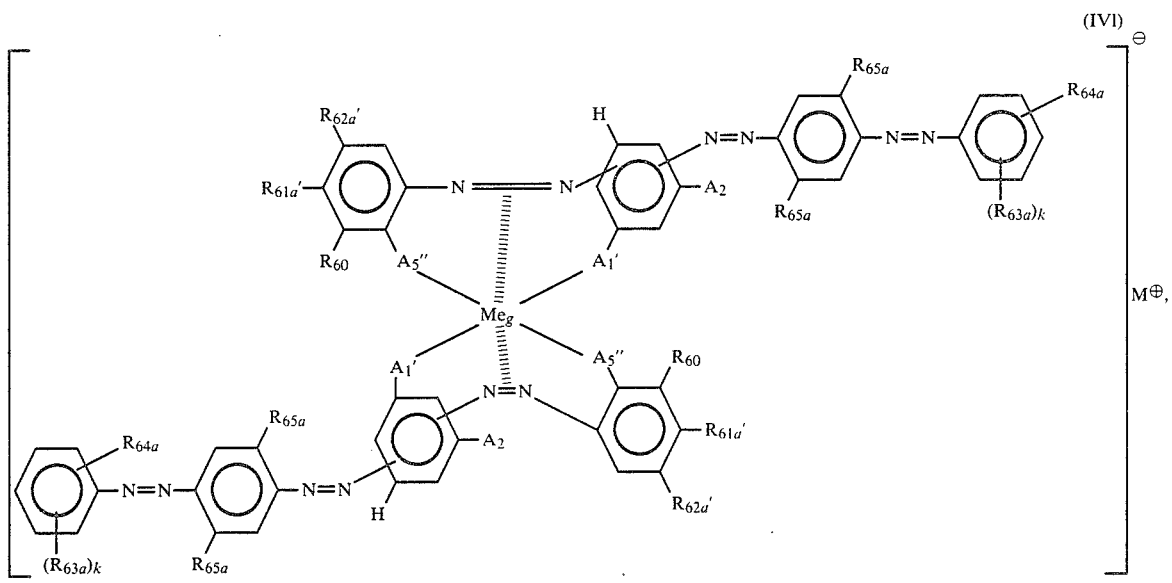

in which all the symbols are above defined, with the provisos that (i) $R_{60}$ and $R_{61a}'$ are not both $-NO_2$, (ii) $R_{61a}'$ and $R_{62a}'$ are different unless both are hydrogen, (iii) $R_{60}$ is not nitro when $R_{61a}'$ and $R_{62a}'$ are both hydrogen, (iv) each $R_5''$-bearing phenylazo group is ortho to $A_1'$, and (v) each metal-free azo compound of the 1:2 metal complex contains at least two basic water-solubilizing groups. Provisos (i)–(iii) apply to each metal-free azo compound separately.

More preferred compounds of formula IVl are of formula IVm

In formulae I and II, each X is preferably X', more preferably $X_a$ and most preferably $X_b$. In formula II', X' is preferably $X_a$ and most preferably $X_b$. In formulae IIb, IIf, IIh, IVa, IVe and IVi, $X_a$ preferably $X_b$. $X_{14}$ is preferably $X_{14}'$ or $X_{14}''$. In $X_{15}$, the $-NH-CO-$ radicals are preferably meta to each other.

In formulae I, II, III and IV and each subscope thereof, Z is preferably $Z_2$, more preferably $Z_3$ and most preferably $Z_5$; $Z_2$ is preferably $Z_3$ and most preferably $Z_5$; and $Z_3$ is preferably $Z_5$. Unless otherwise indicated, in each compound the Z's are preferably the same, the

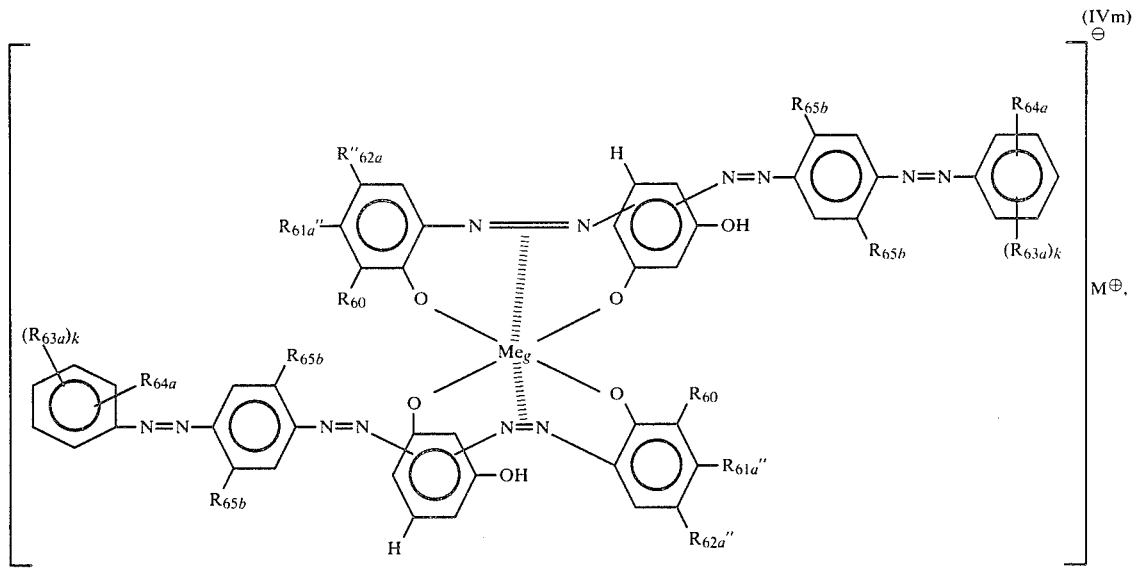

in which all the symbols are above defined and the provisos correspond to those given for formula IVl.

The compounds of formulae I, II, III and IV and every subscope thereof preferably contain 2–8, more preferably 2–6 and most preferably 2–4, basic water-solubilizing groups (as defined above), except where otherwise indicated. In the case of 1:2 metal complexes, these preferences apply to each metal-free azo compound of the complexes.

$Z_2$'s are preferably the same, the $Z_3$'s are preferably the same and the $Z_5$'s are preferably the same. In $Z_2$ and $Z_3$, any p is preferably 2 or 3. Each Z, $Z_2$, $Z_3$ and $Z_5$ group that is not quaternized may be in free base form or in acid addition salt form with a non-chromophoric acid of the formula HA. Examples of HA are the acids corresponding to the anions $A^\ominus$.

Unless otherwise indicated, each alkyl is independently preferably methyl or ethyl, each alkoxy is independently preferably methoxy or ethoxy, and each alkylene is independently preferably —(CH$_2$)$_2$—, —(CH$_2$)$_3$— or —(CH$_2$)$_4$—.

Each halo is independently fluoro, chloro or bromo, preferably chloro.

In formulae I, II, III and IV and each subscope thereof, preferably no two azo groups on one ring are ortho to each other and preferably no two 1,3,5-triazinylamino groups on one ring are ortho to each other.

In the synthesis of the compounds of formula II and IV and each subscope thereof, two or three diazonium compounds are coupled onto a compound of the formula

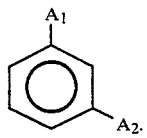

The position of each azo group on said ring in the resulting compounds of formulae II and IV depends on various factors including the coupling order. Mixtures of isomers are sometimes obtained. However, each azo group must be ortho to at least one of A$_1$ and A$_2$; no azo group may be meta to both of them. All of the possible isomers are embraced by formulae II and IV and the subscopes thereof. The preferred coupling orders are set forth in the examples.

The synthesis of the compounds of formula II and each subscope thereof having one or more groups of the formula

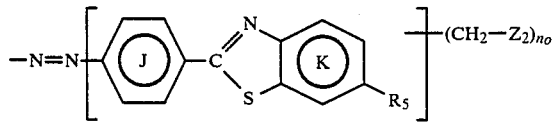

involves the chloromethylation of a compound of the formula

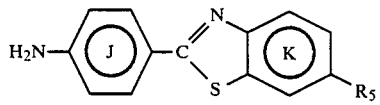

or a group of the formula

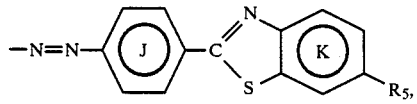

preferably the former. The chloromethylation tends to give a mixture of compounds rather than a single compound. The components of the mixture contain one or two chloromethyl groups although a minor amount of compound containing no or three chloromethyl groups may be present. Accordingly, the subsequent reaction of the chloromethylated mixture of compounds with ammonia or an amine gives a mixture of compounds which has been found to contain an average of at least 1.3 basic water-solubilizing groups on each benzothiazolylphenyl group. The components of the mixture contain one or two basic water-solubilizing groups although a minor amount of compound containing no or three such groups may be present.

In formula II' and each subscope thereof, one member of each of the following pairs of variables on the same ring is preferably hydrogen: (1) R$_2$ and R$_3$, (2) R$_{2a}$ and R$_{3a}$, (3) R$_{2d}$ and R$_{3a}$, (4) R$_{2b}$ and R$_{3b}$, (5) R$_{2b}$ and R$_{3c}$, (6) R$_{2a}'$ and R$_{3a}$, etc.

In formulae IIa and IId, one of R$_{2a}$ and R$_{3a}$ on the same ring is preferably hydrogen and the one that is other than hydrogen is preferably in a meta or para position; and p in a Z$_2$ group or in a —(CH$_2$)$_p$— radical linking a Z$_2$ group to a nitrogen atom is preferably 2 or 3; R$_{8a}$ is preferably meta or para to the azo radical; R$_{26}$ is preferably hydrogen, chloro, methyl or methoxy; K$_1'$, when a 5-hydroxypyrazole coupling component radical, preferably has no or one —W$_a$—Z$_2$ group which, when present, is preferably in a meta or para position of the phenyl group; (Z$_2$)$_a$—D$_1$— is preferably a methylbenzothiazolylphenyl group; and Me$_a$ is preferably copper, cobalt or chromium and most preferably copper. Each preference is independent of the others and may be combined with one or more of the others.

In formulae IIb and IIf, one of R$_{2d}$ and R$_{3a}$ on the same ring is preferably hydrogen and the one that is other than hydrogen is preferably in a meta or para position; the compounds are preferably symmetrical with respect to the X$_a$ radical, i.e., both "halves" of the molecule joined by X$_a$ are preferably the same; X$_a$ is preferably X$_b$; each Me$_a$ is preferably copper, chromium or cobalt and more preferably copper; and the other preferences are the same as those set forth in the preceding paragraph for formulae IIa and IIb. Each preference is independent of the others and may be combined with one or more of the others.

In formulae IIc and IIg, any p in a Z$_3$ group is preferably 2 or 3; each (Z$_3$)$_a$—D$_1$— is preferably a methylbenzothiazolylphenyl group; each Me$_c$ is preferably copper; and the compounds are preferably symmetrical with respect to the X$_b$ radical. Each preference is independent of the others and may be combined with one or more of the others.

In formula IIe, one of R$_{2b}$ and R$_{3b}$ on each ring is preferably hydrogen and the one that is other than hydrogen is preferably in a meta or para position; any p in a Z$_2$ or Z$_3$ group or in a —(CH$_2$)$_p$— radical linking a Z$_2$ or Z$_3$ group to a nitrogen atom is preferably 2 or 3; K$_1'$, when a 5-hydroxypyrazole coupling component radical, preferably has no or one —W$_a$—Z$_2$ group which, when present, is preferably in a meta or para position of the phenyl group; R$_{26}$ is preferably hydrogen, chloro, methyl or methoxy; (Z$_3$)$_a$—D$_1$— is preferably a methylbenzothiazolylphenyl group; and Me$_c$ is preferably copper. Each preference is independent of the others and may be combined with one or more of the others.

In formula IIh, each R$_{3a}$ is preferably in a meta or para position; each R$_{70}$ is preferably hydrogen; any p in a Z$_2$ group or in a —(CH$_2$)$_p$— radical linking a Z$_2$ group to a nitrogen atom is preferably 2 or 3; any R$_{8a}$ is preferably meta or para to the azo radical; any K$_1'$, when a 5-hydroxypyrazole coupling component radical, preferably has no or one —W$_a$—Z$_2$ group which, when present, is preferably in a meta or para position of the phenyl group; any R$_{26}$ is preferably hydrogen, chloro, methyl or methoxy; each (Z$_2$)$_a$—D$_1$— is preferably a methylbenzothiazolylphenyl group; X$_a$ is preferably X$_b$; the complexes are preferably symmetrical with respect to the $X_a$ radical, i.e., the two "halves" of the molecule joined by $X_a$ are preferably the same; and each $Me_a$ is preferably copper, chromium or cobalt and more preferably copper. Each preference is independent of the others and may be combined with one or more of the others.

In formula IIi, each $R_{3e}$ is preferably in a meta or para position; any p in a $Z_2$ or $Z_3$ group or in a —$(CH_2)_p$— radical linking a $Z_2$ or $Z_3$ group to a nitrogen atom is preferably 2 or 3; any $K_1'$, when a 5-hydroxypyrazole coupling component radical, preferably has no or one —$W_a$—$Z_2$ group which, when present, is preferably in a meta or para position of the phenyl group; any $R_{26}$ is preferably hydrogen, chloro, methyl or methoxy; each $(Z_3)_a$—$D_1$— is preferably a methylbenzothiazolylphenyl group; the complexes are preferably symmetrical with respect to the $X_b$ radical; and each $Me_c$ is preferably copper. Each preference is independent of the others and may be combined with one or more of the others.

In formulae IIj–IIm, $R_{2a}'$ is preferably hydroxy or amino and more preferably hydroxy and $R_{3a}$ on the $A_a'$-bearing ring is preferably hydrogen; one of $R_{2a}$ and $R_{3a}$ on every other ring is preferably hydrogen and the one that is other than hydrogen is preferably in a meta or para position; any p in a $Z_2$ group or in a —$(CH_2)_p$— radical linking a $Z_2$ group to a nitrogen atom is preferably 2 or 3; any $R_{8a}$ is preferably meta or para to the azo radical; any $K_1'$, when a 5-hydroxypyrazole coupling component radical, preferably has no or one —$W_a$—$Z_2$ group which, when present, is preferably in a meta or para position of the phenyl group; any $R_{26}$ is preferably hydrogen, chloro, methyl or methoxy; each $(Z_2)_a$—$D_1$— is preferably a methylbenzothiazolylphenyl group; $R_{25}$ is preferably methyl; $R_{42}$ is preferably

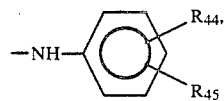

wherein, more preferably one of $R_{44}$ and $R_{45}$ contains a $Z_2$ group; and $R_{43}$ is preferably methyl. The preferred 1:2 metal complexes of formula IIj are symmetrical, i.e., the two metal-free azo compounds are the same. Each preference is independent of the others and may be combined with one or more of the others.

In formula IIn, one of $R_{2b}$ and $R_{2c}$ on each ring is preferably hydrogen and the one that is not is preferably meta or para to the azo radical; any p in a $Z_3$ group or in a —$(CH_2)_p$— radical linking a $Z_3$ group to a nitrogen atom is preferably 2 or 3; each $(Z_3)_a$—$D_1$— is preferably a methylbenzothiazolylphenyl group; and each of the other preferences is as set forth in the preceding paragraph for the 1:2 metal complexes of formula IIj. Each preference is independent of the others and may be combined with one or more of the others.

In formulae IIa–IIn, $(Z_2)_a$—$D_1$— or $(Z_3)_a$—$D_1$— is more preferably

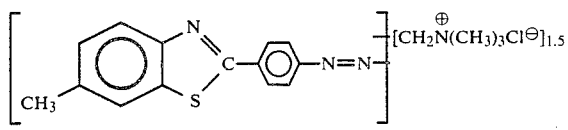

and, where present, each $R_{3a}$ is independently preferably $R_{3b}$, more preferably $R_{3c}$, and $R_{3c}$ is preferably hydrogen, —$NO_2$, —$SO_2NH$, —$SO_2NH(CH_2)_3N(CH_3)_2$ or —$SO_2NHC_2H_4OH$. Each $R_{3b}$ is independently preferably $R_{3c}$ and more preferably is one of the aforementioned preferred significances of $R_{3c}$. $R_{2a}$ is preferably hydrogen when $R_{3a}$ on the same ring is other than hydrogen and otherwise is preferably —$NO_2$ or —$SO_2NH_2$. $R_{2c}$ is preferably hydrogen when $R_{3a}$ on the same ring is other than hydrogen and otherwise is preferably hydroxy, methyl or methoxy. $R_{2b}$ is preferably hydrogen when $R_{3b}$ on the same ring is other than hydrogen and otherwise it is preferably —$NO_2$ or —$SO_2NH_2$.

In formula III and each subscope thereof, one member of each of the following pairs of variables on the same ring is preferably hydrogen: (1) $R_{21}$ and $R_{22}$, (2) $R_{34}$ and $R_{35}$, (3) $R_{21a}$ and $R_{22a}$, (4) $R_{21b}$ and $R_{22b}$, (5) $R_{21c}$ and $R_{22c}$ and (6) $R_{21d}$ and $R_{22d}$.

Preferably, in formulae IIIa–IIIc, $D_{10}$, $D_{10}'$ or $D_{10}''$ is

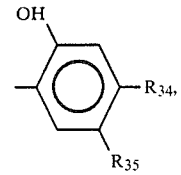

wherein, more preferably, one of $R_{34}$ and $R_{35}$ is hydrogen and the other is other than hydrogen, and any p in a $Z_2$ or $Z_3$ group is preferably 2 or 3. Each preference is independent of the others and may be combined therewith.

In formulae IIId, IIIi and IIIp, $A_4'$ is preferably —OH or —COOH and most preferably —OH; each $A_4''$ is preferably —O—; each $R_{20}$ is preferably hydrogen; one of $R_{21d}$ and $R_{22d}$ on the same ring is preferably hydrogen; any p in a $Z_3$ group is preferably 2 or 3; any —$R_{51}$—$Z_3$ group is preferably in a meta or para position of the phenyl group to which it is attached; at least one of $R_{52}$ and $R_{53}$ is preferably hydrogen; any q in a —$(CH_2)_q$— radical linking a $Z_3$ or —OH group to a nitrogen atom is preferably 2, 3 or 4 and more preferably 2 or 3 and any p in such a —$(CH_2)_p$— radical is preferably 2 or 3; and $Me_a$ is preferably copper, cobalt or chromium and most preferably copper. Each preference is independent of the others and may be combined with one or more of the others.

In formulae IIIe, IIIl and IIIs, any $R_{56}$—$Z_5$ group is preferably in a meta or para position of the phenyl group to which it is attached.

In formulae IIIf and IIIm, one of $R_{21a}$ and $R_{22a}$ on each ring is preferably hydrogen; each $R_{23a}$ is preferably hydrogen; any p in a $Z_2$ group is preferably 2 or 3; and $Me_a$ is preferably copper, cobalt or chromium and most preferably copper. Each preference is independent of the others and may be combined with one or more of the others.

In formulae IIIg and IIIn, one of $R_{21b}$ and $R_{22b}$ on each ring is preferably hydrogen; any p in a $Z_3$ group is preferably 2 or 3; and $Me_c$ is preferably copper. Each preference is independent of the others and may be combined with one or more of the others.

In formulae IIIh and IIIo, one of $R_{21c}$ and $R_{22c}$ on each ring is preferably hydrogen.

The preferred 1:2 metal complexes of formulae IIIm, IIIn, IIIc, IIIp, IIIr and IIIs are symmetrical, i.e., the two metal-free azo compounds are the same.

In formula IV and each subscope thereof, one member of each of the following pairs of variables on the same ring is preferably hydrogen: (1) $R_{61}$ and $R_{62}$, (2) $R_{61a}$ and $R_{62a}$, (3) $R_{61b}$ and $R_{62b}$, (4) $R_{61a}'$ and $R_{62a}'$ and (5) $R_{61a}''$ and $R_{62a}''$.

In formulae IVa, IVe and IVi, $A_5'$ is preferably —OH; each $A_5''$ is preferably —O—; each $R_{60}$ is preferably hydrogen; one of $R_{61a}$ and $R_{62a}$ on each ring is preferably hydrogen; each $B_2'$ is preferably 1,3- or 1,4-phenylene, 1,3- or 1,4-phenylene-$X_a$-1,3-phenylene or 1,3- or 1,4-phenylene-$X_a$-1,4-phenylene ($X_a$ being more preferably $X_b$); any p in a $Z_2$ group or in a —$(CH_2)_p$— radical linking a $Z_2$ group to a nitrogen atom is preferably 2 or 3; each $R_{26}$ is preferably hydrogen, chloro, methyl or methoxy and more preferably hydrogen; the —$W_a$—$Z_2$ group is preferably in a meta or para position of the phenyl group to which it is attached; any s in a —$(CH_2)_s$— radical linking a $Z_2$ group to a nitrogen atom is preferably 2 or 3 and any other s is preferably 1, 2 or 3; each $R_{68a}$ is preferably other than —$(CH_2)_p$—$Z_2$; each $R_{69a}$ is preferably methyl; and $Me_c$ is preferably copper. Each preference is independent of the others and may be combined with one or more of the others.

In formulae IVb, IVf and IVj, each $R_{60}$ is preferably hydrogen; one of $R_{61b}$ and $R_{62b}$ on each ring is preferably hydrogen; any p in a $Z_3$ group is preferably 2 or 3; each $R_{26}$ is preferably hydrogen, chloro, methyl or methoxy and more preferably hydrogen; the —$W_a$—$Z_2$ group is preferably in a meta or para position of the phenyl ring to which it is attached; any s in a —$(CH_2)_s$— radical linking a $Z_2$ group to a nitrogen atom is preferably 2 or 3 any other s is preferably 1, 2 or 3; each $R_{67b}$ is preferably other than —$(CH_2)_m$,—$Z_3$; and $Me_c$ is preferably copper. Each preference is independent of the others and may be combined with one or more of the others.

In formulae IVc, IVg and IVl, $A_5'$ is preferably —OH; each $A_5''$ is preferably —O—; each $R_{60}$ is preferably hydrogen; one of $R_{61a}'$ and $R_{62a}'$ on each ring is preferably hydrogen; each $R_{64a}$ is preferably hydrogen; on each ring, preferably, k is 1 and the $R_{63a}$ on that ring is other than —CO—NH—$(CH_2)_{m'}$—$Z_2$ and is in a meta or para position; any p in a $Z_2$ group is preferably 2 or 3; and $Me_a$ is preferably copper, cobalt or chromium and most preferably copper. Each preference is independent of the others and may be combined with one or more of the others.

In formulae IVd, IVh and IVm, each $R_{60}$ is preferably hydrogen; one of $R_{61a}''$ and $R_{62a}''$ on each ring is preferably hydrogen; each $R_{64a}$ is preferably hydrogen; on each ring, preferably, k is 1 and the $R_{63a}$ on that ring is other than —CO—NH—$(CH_2)_{m'}$—$Z_2$ and is in a meta or para position, the most preferred significance of $R_{63a}$ being

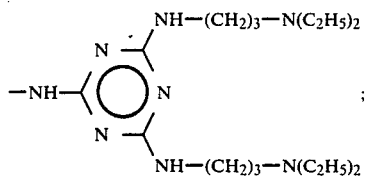

any p in $Z_2$ or $Z_3$ group is preferably 2 or 3; any $Z_2$ group is preferably $Z_3$; and $Me_c$ is preferably copper.

Each preference is independent of the others and may be combined with one or more of the others.

The preferred 1:2 metal complexes of formulae IVi, IVj, IVl and IVm are symmetrical, i.e., the two metal-free azo compounds are the same.

In each formula, when a particular variable appears or may appear more than once (for example, $R_t$ in formula I and $R_{12}$ and q in $X_{35}$), its significances may be the same or different, unless otherwise indicated, but are preferably the same, again unless otherwise indicated.

As used in this application, the terms "compound", "dyestuff" and "dye" are synonomous and, except where the contrary is indicated, embrace metal-free compounds and 1:1 and 1:2 metal complexes with the further exception that the terms "dye and "dyestuff" embrace mixtures of compounds as well as single compounds. Thus, as utilized herein, the terms "a 1:1 metal complex of a dye of the formula . . . " and "a 1:2 metal complex of a dye of the formula . . . " embrace metal complexes of a single compound of the indicated formula and metal complexes of a mixture of two or more compounds of the indicated formula.

The entire specification of parent application Ser. No. 261,318 (including the claims), especially pages 1–67 and 111–131, is hereby incorporated by reference as if it were set forth in its entirety.

The azo compounds of formula I in metal-free form can be prepared by coupling a diazotised amine of formula γ

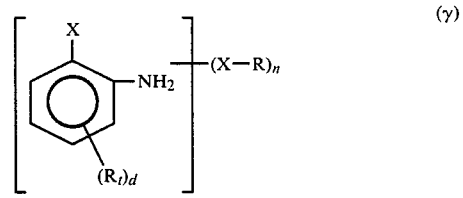

with a coupling component of formula δ

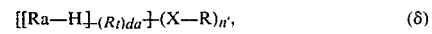

where n' and da have the significances of n and d above, with the proviso that n+n' is 0 or 1 and d+da is not greater than 2 and, in the case of the metal complexes, metallising with a metal capable of forming a 1:1 or 1:2 metal complex or capable of forming both a 1:1 and 1:2 metal complex. For example, the azo compounds of formula I in metal-free form can be formed by diazotising a corresponding arylamine and coupling with the requisite coupling component by conventional methods.

The azo compounds of formula I in 1:1 metal complex form may be prepared by metallising compounds of formula I in metal-free form with a metal selected from copper, cobalt, iron, nickel, manganese, chromium and zinc.

The azo compounds of formula I in 1:2 metal complex form may be prepared by metallising compounds of formula I in metal-free form with a metal selected from chromium, nickel, cobalt and iron.

A further method for the preparation of an azo compound of formula I in 1:2 metal complex form is bonding an azo compound of formula I in metal-free form with an azo compound 1:1 metal complex when the metal is chromium, nickel, cobalt or iron.

The metallisation process to form a 1:1 metal complex is advantageously carried out by treating 1 mole of azo compound with a metallising agent containing 1 equivalent of metal.

Metallisation is carried out by known methods, advantageously in aqueous medium or a mixture of water and a water-miscible organic solvent, for example acetone, lower alkyl alcohols, dimethylformamide, formamide, glycols or acetic acid at a pH range from 1.0 to 8.0, preferably pH 2 to 7. The metallisation process may be carried out at a temperature from room temperature to the boiling point of the reaction medium.

Alternatively, metallisation may be effected in a wholly organic medium (for example dimethylformamide). Advantageously, for instance, cobaltisation may be carried out in the presence of an inorganic nitrite such as lithium, sodium, ammonium or potassium nitrate in the ratio of 2 to 6 moles of nitrite per gram atom of cobalt.

Suitable cobalt-yielding compounds are, for example, cobalt (II) and Co (III) sulphate, acetate, formate and chloride.

Copper-yielding compounds are, for example, cupric sulphate, cupric formate, cupric acetate and cupric chloride.

The nickel-yielding compounds are Ni (II) and Ni-(III) compounds, such as nickel formate, nickel acetate and nickel sulphate.

Preferred manganese-yielding compounds are Mn (II) compounds and iron-yielding compounds are Fe (II) and Fe (III) compounds. Examples of these and zinc-yielding compounds are manganese, iron and zinc formate, acetate and sulphate.

Preferred chromium-yielding compounds are Cr (II) and Cr(III) formate, acetate and sulphate.

The starting compounds of formulae $\gamma$ and $\delta$ are for the most part known or can be prepared according to known methods.

The coupling can be carried out according to known methods. Advantageously, coupling is carried out in aqueous, acid, neutral or alkali medium at a temperature from $-10°$ C. to room temperature, if necessary in the presence of a coupling accelerator such as pyridine or urea. Alternatively, coupling may be effected in a mixture of solvents, for example, water and an organic solvent.

In the compounds of formula I the anions $A^{\ominus}$ can be any non-chromophoric anions such as those conventional in basic dyestuff chemistry. Suitable anions include chloride, bromide, sulphate, bisulphate, methylsulphate, aminosulphonate, perchlorate, benzenesulphonate, oxalate, maleinate, acetate, propionate, lactate, succinate, tartrate, malate, methanesulphonate and benzoate, as well as complex anions, for example, zinc chloride double salts and anions of boric acid, citric acid, glycollic acid, diglycollic acid and adipic acid or of addition products of orthoboric acid with polyalcohols with at least one cis diol group present. These anions can be exchanged for each other by ion exchange resins or by reaction with acids or salts (for example via the hydroxide or bicarbonate or according to German Offenlegungsschrift Nos. 2,001,748 or 2,001,816).

The azo compounds of formula I are suitably worked up into solid or liquid preparations, for example by granulation or by dissolving in a suitable solvent. The compounds of formula I are suitable for dyeing, padding or printing on fibres, threads or textile materials, particularly natural or regenerated cellulose materials for example cotton, synthetic polyamides or synthetic polyesters in which the acid groups have been modified. Such polyamide is described in Belgian Pat. No. 706,104 and such synthetic polyester is described in U.S. Pat. No. 3,379,723.

The compounds of formula I are also used for dyeing, pad-dyeing or printing fibres, threads or textiles produced therefrom which consist of or contain homo- or mixed polymers of acrylonitrile or of asymmetrical dicyanoethylene.

The textile material is dyed, printed or pad-dyed in accordance with known methods. Acid modified-polyamide is dyed particularly advantageously in an aqueous, neutral or acid medium, at temperatures of 60° C. to boiling point or at temperatures above 100° C. under pressure.

The textile material may also be dyed by the compounds of formula I in organic solvents, e.g. in accordance with the directions given in German Offenlegung No. 2,437,549.

Cellulose material is mainly dyed by the exhaust process, e.g. from a long or short bath, at room temperature to boiling temperature, optionally under pressure, whereby the ratio of the bath is from 1:1 to 1:100 and preferably from 1:20 to 1:50. If dyeing is effected from a short bath, then the liquor ratio is 1:5 to 1:15, and the pH of the dyebath varies between 3 and 10. Dyeing preferably takes place in the presence of electrolytes.

Printing may be effected by impregnation with a printing paste produced by known methods.

The dyes of formula I are also suitable for dyeing or printing paper, e.g. for the production of bulk-dyed, sized and unsized paper. The dyestuffs may similarly be used for dyeing paper by the dipping process. The dyeing of paper is effected by known methods.

The dyes of formula I are also suitable for dyeing or printing leather by known methods.

Dyeings with good fastness are obtained on both paper and leather.

Dyeings made with the dyes of formula I on leather have good light fastness properties, good diffusion properties with PVC, good water-, wash- and sweatfastness properties, good fastness to dry cleaning, good fastness to drops of water and good fastness to hard water.

Dyeings made with the dyes of formula I on paper have good build-up, good light fastness, good fastness to water, milk, fruit juice, sweetened mineral water and alcoholic drinks, good fastness to 1% sodium chloride, washing powder solution, good sulphite reductive or oxidative (with hypochlorite) clearance and good fastness to hard water. Dyeings made from mixtures of the new dyestuffs remain tone-in-tone and the nuance stability of dyeings made from the dyestuffs is good.

Further the dyestuffs of formula I do not run after dyeing on paper nor on the whole are they pH sensitive.

The dyes of formula I may be converted into dyeing preparations. The processing into stable liquid or solid dyeing preparations may take place in a generally known manner, advantageously by grinding or granulating or by dissolving in suitable solvents, optionally adding an assistant, e.g. a stabiliser or dissolving intermediary such as urea. Such preparations may be obtained, for example, as described in French Pat. Nos. 1,572,030 and 1,581,900 or in accordance with German Offenlegungsschriften Nos. 2,001,748 and 2,001,816.

Liquid preparations of the compounds of Formula I preferably comprise 10–30% by weight of a compound of formula I and to 30% of a solubilising agent such as urea, lactic acid or acetic acid, the rest of the composition being water. Solid preparations preferably comprise 20–80% dyestuff, 20–80% solubilising agent such as urea or $Na_2SO_4$ and 2–5% water.

In the following examples all parts and percentages given are by weight and the temperatures given are in degrees centigrade, unless indicated to the contrary.

EXAMPLE 1

(a) 27.3 Parts (0.1 mole) of 1-hydroxy-2-aminobenzene-4-sulphonic acid 3-dimethylaminopropylamide is diazotised at 0°–5° in 150 parts of water and 32 parts of 30% hydrochloric acid with 6.9 parts (0.1 mole) sodium nitrite (according to known methods). Over an hour the darkly coloured diazonium solution is added, dropwise, to 18.9 parts (0.1 mole) 1-(4'-aminophenyl)-3-methylpyrazolone-5 dissolved in 105 parts of water and 25 parts of 30% hydrochloric acid. The mixture is slowly brought to a pH of 4.0 by the addition of 30% sodium hydroxide. The dyestuff so produced is of formula (a)

and produces dyeings of a yellow shade.

(b) A strongly acidic solution of the dye of formula (a) is made up with a 30% solution of hydrochloric acid and is then diazotised with 6.9 parts of sodium nitrite according to known methods. Over a period of 15 minutes the solution is added, dropwise, to 32.4 parts (0.1 mole) of 6-hydroxy-4-methyl-1-(3'-dimethylaminopropyl)-3-(pyridinium chloride)pyrid-2-one dissolved in 250 parts of water.

The pH of the solution is then brought to 6.5 using sodium hydroxide solution and the reaction mixture concentrated by evaporation under vacuum. The resultant dyestuff is of formula (b)

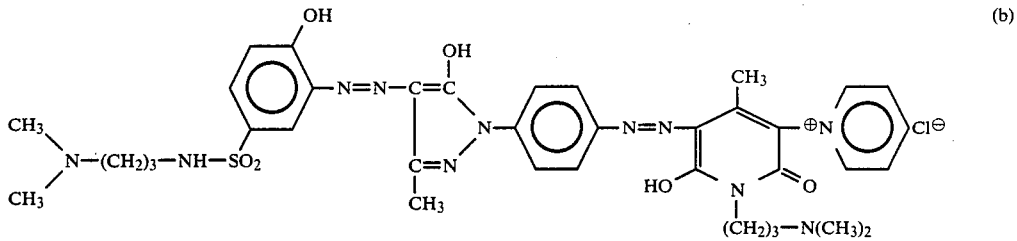

(b)

and dyes leather a red-orange colour.

(c) 40.4 Parts (0.05 mole) of the dye of formula (b) is dissolved in 200 parts of water at 65° C. and the solution is made up with 8 parts of sodium acetate. A solution of 12.5 parts of copper sulphate in water is added, dropwise, to the solution and the resulting solution has a pH of 4.5 to 5. After 30 minutes stirring at 60° C., the reaction mixture is concentrated by evaporation under vacuum. The 1:1 copper complex of formula (c)

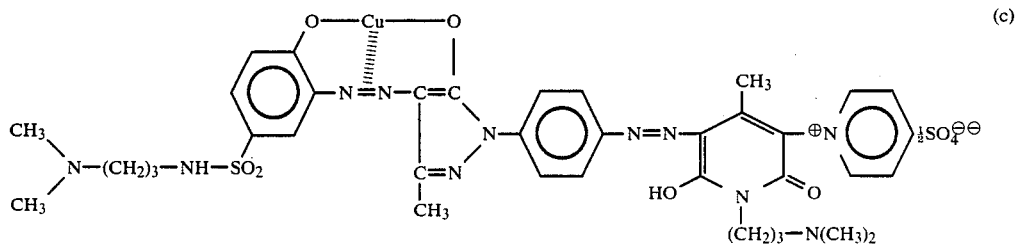

(c)

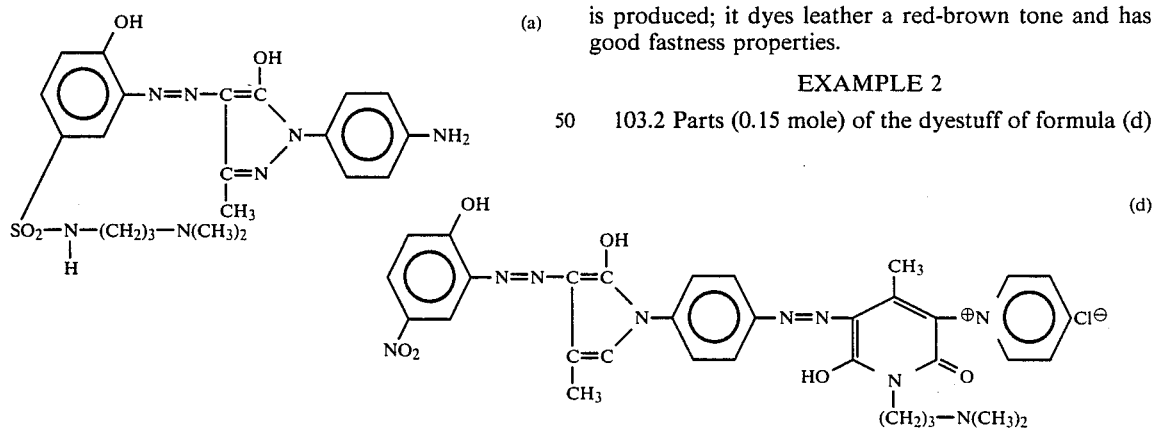

(a)

is produced; it dyes leather a red-brown tone and has good fastness properties.

EXAMPLE 2

103.2 Parts (0.15 mole) of the dyestuff of formula (d)

(d)

and 82.7 parts of $KCr(SO_4)_2.12H_2O$ are autoclaved with 1500 parts of water. The mixture is brought to a pH of 2 by the addition of sulphuric acid. The mixture is heated for 2 hours at a temperature of 130° C. and the 1:1 chromium complex is formed under pressure. The so-formed complex dyes leather a brown shade and has good fastness properties.

EXAMPLE 3

7 Parts of $CoSO_4.7H_2O$ (0.025 mole) and 10.5 parts of sodium nitrite are dissolved in 250 parts of water. At a temperature of 10° C., 17.2 parts (0.025 mole) of the dyestuff of formula (d) is added to the solution. To improve the solubility of the dyestuff, 50 parts of dimethylformamide is added to the reaction mixture. The pH of the reaction solution is brought to 5.0–5.5 by the addition of hydrochloric acid. After about 3 hours, cobaltisation is substantially completed and the 1:1 cobalt complex of the compound of formula (d) is formed and is isolated using acetone.

EXAMPLE 4

40.4 Parts (0.05 mole) of the dyestuff of formula (b) [of Example 1] is dissolved in 500 parts of water. The solution is heated to 60° C. and 35 parts of sodium acetate and 12.5 parts (0.025 mole) of $KCr(SO_4)_2.12H_2O$ are added to the solution. The pH of the reaction mixture is about 4.5. The temperature of the reaction mixture is raised to 90°–95° C. and after 1 hour metallization is substantially completed. The reaction mixture is cooled to 20° C. and the product is isolated in acetone after which it is filtered and dried. The product is the dyestuff of formula (e)

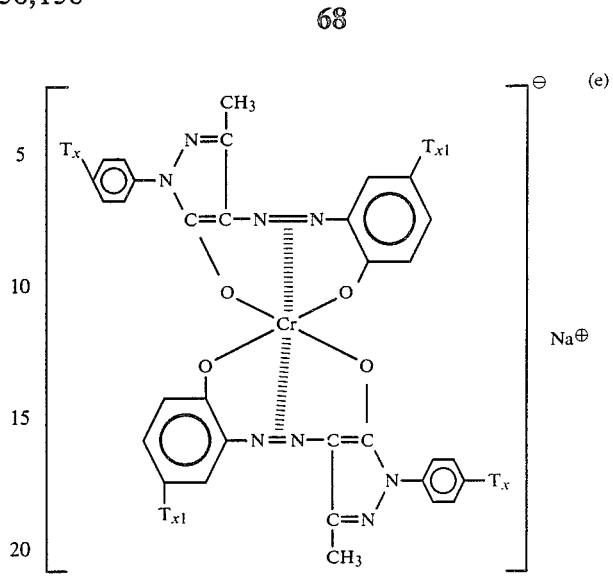

wherein each $T_x$ is

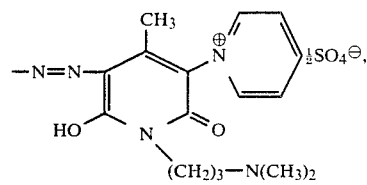

and each $T_{x1}$ is $—SO_2—NH—(CH_2)_3—N(CH_3)_2$.

The dyestuff dyes leather a red-brown colour with good fastness properties.

By substituting 7 parts cobalt sulphate (0.025 mole) or 6.8 parts of $FeCl_3.6H_2O$ (0.025 mole) for 12.5 parts of $KCr(SO_4)_2.12H_2O$ the corresponding 1:2 cobalt and iron complexes, respectively, can be produced.

EXAMPLE 5

According to the method of Example 1(a) and 1(b) and with subsequent cobaltisation (with cobalt sulphate) a complex of formula (f) is produced

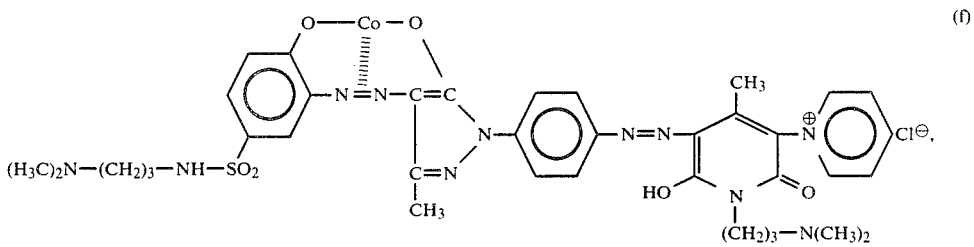

8.3 Parts of the above dyestuff (f) in 150 parts of water is heated to 85° C. 8 Parts of the dyestuff of formula (g) (0.1 mole)

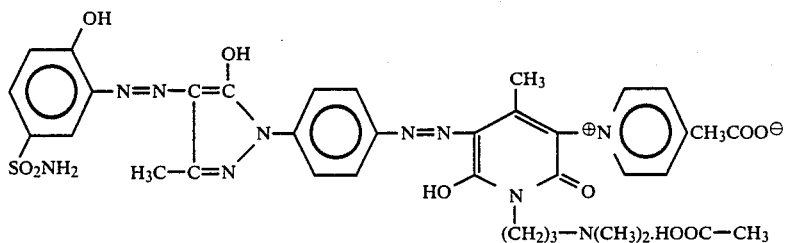

(g)

is added gradually. The pH of the reaction is held at 9 by the addition of aqueous sodium hydroxide solution. After 3 hours an asymmetric 1:2 cobalt complex dyestuff of formula (h)

method of German Offenlegungsschrift No. 1,965,993 and then quaternised with 50 parts of a solution of trimethylamine in water at 40°–45°. The resulting trimethylammonium compound is dissolved at 0°–10° in dilute

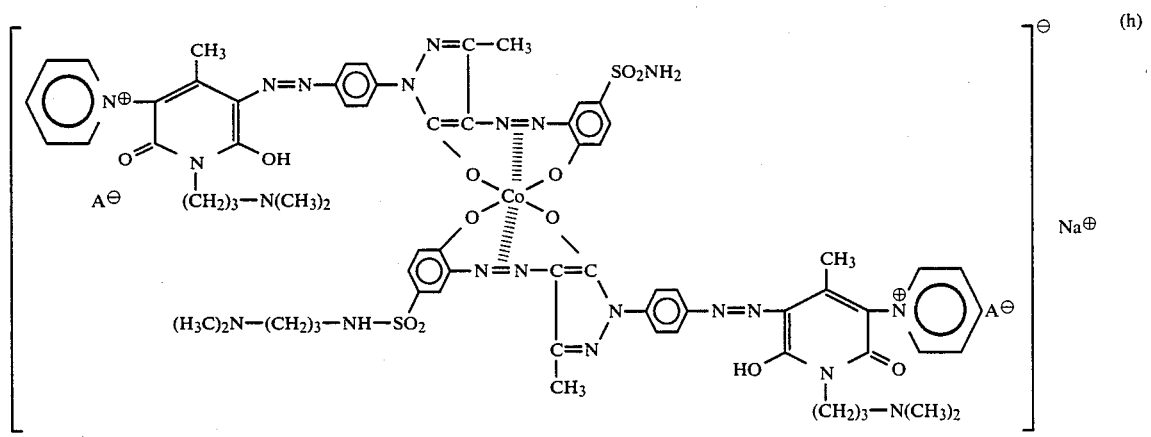

(h)

is produced; it is isolated in acetone, washed and vacuum dried. This dyestuff of formula (h) dyes leather a red-brown colour. The $A^\ominus$'s in formula (h) are a mixture acetate and hydroxide anions; they may be replaced by chloride ions or any other non-chromophoric anions, preferably any of those mentioned in the specification, by conventional means.

EXAMPLE 6 a. 15.4 Parts (0.1 mole) of 1-hydroxy-2-amino-4-nitrobenzene are coupled with 11 parts of resorcinol at pH 8.5–9.5 to give a compound of formula VIa

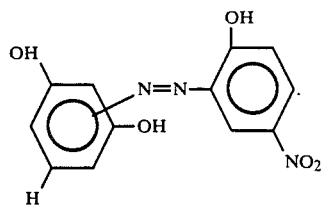

(VIa)

b. 24 Parts (0.1 mole) of 2-(4'-aminophenyl)-6-methylbenzothiazole was chloromethylated according to the hydrochloric acid solution and diazotised with 6.9 parts of sodium nitrite and the dyestuff suspension of the compound of formula VIa is dropwise added. A compound of formula VIb

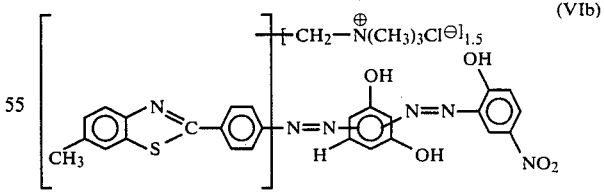

(VIb)

results.

c. 15.4 Parts (0.1 mole) of the dyestuff of formula VIb is dissolved in 500 parts formamide. The solution is warmed to 60°, 35 parts sodium acetate and 35 parts of $KCr(SO_4)_2.12H_2O$ are added and the temperature is raised to 90°–95°. After about 60 minutes metallisation is completed. The reaction mixture is cooled to 20° and is precipitated in acetone to give a 1:2 chromium complex of formula VIc

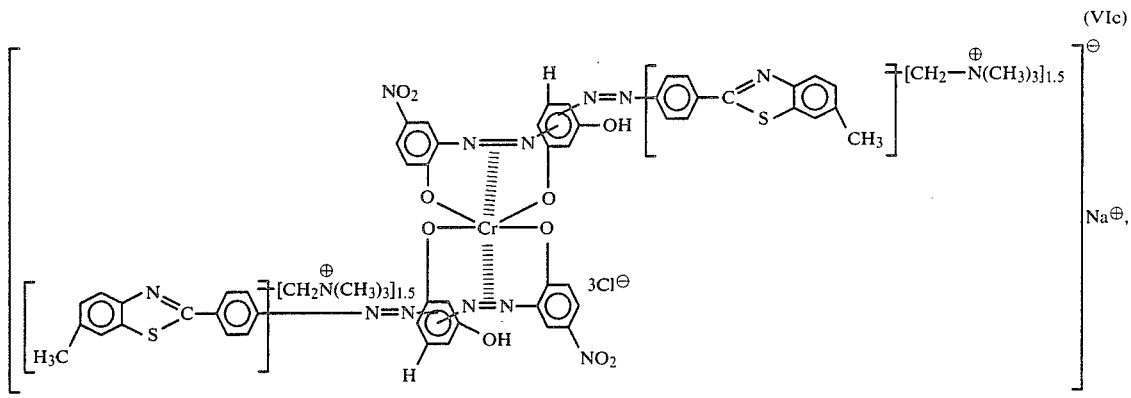
In formula VIc, each metallized azo radical is ortho to the metallized hydroxy group on the resorcinol ring to which it is attached.
In the following Examples
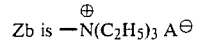
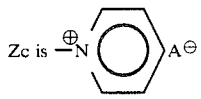
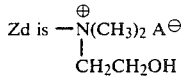
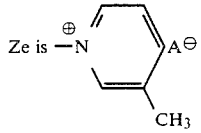
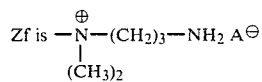
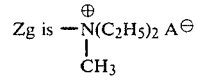
R300 is 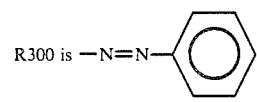
R301 is
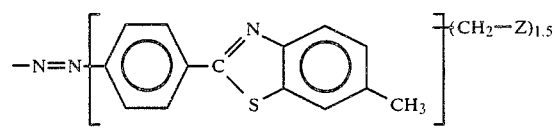
R302 is 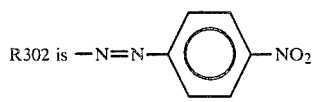
-continued
R303 is
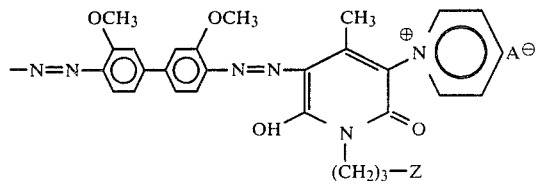
R304 is
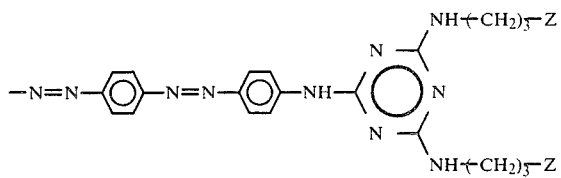
R305 is 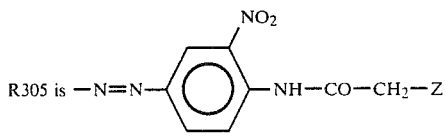
R306 is 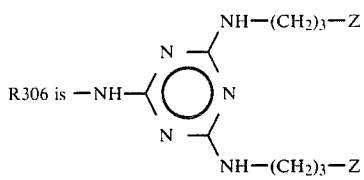
R307 is 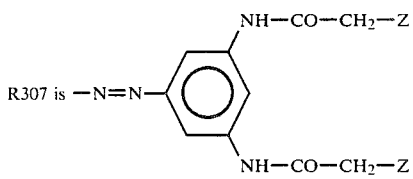
R308 is 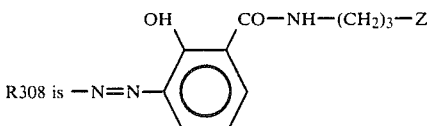

-continued

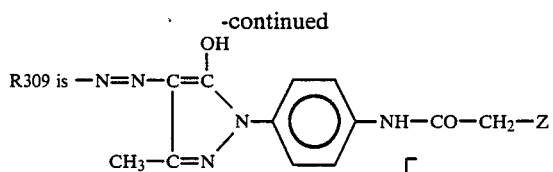

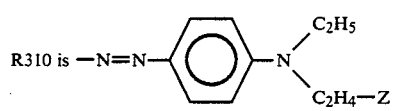

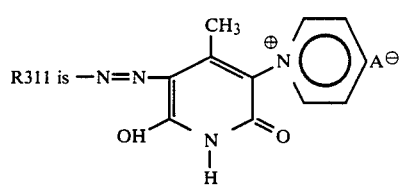

R312 is —NH—CO—CH$_2$—Z

R313 is —SO$_2$—NH—(CH$_2$)$_3$—Z

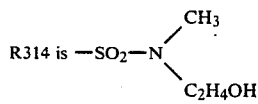

In each of the foregoing, A$^\ominus$ is chloride; however, it may also be any other non-chromophoric anion, especially those mentioned in the specification.

EXAMPLES 7–16

The following Examples are compounds of the formula

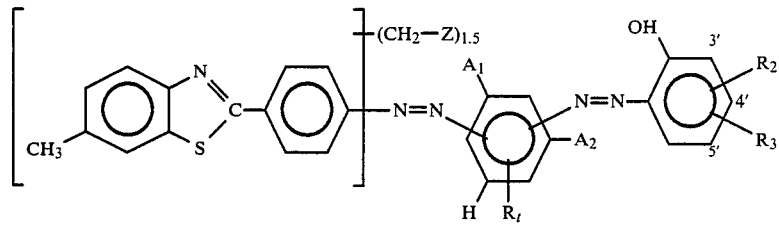

in metal-free or 1:1 or 1:2 metal complex form. These compounds can be prepared according to the method of Example 6 with suitable choice of starting materials. Each Z referred to in a specific Example has the same significance in that Example whenever it appears; the A$^\ominus$ associated with each Z in Examples 7–16 is chloride. However, the chloride ions may be replaced by any other non-chromophoric anions, especially those mentioned in the specification, by conventional means. In each of these examples, the coupling order is: (i) the R$_2$-containing diazonium compound is coupled onto the A$_1$-containing ring at pH 8.5–9. (ii) The 5-methylbenzothiazolylphenyl diazonium compound is coupled onto the product of (i), and, where R$_t$ is other than hydrogen, (iii) the R$_t$ diazonium compound is coupled onto the product of (ii). The same or similar compounds differing with respect to the coupling positions on the A$_1$-containing ring may be obtained by altering the coupling order to (i), (iii), (ii) or (ii), (iii), (i) or (ii), (i), (iii) or (iii), (ii), (i) or (iii), (i), (ii). The cation balancing the negative charge on the complexed metal ion of each 1:2 metal complex is sodium; however, in each case, sodium may be replaced by hydrogen, lithium, potassium or another, preferably monovalent, non-chromophoric cation.

| Ex. No. | R$_t$ | R$_3$ | position of R$_3$ | R$_2$ | position of R$_2$ | Z | A$_1$ | A$_2$ | metal complex |
|---|---|---|---|---|---|---|---|---|---|
| 7 | H | NO$_2$ | 3'- | NO$_2$ | 5'- | Z$_b$ | OH | OH | — |
| 8 | R$_{300}$ | R$_{306}$ | 5'- | H | — | Z$_a$ | NH$_2$ | NH$_2$ | 1:1 Cu |
| 9 | R$_{301}$ | R$_{301}$ | 5'- | H | — | Z$_d$ | NH$_2$ | OH | 1:2 Co |
| 10 | R$_{302}$ | R$_{308}$ | 5'- | H | — | Z$_c$ | OH | NH$_2$ | — |
| 11 | R$_{303}$ | R$_{309}$ | 5'- | H | — | Z$_f$ | OH | OH | 1:1 Cu |
| 12 | R$_{304}$ | R$_{310}$ | 4'- | H | — | Z$_g$ | OH | OH | 1:2 Fe |
| 13 | R$_{305}$ | R$_{311}$ | 3'- | —SO$_2$NH$_2$ | 5'- | Z$_b$ | OH | NH$_2$ | — |
| 14 | R$_{300}$ | R$_{312}$ | 3'- | R$_{314}$ | 5'- | Z$_a$ | NH$_2$ | OH | 1:1 Cu |
| 15 | H | R$_{313}$ | 5'- | R$_{316}$ | 4'- | Z$_c$ | OH | NH$_2$ | 1:2 Fe |
| 16 | H | H | — | —SO$_2$N(CH$_3$)$_2$ | 5'- | Z$_d$ | OH | OH | — |

EXAMPLES 17–43

The following Examples are of compounds of the formula

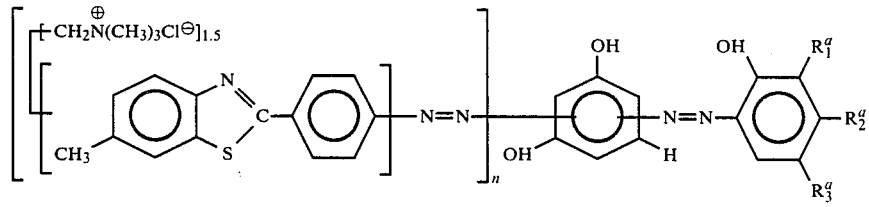

in metal-free or 1:1 or 1:2 metal complex form.

| Example No. | n | $R_1^a$ | $R_2^a$ | $R_3^a$ | metal complex |
|---|---|---|---|---|---|
| 17 | 1 | H | $NO_2$ | H | — |
| 18 | 1 | H | $NO_2$ | H | 1:1 Cu |
| 19 | 1 | H | $NO_2$ | H | 1:2 Cr |
| 20 | 1 | H | $NO_2$ | H | 1:2 Co |
| 21 | 1 | H | H | $NO_2$ | 1:1 Cu |
| 22 | 1 | H | H | $-SO_2NH_2$ | — |
| 23 | 1 | H | H | H | — |
| 24 | 1 | H | H | H | 1:1 Cu |
| 25 | 1 | H | H | H | 1:2 Cr |
| 26 | 1 | $NO_2$ | H | $NO_2$ | — |
| 27 | 1 | $NO_2$ | H | $NO_2$ | 1:1 Cu |
| 28 | 1 | $NO_2$ | H | $NO_2$ | 1:2 Cr |
| 29 | 1 | H | H | $-SO_2NH_2$ | 1:1 Cu |
| 30 | 1 | H | H | $-SO_2NH_2$ | 1:2 Cr |
| 31 | 1 | H | H | $-SO_2NH_2$ | 1:2 Co |
| 32 | 2 | H | $NO_2$ | H | 1:1 Cu |
| 33 | 2 | H | $NO_2$ | H | 1:2 Fe |
| 34 | 2 | H | H | $NO_2$ | — |
| 35 | 2 | $NO_2$ | H | $NO_2$ | 1:1 Cu |
| 36 | 2 | $NO_2$ | H | $NO_2$ | 1:2 Cr |
| 37 | 2 | $NO_2$ | H | $NO_2$ | 1:2 Co |
| 38 | 2 | $NO_2$ | H | $NO_2$ | 1:2 Fe |
| 39 | 1 | H | H | $-SO_2N(H)-(CH_2)_3-N(CH_3)(CH_3)$ | — |
| 40 | 1 | H | H | " | 1:1 Cu |
| 41 | 1 | H | H | " | 1:2 Co |
| 42 | 1 | H | H | $-SO_2N(H)-(CH_2)_2OH$ | — |
| 43 | 1 | H | H | " | 1:1 Cu |

The $R_{1a}$-containing diazonium compound is first coupled onto resorcinol at a pH of 8.5–9.5. However, the coupling order may be reversed to get the same or similar products differing with respect to the coupling position on the resorcinol ring. The cation balancing the negative charge on the complexed metal ion of each 1:2 metal complex is as set forth above in connection with Examples 7–16. The chloride ions may be replaced by other non-chromophoric anions.

EXAMPLES 44–58

The following Examples are compounds of the formula

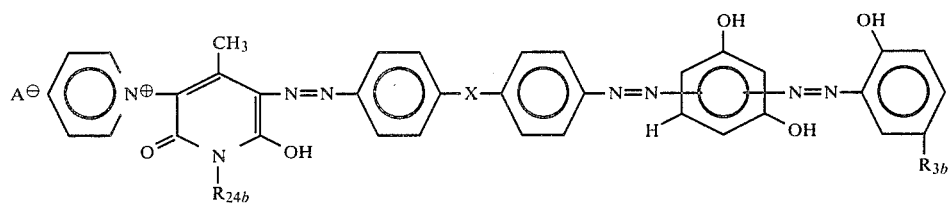

and can be prepared following the methods of Examples 1 and 6 (or Example 5 where 1:2 metallisation has been carried out), with suitable choice of starting materials. First, the $R_{3b}$-containing diazonium compound is coupled onto resorcinol at a pH of 8.5–9.5. Second, the X-containing diazonium compound is coupled onto the pyridone group. Third, the product of the second step is coupled onto the product of the first step, preferably at a pH of 5–6. The same or similar products differing with respect to the coupling position on the resorcinol ring may be obtained by first coupling the X-containing diazonium compound onto the pyridone ring, then coupling this product onto resorcinol, and then coupling the $R_{3b}$-containing diazonium compound onto the resulting product. $A^\ominus$ is chloride in each of these examples, but the chloride ion may be replaced by any other non-chromophoric anion, especially those mentioned in the specification, by conventional means. The cation balancing the negative charge on the complexed metal ion of each 1:2 metal complex is as set forth above in connection with Examples 7–16.

In these Examples $R_{317}$ is $-NH-\underset{N}{\overset{N}{\underset{=}{\bigcirc}}}\begin{matrix}NH-(CH_2)_3N(C_2H_5)_2\\ \\ NH-(CH_2)_3N(C_2H_5)_2\end{matrix}$ $R_{400}$ is $-SO_2-NH-(CH_2)_3-N(CH_3)_2$

| Example No. | $R_{24b}$ | X | $R_{3b}$ | metal complex |
|---|---|---|---|---|
| 44 | $-(CH_2)_3N(CH_3)_2$ | $-C(=O)-N(H)-$ | $R_{317}$ | — |
| 45 | " | " | " | 1:1 Cu |
| 46 | " | " | " | 1:2 Cr |
| 47 | H | " | " | 1:2 Fe |
| 48 | " | " | " | 1:1 Cu |
| 49 | " | " | " | 1:2 Cr |
| 50 | $-(CH_2)_3N(CH_3)_2$ | " | $R_{400}$ | — |
| 51 | H | $-SO_2NH-$ | $R_{317}$ | — |
| 52 | " | " | " | 1:1 Cu |
| 53 | " | " | " | 1:2 Fe |
| 54 | $-(CH_2)_3N(CH_3)_2$ | " | " | — |
| 55 | " | " | " | 1:1 Cu |
| 56 | " | " | $R_{400}$ | — |
| 57 | " | " | " | 1:1 Cu |
| 58 | " | " | " | 1:2 Fe |

EXAMPLES 59–72

The following Examples are compounds of the formula

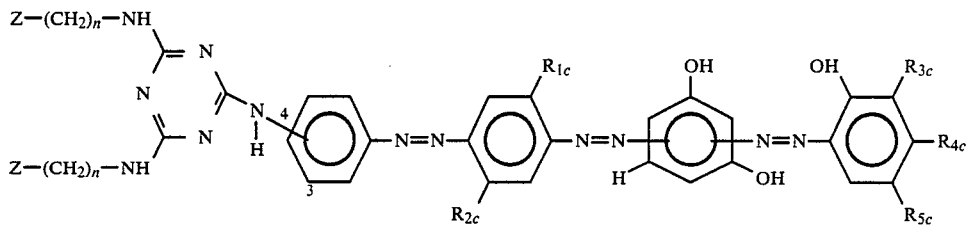

which can be made according to Examples 1 and 6, or where 1:2 metallisation is necessary, according to Example 5 using a suitable choice of starting materials. The coupling order is: (i) The triazinyl-containing diazonium compound is coupled onto the $R_{1c}$-containing ring. (ii) The product of (i) is coupled onto resorcinol. (iii) The $R_{3c}$-containing diazonium compound is coupled onto the product of (ii). The same or similar compounds differing with respect to the coupling position on the resorcinol ring may be synthesized by reversing (ii) and (iii).

-continued $K_{13}$ is 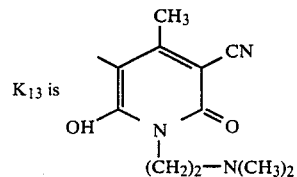

| Ex. No. | Z | position of triazinyl-amino group | $R_{1c}$ | $R_{2c}$ | $R_{3c}$ | $R_{4c}$ | $R_{5c}$ | metal complex | n |
|---|---|---|---|---|---|---|---|---|---|
| 59A,B | $Z_B$ | 4 | OCH$_3$ | OCH$_3$ | H | H | NO$_2$ | — | 2,3 |
| 60A,B | $Z_A$ | 4 | " | " | " | " | " | 1:1 Cu | 2,3 |
| 61A,B | $Z_A$ | 4 | " | " | " | " | " | 1:2 Cr | 2,3 |
| 62A,B | $Z_B$ | 4 | CH$_3$ | CH$_3$ | " | " | " | — | 2,3 |
| 63A,B | $Z_A$ | 4 | " | " | " | " | " | 1:1 Cu | 2,3 |
| 64A,B | $Z_A$ | 4 | " | " | " | " | " | 1:2 Co | 2,3 |
| 65A,B | $Z_B$ | 4 | OCH$_3$ | " | " | " | " | 1:1 Cu | 2,3 |
| 66A,B | $Z_A$ | 3 | CH$_3$ | " | NO$_2$ | " | " | — | 2,3 |
| 67A,B | $Z_B$ | 3 | " | " | " | " | " | 1:1 Cu | 2,3 |
| 68A,B | $Z_A$ | 3 | " | " | " | " | " | 1:2 Cr | 2,3 |
| 69A,B | $Z_B$ | 4 | " | " | H | " | —SO$_2$NH$_2$ - | — | 2,3 |
| 70A,B | $Z_B$ | 4 | OCH$_3$ | OCH$_3$ | NO$_2$ | " | NO$_2$ | — | 2,3 |
| 71A,B | $Z_A$ | 4 | " | " | " | " | " | 1:1 Cu | 2,3 |
| 72A,B | $Z_A$ | 4 | " | " | " | " | " | 1:2 Cr | 2,3 | n is 2 in Examples 59A–72A and 3 in Examples 59B–72B. $Z_A$ is —N(C$_2$H$_5$)$_2$ and $Z_B$ is —N(CH$_3$)$_2$. The cation balancing the negative charge on the complexed metal ion of each 1:2 metal complex is as set forth above in connection with Examples 7–16.

$K_{10}$ is 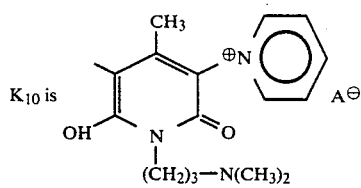

$K_{11}$ is 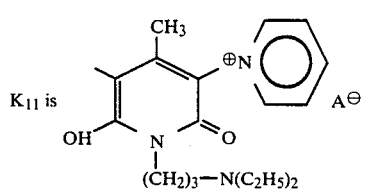

$K_{12}$ is 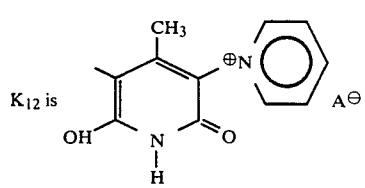

$K_{14}$ is 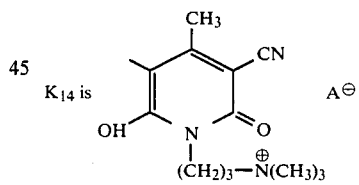

$K_{15}$ is 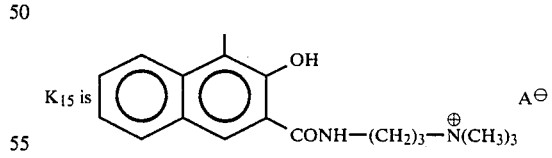

$K_{16}$ is 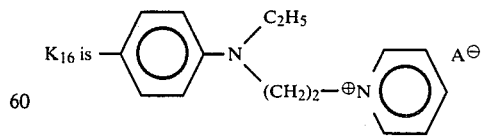

$K_{17}$ is 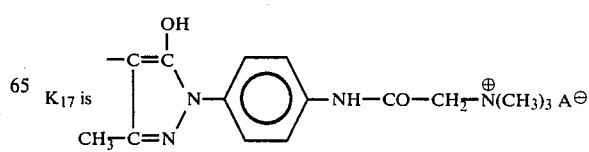

$K_{18}$ is 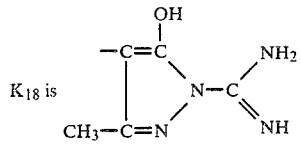

$K_{19}$ is $CH_3—CO—\overset{|}{C}H—CO—NH—CH_2—\overset{\oplus}{N}(CH_3)_3 \ A^{\ominus}$

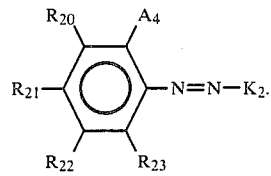

They may be synthesized by the methods of Examples 1–6.

| Example No. | $R_{20}$ | $R_{21}$ | $R_{22}$ | $R_{23}$ | $K_2$ | metal complex | $A_4$ |
|---|---|---|---|---|---|---|---|
| 73 | H | H | H | H | $K_{10}$ | — | OH |
| 74 | $NO_2$ | H | $—SO_2NH_2$ | H | $K_{11}$ | 1:1 Cu | OH |
| 75 | H | $R_{317}$ | H | H | $K_{12}$ | 1:2 Co | $OCH_3$ (hydrolyzed to OH during metallization) |
| 76 | H | $R_{318}$ | H | H | $K_{13}$ | — | COOH |
| 77 | H | $R_{319}$ | $R_{320}$ | H | $K_{14}$ | 1:1 Cu | OH |
| 78 | H | $R_{320}$ | $R_{319}$ | H | $K_{15}$ | 1:2 Fe | OH |
| 79 | H | $R_{321}$ | H | H | $K_{16}$ | — | OH |
| 80 | H | H | $R_{321}$ | H | $K_{17}$ | 1:1 Cu | OH |
| 81 | H | $R_{322}$ | H | $—CH_3$ | $K_{18}$ | — | OH |
| 82 | H | $R_{320}$ | H | H | $K_{19}$ | 1:1 Cu | OH |
| 83 | H | H | $R_{320}$ | H | $K_{20}$ | 1:2 Cr | OH |

$K_{20}$ is 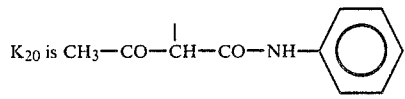

$R_{317}$ is 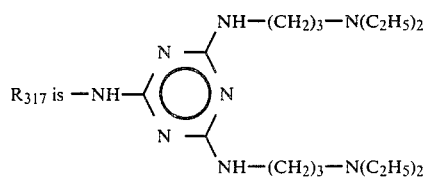

$R_{318}$ is $—SO_2—NH—(CH_2)_3—\overset{\oplus}{N}(C_2H_5)_3 \ A^{\ominus}$ $R_{319}$ is $—CO—NH—(CH_2)_3—\overset{\oplus}{N}(CH_3)_3 \ A^{\ominus}$ $R_{320}$ is $—NH—CO—(CH_2)_2—\overset{\oplus}{\underset{|}{N}}(CH_3)_2 \ A^{\ominus}$
$\phantom{R_{320} is —NH—CO—(CH_2)_2—}C_2H_4OH$ $R_{321}$ is 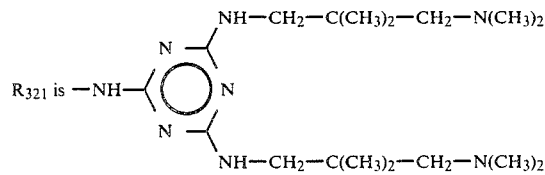

$R_{322}$ is $—CH_2—\overset{\oplus}{N}(CH_3)_3 \ A^{\ominus}$ $R_{323}$ is $—NH—CO—CH_2—N(CH_3)_2$ In each of the foregoing $A^{\ominus}$ is chloride. However, it may also be any other non-chromophoric anion, especially those mentioned in the specification.

EXAMPLES 73–83

The following Examples are compounds of formula III

The cation balancing the negative charge on the complexed metal ion of each 1:2 metal complex is as set forth above in connection with Examples 7–16.

EXAMPLES 84–103

The following Examples are compounds of the formula

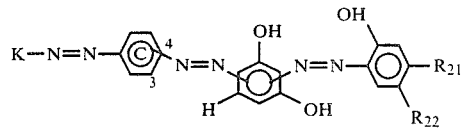

which may be prepared by following the method of Examples 1 and 6 (or, where 1:2 metallisation is carried out, Example 5) with suitable choice of starting materials. The coupling order is: (i) The $R_{21}$-containing diazonium compound is coupled onto resorcinol at pH 8–9.5. (ii) Ring C is coupled onto K. (iii) The product of (ii) is coupled onto the product of (i). The same or similar compounds differing with respect to the coupling position on the resorcinol ring may be obtained by coupling the product of (ii) onto resorcinol and then coupling the $R_{21}$-containing diazonium compound onto the obtained product.

| Example No. | K | position of N=N bridge on ring C | $R_{21}$ | $R_{22}$ | metal complex |
|---|---|---|---|---|---|
| 84 | $K_{12}$ | 4 | H | $R_{317}$ | — |
| 85 | $K_{12}$ | 4 | H | $R_{317}$ | 1:1 Cu |
| 86 | $K_{12}$ | 4 | H | $R_{318}$ | — |
| 87 | $K_{12}$ | 4 | H | $R_{318}$ | 1:1 Cu |
| 88 | $K_{10}$ | 4 | H | $NO_2$ | 1:2 Cr |
| 89 | $K_{10}$ | 4 | H | $NO_2$ | 1:2 Cr |
| 90 | $K_{10}$ | 4 | $NO_2$ | H | 1:2 Co |
| 91 | $K_{10}$ | 4 | H | $—SO_2NH_2$ | 1:1 Cu |
| 92 | $K_{10}$ | 3 | H | $NO_2$ | 1:2 Fe |
| 93 | $K_{10}$ | 3 | $NO_2$ | H | 1:2 Fe |
| 94 | $K_{12}$ | 4 | $R_{321}$ | H | — |
| 95 | $K_{12}$ | 4 | $R_{323}$ | H | 1:2 Cr |
| 96 | $K_{12}$ | 3 | $R_{318}$ | H | 1:2 Co |
| 97 | $K_{12}$ | 3 | $R_{318}$ | H | 1:1 Cu |

-continued

| Example No. | K | position of N=N bridge on ring C | R$_{21}$ | R$_{22}$ | metal complex |
|---|---|---|---|---|---|
| 98 | K$_{10}$ | 4 | NO$_2$ | H | — |
| 99 | K$_{10}$ | 4 | H | NO$_2$ | 1:2 Fe |
| 100 | K$_{10}$ | 4 | —SO$_2$NH$_2$ | H | — |
| 101 | K$_{12}$ | 3 | —SO$_2$NH$_2$ | H | — |
| 102 | K$_{10}$ | 3 | R$_{318}$ | H | — |
| 103 | K$_{11}$ | 3 | H | NO$_2$ | — |

The cation balancing the negative charge on the complexed metal ion of each 1:2 metal complex is as set forth above in connection with Examples 7–16.

EXAMPLES 104–129

The following Examples are of the formula

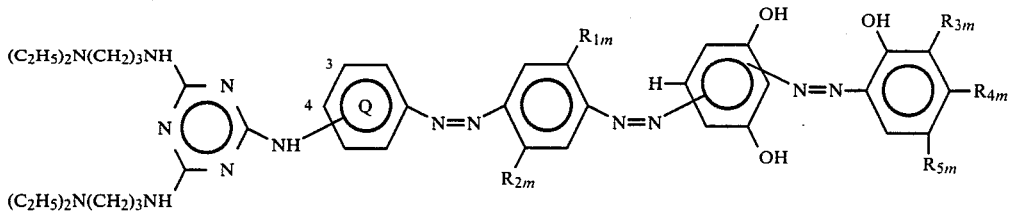

These compounds can be made by following the method of Examples 1 and 6 (or, where 1:2 metallization is carried out, Example 5) using suitable choice of starting materials. The coupling order is: (i) The ring Q diazonium compound is coupled onto the R$_{1m}$-containing ring. (ii) The product of (i) is coupled onto resorcinol. (iii) The R$_{3m}$-containing diazonium compound is coupled onto the product of (ii). The same or similar compounds differing with respect to the coupling position on the resorcinol ring may be obtained by first coupling the R$_{3m}$-containing diazonium compound onto resorcinol and then coupling the product of (i) onto the thus obtained product.

| Example No. | position on ring Q | R$_{1m}$ | R$_{2m}$ | R$_{3m}$ | R$_{4m}$ | R$_{5m}$ | metal complex |
|---|---|---|---|---|---|---|---|
| 104 | 3 | CH$_3$ | CH$_3$ | H | H | NO$_2$ | — |
| 105 | 3 | " | " | " | " | —SO$_2$NH$_2$ | — |
| 106 | 4 | OCH$_3$ | " | " | " | NO$_2$ | 1:1 Cu |
| 107 | 4 | CH$_3$ | " | NO$_2$ | " | " | 1:1 Cu |
| 108 | 4 | " | " | " | " | " | 1:2 Co |
| 109 | 4 | " | " | " | " | " | 1:2 Fe |
| 110 | 3 | " | " | H | " | " | 1:2 Fe |
| 111 | 4 | " | " | " | " | —SO$_2$NH$_2$ | 1:2 Fe |
| 112 | 3 | " | " | " | " | " | 1:2 Fe |
| 113 | 3 | " | " | " | " | " | 1:2 Co |

The cation balancing the negative charge on the complexed metal ion of each 1:2 metal complex is as set forth above in connection with Examples 7–16.

The following Examples are of the formula

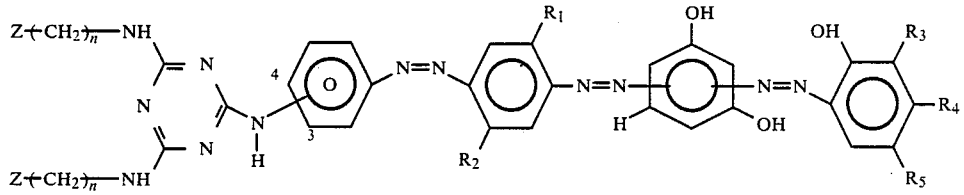

in which Z$_1$ is —N(C$_2$H$_5$)$_2$ and Z$_2$ is —N(CH$_3$)$_2$.

These compounds can be made by following the methods of Examples 1 and 6 (or, where 1:2 metallization occurs, Example 5) using a suitable choice of starting materials. The coupling order and alternate coupling order are the same as indicated for Examples 104–113.

| Example No. | | Z | n | position of triazinylamine group on Ring Q | R$_1$ | R$_2$ | R$_3$ | R$_4$ | R$_5$ | metal complex |
|---|---|---|---|---|---|---|---|---|---|---|
| 114 | | Z$_1$ | 2 | 4 | OCH$_3$ | OCH$_3$ | H | H | NO$_2$ | — |
| 115 | | Z$_2$ | 3 | 4 | " | " | " | " | " | 1:1 Cu |
| 116 | | Z$_1$ | 2 | 4 | " | " | " | " | " | 1:2 Fe |
| 117 | | Z$_2$ | 2 | 4 | CH$_3$ | CH$_3$ | " | " | " | 1:2 Fe |
| 118 | A | Z$_1$ | 2 | 4 | " | " | NO$_2$ | " | " | 1:2 Fe |
|  | B | Z$_2$ | | | | | | | | |
| 119 | A | Z$_1$ | 3 | 4 | " | " | " | " | " | 1:1 Cu |
|  | B | Z$_2$ | | | | | | | | |
| 120 | A | Z$_1$ | 2 | 4 | " | " | " | " | " | 1:2 Cr |
|  | B | Z$_2$ | | | | | | | | |
| 121 | A | Z$_1$ | 3 | 3 | " | " | " | " | " | — |
|  | B | Z$_2$ | | | | | | | | |
| 122 | A | Z$_1$ | 2 | 3 | " | " | " | " | " | 1:1 Cu |
|  | B | Z$_2$ | | | | | | | | |
| 123 | A | Z$_1$ | 3 | 3 | " | " | " | " | " | 1:2 Cr |
|  | B | Z$_2$ | | | | | | | | |
| 124 | A | Z$_1$ | 2 | 3 | " | " | " | " | " | 1:2 Fe |
|  | B | Z$_2$ | | | | | | | | |
| 125 | A | Z$_1$ | 2 | 4 | OCH$_3$ | OCH$_3$ | H | " | —SO$_2$NH$_2$ | — |

-continued

| Example No. | | Z | n | position of triazinylamine group on Ring Q | $R_1$ | $R_2$ | $R_3$ | $R_4$ | $R_5$ | metal complex |
|---|---|---|---|---|---|---|---|---|---|---|
| | B | $Z_2$ | | | | | | | | |
| 126 | A | $Z_1$ | 3 | 4 | " | " | " | " | " | 1:2 Fe |
| | B | $Z_2$ | | | | | | | | |
| 127 | A | $Z_1$ | 2 | 4 | " | " | " | " | $-SO_2-NH-(CH_2)_3-N(CH_3)_2$ | 1:2 Fe |
| | B | $Z_2$ | | | | | | | | |
| 128 | A | $Z_1$ | 3 | 4 | " | " | " | " | $-SO_2NH_2$ | 1:2 Fe |
| | B | $Z_2$ | | | | | | | | |
| 129 | A | $Z_1$ | 2 | 3 | " | " | " | " | $-SO_2-NH-(CH_2)_3-N(CH_3)_2$ | 1:2 Fe |
| | B | $Z_2$ | | | | | | | | |

The cation balancing the negative charge on the complexed metal ion of each 1:2 metal complex is as set forth above in connection with Examples 7–16.

and can be prepared by following the methods of Examples 1 and 6 (or, where 1:2 metallisation is carried out, Example 5) using a suitable choice of starting materials.

EXAMPLES 130–160

The following Examples are of the formula

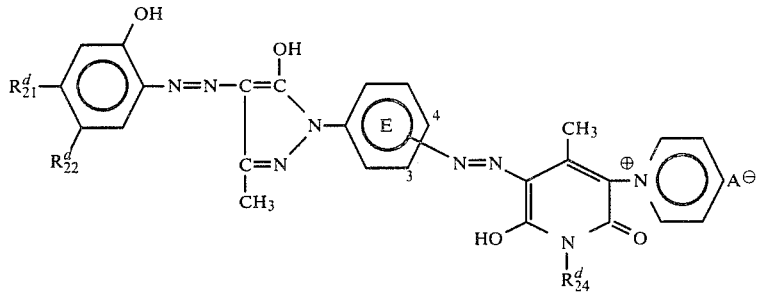

| Ex. No. | $R_{21}^d$ | $R_{22}^d$ | $R_{24}^d$ | substitution position on ring E | metal complex |
|---|---|---|---|---|---|
| 130 | H | H | $-(CH_2)_3-N(CH_3)_2$ | 4 | — |
| 131 | " | " | " | 4 | 1:1 Cu |
| 132 | " | " | " | 4 | 1:2 Fe |
| 133 | " | $-SO_2-N(H)-(CH_2)_3-N(CH_3)_2$ | H | 4 | — |
| 134 | " | " | " | 4 | 1:1 Cu |
| 135 | " | " | " | 4 | 1:2 Fe |
| 136 | " | $NO_2$ | $-(CH_2)_3-N(CH_3)_2$ | 4 | — |
| 137 | " | " | " | 4 | 1:1 Cu |
| 138 | " | " | " | 4 | 1:2 Cr |
| 139 | " | " | " | 4 | 1:2 Fe |
| 140 | $NO_2$ | H | " | 4 | — |
| 141 | " | " | " | 4 | 1:2 Fe |
| 142 | H | $-SO_2N(H)(CH_2)_3N(CH_3)_2$ | " | 3 | — |
| 143 | " | " | " | 3 | 1:1 Cu |
| 144 | " | " | H | 3 | — |
| 145 | " | " | " | 3 | 1:1 Cu |
| 146 | " | " | " | 3 | 1:2 Fe |

-continued

| Ex. No. | $R_{21}{}^d$ | $R_{22}{}^d$ | $R_{24}{}^d$ | substitution position on ring E | metal complex |
|---|---|---|---|---|---|
| 147 | " | H, (H$_5$C$_2$)$_2$N(CH$_2$)$_3$N—, (H$_5$C$_2$)$_2$N(CH$_2$)$_3$NH— triazine with —NH— | " | 3 | — |
| 148 | " | " | " | 3 | 1:1 Cu |
| 149 | " | " | " | 3 | 1:2 Cr |
| 150 | " | NO$_2$ | —(CH$_2$)$_3$N(CH$_3$)$_2$ | 3 | — |
| 151 | " | " | " | 3 | 1:1 Cu |
| 152 | " | " | " | 3 | 1:2 Co |
| 153 | " | " | " | 3 | 1:2 Fe |
| 154 | " | —SO$_2$NH$_2$ | " | 3 | 1:2 Fe |
| 155 | NO$_2$ | H | " | 3 | 1:1 Cu |
| 156 | " | " | " | 3 | 1:2 Co |
| 157 | " | " | " | 3 | 1:2 Fe |
| 158 | H | NO$_2$ | " | 4 | 1:1 Co |
| 159 | " | " | " | 4 | 1:1 Cr |
| 159A | NO$_2$ | H | " | 4 | 1:2 Cr |

EXAMPLE 160

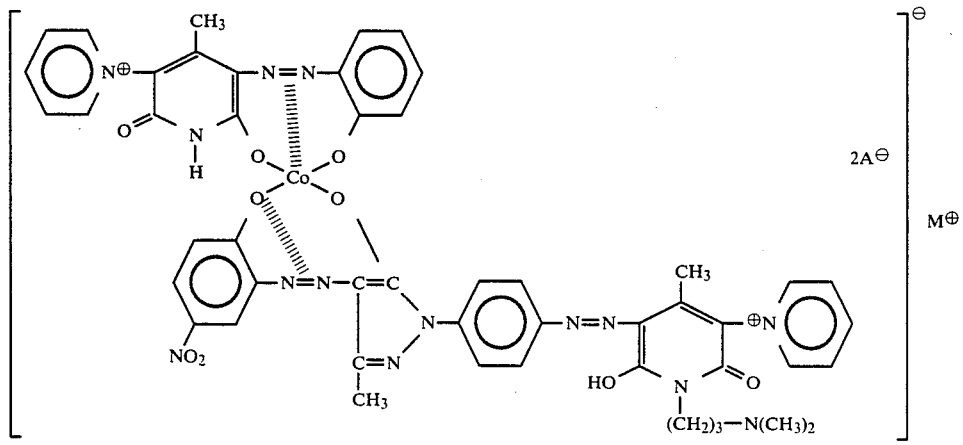

In Examples 130–160, each A$^\ominus$ is chloride; however, it may also be any other non-chromophoric anion, preferably any of those mentioned in the specification. The cation balancing the negative charge on the complexed metal ion of each 1:2 metal complex is as set forth above in connection with Examples 7–16.

In the following Examples

Ba is 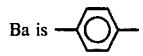

Bb is the group of the formula 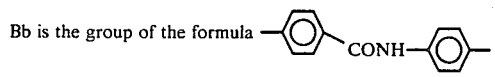

Bc is 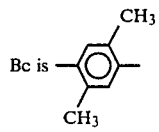

Bd is 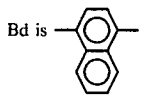

Be is 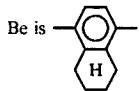

EXAMPLES 161–166

The following Examples of the formula

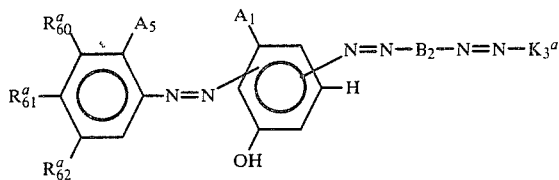

which can be prepared according to Examples 1 and 6 by the suitable choice of starting materials. The coupling order is: (i) The $A_5$-containing diazonium compound is coupled onto the $A_1$-containing ring. (ii) The $B_2$-containing diazonium compound is coupled onto $K_3{}^a$. (iii) The diazotized product of (ii) is coupled onto the product of (i). The same or similar compounds differing with respect to the coupling position on the $A_1$-containing ring may be obtained by coupling the diazotized product of (ii) onto the $A_1$-containing ring and then coupling the $A_5$-containing diazonium compound onto the thus obtained product.

| Example No. | $R_{60}{}^a$ | $R_{61}{}^a$ | $R_{62}{}^a$ | $A_5$ | $A_1$ | $B_2$ | $K_3{}^a$ |
|---|---|---|---|---|---|---|---|
| 161 | H | $NO_2$ | H | OH | OH | $B_a$ | $K_{12}$ |
| 162 | H | $R_{317}$ | $R_{318}$ | COOH | $NH_2$ | $B_b$ | $K_{14}$ |
| 163 | H | $R_{318}$ | $NO_2$ | $OCH_3$ | OH | $B_a$ | $K_{15}$ |
| 164 | $NO_2$ | $R_{320}$ | H | OH | $NH_2$ | $B_b$ | $K_{16}$ |
| 165 | H | $R_{323}$ | $-SO_2NH_2$ | COOH | OH | $B_a$ | $K_{17}$ |
| 166 | H | $R_{322}$ | $-CH_2-N(CH_3)_2$ | OH | $NH_2$ | $B_b$ | $K_{18}$ |

EXAMPLES 167-172

The following Examples are of the formula

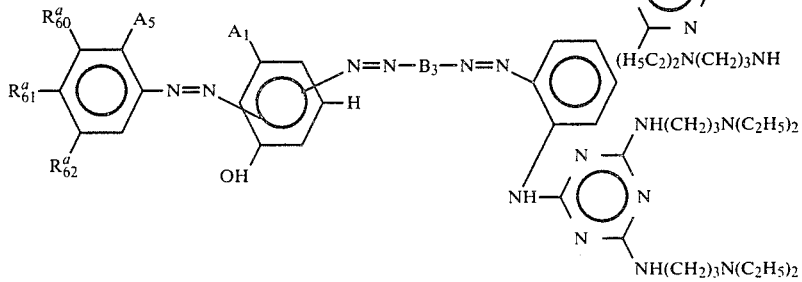

and can be prepared according to Examples 1 and 6 (or, when 1:2 metallisation is carried out, Example 5) by the suitable choice of starting materials. The coupling order and the alternate coupling order are the same as given for Examples 161-166 (the triazinylamino group-containing phenyl ring corresponding to $K_3{}^a$).

| Example No. | $R_{60}{}^a$ | $R_{61}{}^a$ | $R_{62}{}^a$ | $A_5$ | $A_1$ | $B_3$ | metal complex |
|---|---|---|---|---|---|---|---|
| 167 | H | $NO_2$ | H | OH | OH | $B_c$ | — |
| 168 | H | H | $R_{318}$ | COOH | $NH_2$ | $B_d$ | 1:1 Cu |
| 169 | $NO_2$ | $R_{323}$ | H | $OCH_3$ | OH | $B_e$ | 1:2 Fe |
| 170 | $NO_2$ | $R_{322}$ | $NO_2$ | OH | OH | $B_c$ | — |
| 171 | H | $R_{318}$ | $-SO_2NH_2$ | OH | OH | $B_d$ | 1:1 Cu |
| 172 | $NO_2$ | H | $-SO_2NH_2$ | OH | $NH_2$ | $B_e$ | 1:2 Fe |

The cation balancing the negative charge on the complexed metal ion of each 1:2 metal complex is as set forth above in connection with Examples 7-16.

EXAMPLES 173-185

The following compounds can be made according to Example 1 (or, where 1:2 metallisation is carried out, according to Example 5) by suitable choice of starting materials.

EXAMPLE 173

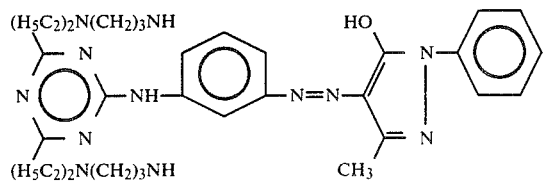

EXAMPLE 174

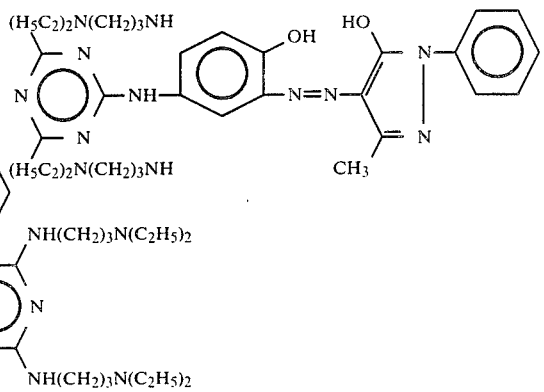

EXAMPLE 175

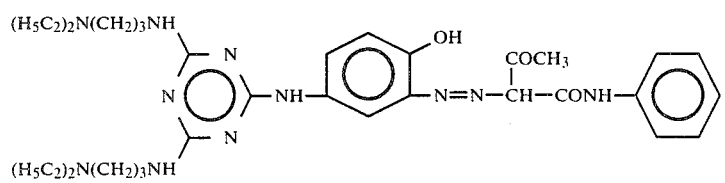

EXAMPLE 176

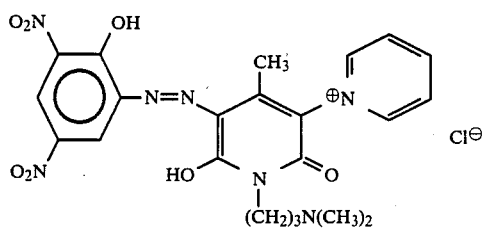

EXAMPLE 177

1:1 Cu-complex from Example 174.

EXAMPLE 178

1:1 Cu-complex from Example 175.

EXAMPLE 179

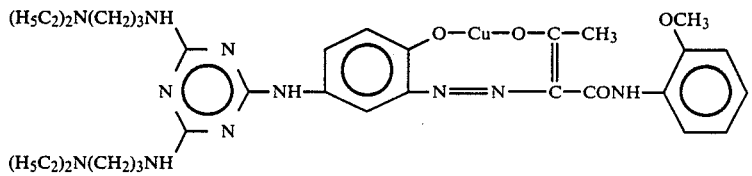

EXAMPLE 180

1:2 Fe-complex from Example 174.

EXAMPLE 181

1:2 Fe-complex from Example 175.

EXAMPLE 182

1:2 Cr-complex from Example 174.

EXAMPLE 183

1:2 Cr-complex from Example 175.

EXAMPLE 184

1:2 Co-complex from Example 174.

EXAMPLE 185

1:2 Co-complex from Example 175.

In Examples 180–185, the cation balancing the negative charge on the complexed metal ion is as set forth above in connection with Examples 7–16. The chloride ion in Example 176 may be replaced by any other non-chromophoric anion, especially those mentioned in the specification.

Each metal-free compound of the foregoing examples may be converted into the corresponding 1:1 copper complex and the corresponding 1:2 iron, chromium and cobalt complexes. The cation balancing the negative charge on the complexed metal ion of each 1:2 metal complex is as set forth above in connection with Examples 7–16.

APPLICATION EXAMPLE A

100 Parts of freshly tanned and neutralised chrome grain leather are soaked in a bath at 55° C. of 250 parts water and 0.5 part of a dyestuff of any one of Examples 1 to 5 for 30 minutes, then treated for 30 minutes in the same bath with 2 parts of an anionic fat liquor based on sulphonated train oil and then dried and finished in conventional manner. The colour of the dyed leather is given below:

| Dyestuff | Colour |
| --- | --- |
| 1:1 copper complex of Example 1 (part c) | red-brown |
| 1:1 chromium complex of Example 2 | brown |
| 1:1 cobalt complex of Example 3 | red |
| 1:2 chromium complex of Example 4 | red-brown |
| 1:2 cobalt complex of Example 4 | red-brown |
| 1:2 iron complex of Example 4 | red-brown |
| 1:2 cobalt complex of Example 5 | red-brown |

Calf suede leather, chrome-vegetable tanned sheep-skin and box cowhide leather can also be dyed by known methods.

APPLICATION EXAMPLE B

70 Parts of a chemically bleached sulphite cellulose (from conifer wood) and 30 parts of a chemically bleached sulphite cellulose (from birch wood) are ground in a Hollander with 2000 parts water. 0.2 Part of any of the dyes listed in Application Example A (the dyes of Examples 1 to 5 above) is added to the mass. After 20 minutes of mixing, paper is produced from the mass. The absorbent paper so produced has the same colour as the leather dyed with the dyestuffs as given in Application Example A above and the backwaters are colourless.

APPLICATION EXAMPLE C 0.5 Part of any of the dyes of Examples 1 to 5 is dissolved in 100 parts of hot water and cooled to room temperature. The solution is added to 100 parts of chemically bleached sulphite cellulose which has been ground in a Hollander with 2000 parts of water. After 15 minutes mixing the mixture is sized. Paper produced from this mass has the same colour as the leather dyed with the dyestuffs as given in Application Example A and is of medium intensity with good wet fastness properties.

APPLICATION EXAMPLE D

An absorbent paper web of unsized paper is drawn through a dyestuff solution of the following constitution:
 0.5 part of a dyestuff of Examples 1 to 5
 0.5 part starch
 99.0 parts of water.

Excess dyestuff solution is squeezed out by pressing between two rollers. The dried paper web has the same colour as the leather dyed with the dyestuffs as given in Application Example A.

Similar good paper dyeings can be obtained by using equivalent quantities of a liquid preparation or a granular preparation of the dyestuff for the pure dyestuff in the above Application Examples A to D.

What is claimed is:

1. A compound of the formula wherein $A_4$ is —OH, —NH$_2$, —COOH, $C_{1-4}$alkoxy or hydrogen, $R_{20}$ is hydrogen or nitro, $R_{21}$ is hydrogen, nitro, —NH—CO—(CH$_2$)$_2$—Z$_2$, —CH$_2$—Z$_2$, —SO$_2$—NH—(CH$_2$)$_s$—Z$_2$, —SO$_2$NH$_2$, —CO—CH$_2$—Z$_2$, —CO—NH—(CH$_2$)$_2$—Z$_2$, $R_{22}$ is hydrogen, nitro, —SO$_2$NH$_2$, —SO$_2$N(R$_{22a}$)$_2$, —SO$_2$—NH—(CH$_2$)$_s$—OH, —CH$_2$—Z$_2$, —SO$_2$—NH—(CH$_2$)$_s$—Z$_2$, —CO—NH—(CH$_2$)$_s$—Z$_2$, —NH—CO—(CH$_2$)$_s$—Z$_2$, wherein each $R_{22a}$ is independently $C_{1-4}$alkyl, $R_{23}$ is hydrogen or methyl, $R_{24}$ is hydrogen, $C_{1-4}$alkyl, 2-hydroxyethyl, —(CH$_2$)$_p$—Z$_2$, benzyl, —N(R$_{30}$)$_2$, —(CH$_2$)$_3$—OCH$_3$, —CH$_2$—CH(CH$_3$)—N(R$_{30}$)$_2$ or —CH$_2$—C(CH$_3$)$_2$—CH$_2$—N(R$_{30}$)$_2$, wherein each $R_{30}$ is independently hydrogen or $C_{1-4}$alkyl, $R_{24a}$ is $C_{1-4}$alkyl, $R_{152}$ is methyl or carboxy, T is —CO—NH$_2$, —NH$_2$, —N(CH$_3$)$_2$, —$\overset{\oplus}{N}$(CH$_3$)$_3$ A$^\ominus$ or —CN, wherein $Z_o$ is —S—, —O— or —NR$_{35}'$—, wherein $R_{35}'$ is hydrogen, $C_{1-4}$alkyl or ($C_{1-4}$-alkoxy)carbonylmethyl, and each $R_{127}$ and m are as defined below, and yo' is —OH or —NH$_2$, wherein each $Z_2$ is independently —NH$_2$, —N(R$_o$)$_2$, —N$^\oplus$(R$_o$)$_3$A$^\ominus$, $\oplus$—N(CH$_3$)$_2$—(CH$_2$)$_p$—NH$_2$ A$^\ominus$, $\oplus$—N(CH$_3$)$_2$—(CH$_2$)$_p$—N(CH$_3$)$_2$ A$^\ominus$ or wherein each $R_o$ is independently methyl, ethyl, 2-hydroxyethyl, benzyl, acetylmethyl or benzoylmethyl, with the proviso that no nitrogen atom contains more than one member of the group consisting of benzyl, acetylmethyl and benzoylmethyl, and no nitrogen atom contains more than two 2-hydroxyethyl groups, each $R_{127}$ is independently methyl or ethyl, and m is 0, 1 or 2, each A$^\ominus$ is independently a non-chromophoric anion, each p is independently 1, 2 or 3, and each s is independently 1, 2, 3, 4, 5 or 6, with the provisos that (i) the compound contains at least two basic water-solubilizing groups, (ii) at least one of $R_{20}$ and $R_{21}$ is other than nitro, (iii) $R_{21}$ and $R_{22}$ are different unless both are hydrogen, (iv) $R_{20}$ is hydrogen when both $R_{21}$ and $R_{22}$ are hydrogen, and (v) at least one of $R_{20}$-$R_{23}$ is hydrogen.

2. A compound according to claim 1 wherein one of $R_{21}$ and $R_{22}$ is hydrogen, and the other is other than hydrogen.

3. A compound according to claim 1 wherein $A_4$ is —OH, —NH$_2$, —COOH or $C_{1-4}$alkoxy, with the proviso that the compound contains 2 to 4 basic water-solubilizing groups.

4. A compound according to claim 1 having the formula

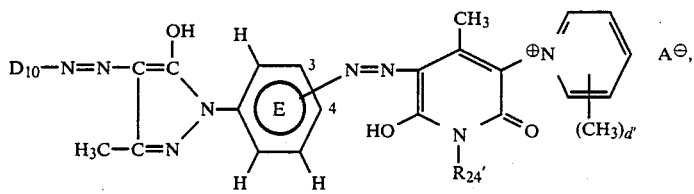

wherein
D₁₀ is

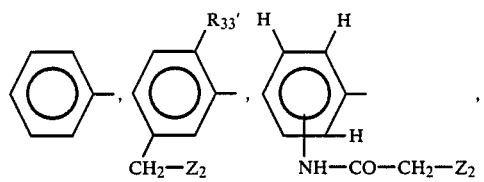

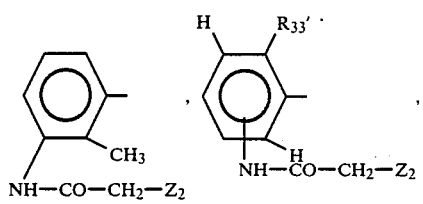

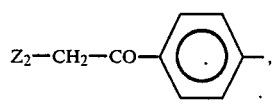

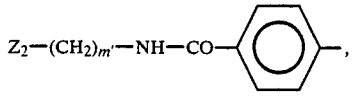

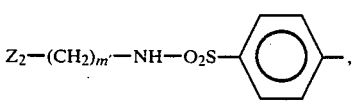

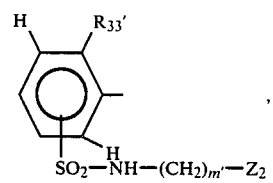

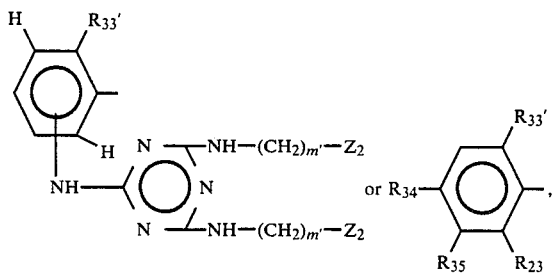

wherein
$R_{23}$ is hydrogen or methyl,
$R_{33'}$ is hydroxy, methoxy, ethoxy or carboxy,
$R_{34}$ is hydrogen, nitro, —SO₂NH₂ or —CH₂—Z₂, and $R_{35}$ is hydrogen, nitro, —SO₂NH—(CH₂)₂—OH, —SO₂NH₂, —SO₂NH—(CH₂)₃—N(CH₃)₂ or

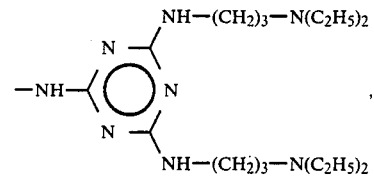

$R_{24'}$ is hydrogen, methyl, ethyl, n-propyl, i-propyl, n-butyl, i-butyl, 2-hydroxyethyl, benzyl, dimethylamino, —(CH₂)$_{m'}$—Z₂,

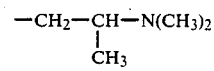

or
—CH₂—C(CH₃)₂—CH₂—N(CH₃)₂, and
d' is 0 or 1,
wherein each
$Z_2$ is independently —NH₂, —N(R$_o$)₂, —N⊕(R$_o$)₃ A⊖,

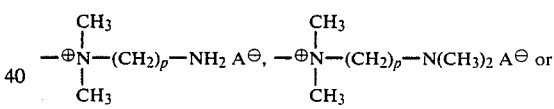

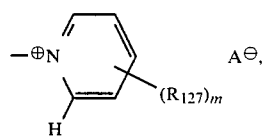

wherein each
R$_o$ is independently methyl, ethyl, 2-hydroxyethyl, benzyl, acetylmethyl or benzoylmethyl, with the proviso that no nitrogen atom contains more than one member of the group consisting of benzyl, acetylmethyl and benzoylmethyl, and no nitrogen atom contains more than two 2-hydroxyethyl groups,
each
$R_{127}$ is independently methyl or ethyl,
m is 0, 1 or 2, and
p is 1, 2 or 3,
each
A⊖ is independently a non-chromophoric anion, and
each
m' is independently 2 or 3,
with the provisos that (i) $R_{34}$ and $R_{35}$ are different or $R_{34}$ and $R_{35}$ are both hydrogen, (ii) when $R_{35}$ is 2,4—(-bis(3'-diethylamino)propylamino)-1,3,5-triazin-6-ylamino or —SO₂NH—(CH₂)₃—N(CH₃)₂, at least one of $R_{23}$ and $R_{34}$ is other than hydrogen, (iii) the —N=N— radical attached to ring E is in the 3- or 4-position, and (iv) the compound contains at least two basic water-solubilizing groups.

5. A compound according to claim 4 wherein
$D_{10}$ is

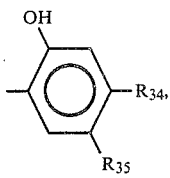

wherein
one of $R_{34}$ and $R_{35}$ is hydrogen, and the other is other than hydrogen, and
each
p is independently 2 or 3.

6. A compound according to claim 4 having the formula

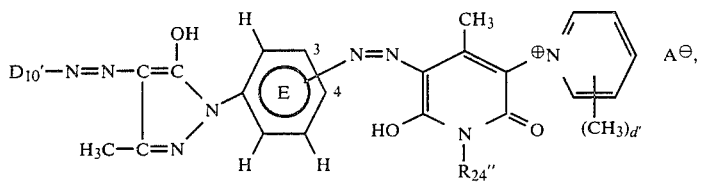

wherein
$D_{10}'$ is

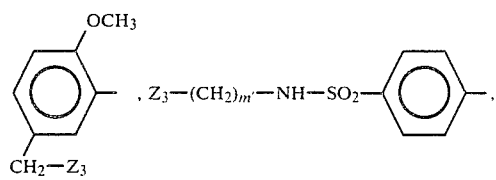

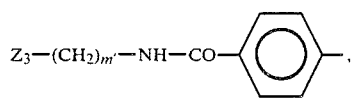

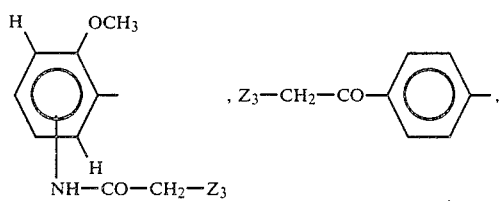

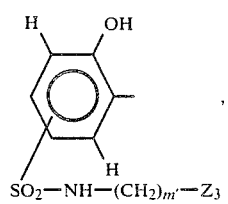

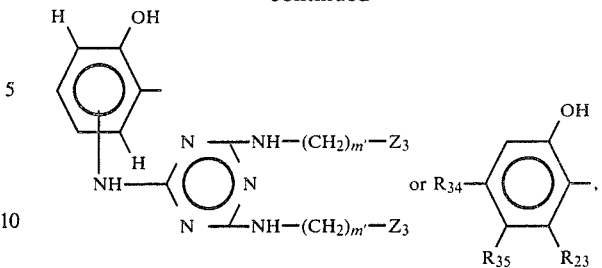

wherein
$R_{23}$ is hydrogen or methyl,
$R_{34}$ is hydrogen, nitro, —SO$_2$NH$_2$ or —CH$_2$—Z$_2$,
wherein
$Z_2$ is —NH$_2$, —N(R$_o$)$_2$, —N$^\oplus$(R$_o$)$_3$A$^\ominus$,

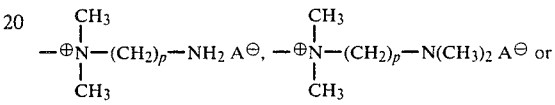

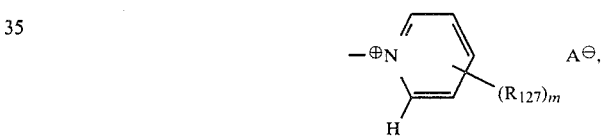

wherein each
$R_o$ is independently methyl, ethyl, 2-hydroxyethyl, benzyl, acetylmethyl or benzoylmethyl, with the provisos that no nitrogen atom contains more than one member of the group consisting of benzyl, acetylmethyl and benzoylmethyl, and no nitrogen atom contains more than two 2-hydroxyethyl groups,
each
$R_{127}$ is independently methyl or ethyl,
and
m is 0, 1 or 2, and
$R_{35}$ is hydrogen, nitro, —SO$_2$NH—(CH$_2$)$_2$—OH, —SO$_2$NH$_2'$—SO$_2$NH—(CH$_2$)$_3$—N(CH$_3$)$_2$ or

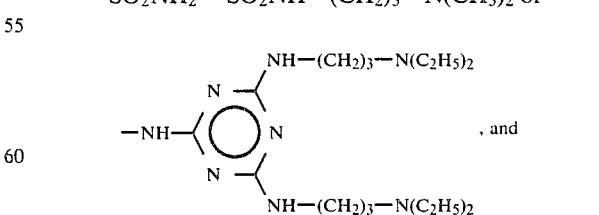

$R_{24}''$ is hydrogen, methyl, ethyl, 2-hydroxyethyl or —(CH$_2$)$_{m'}$—Z$_3$,
wherein each
$Z_3$ is independently —N(CH$_3$)$_2$, —N(C$_2$H$_5$)$_2$, —N$^\oplus$(CH$_3$)$_3$A$^\ominus$, —N$^\oplus$(C$_2$H$_5$)$_3$A$^\ominus$,

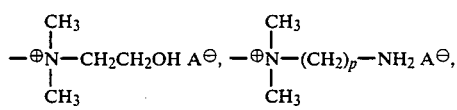

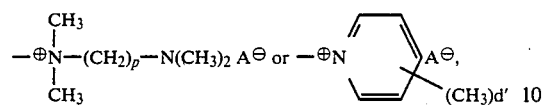 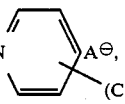

each
A⊖ is independently a non-chromophoric anion,
each
d' is independently 0 or 1,
each
m' is independently 2 or 3, and
each
p is independently 1, 2 or 3,
with the provisos that (i) $R_{34}$ and $R_{35}$ are different or $R_{34}$ and $R_{35}$ are both hydrogen, (ii) when $R_{35}$ is 2,4-(bis(3'-diethylamino)propylamino)-1,3,5-triazin-6-ylamino or —SO$_2$NH—(CH$_2$)$_3$—N(CH$_3$)$_2$, at least one of $R_{23}$ and $R_{34}$ is other than hydrogen, (iii) the —N═N— radical attached to ring E is in the 3- or 4-position, and (iv) the compound contains at least two basic water-solubilizing groups.

7. A compound according to claim 6 wherein
$D_{10}'$ is

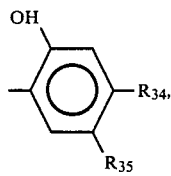

wherein
one of $R_{34}$ and $R_{35}$ is hydrogen, and the other is other than hydrogen, and
each
p is independently 2 or 3.

8. A compound according to claim 6 having the formula

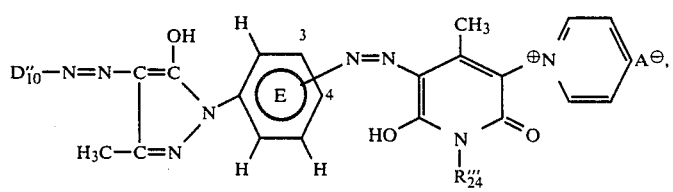

wherein
$D_{10}''$ is

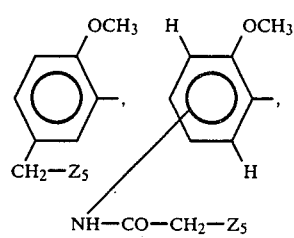

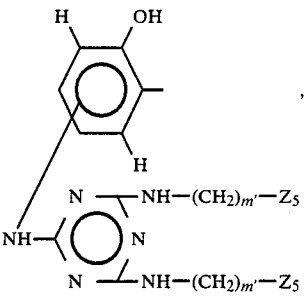

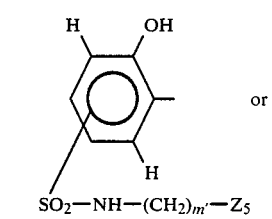

wherein each
$Z_5$ is independently —N(CH$_3$)$_2$, —N(C$_2$H$_5$)$_2$,

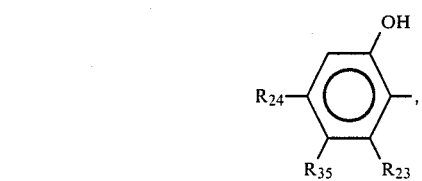 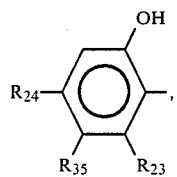

each
m' is independently 2 or 3, and
$R_{23}$, $R_{34}$ and $R_{35}$ are as defined in claim 6, and
$R_{24}'''$ is hydrogen, 2-hydroxyethyl, —(CH$_2$)$_3$—N(CH$_3$)$_2$, —(CH$_2$)$_3$—N(C$_2$H$_5$)$_2$ or —(CH$_2$)$_3$—N⊕(CH$_3$)$_3$A⊖,
wherein each
A⊖ is independently a non-chromophoric anion, with the provisos that (i) $R_{34}$ and $R_{35}$ are different or $R_{34}$ and $R_{35}$ are both hydrogen, (ii) when $R_{35}$ is 2,4-(bis(3'-diethylamino)propylamino)-1,3,5-triazin-6-ylamino or —SO$_2$NH—(CH$_2$)$_3$—N(CH$_3$)$_2$, at least one of $R_{23}$ and $R_{34}$ is other than hydrogen, (iii) the —N═N— radical attached to ring E is in the 3- or 4-position, and (iv) the compound contains at least two basic water-solubilizing groups.

9. A compound according to claim 8 wherein
$D_{10}''$ is

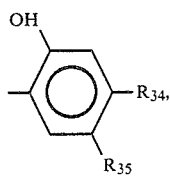

wherein
one of $R_{34}$ and $R_{35}$ is hydrogen, and the other is other than hydrogen.

10. A compound according to claim 8 wherein
$D_{10}''$ is 2-hydroxy-5-nitrophenyl,
$R_{24}'''$ is —(CH$_2$)$_3$—N(CH$_3$)$_2$, and
the —N=N— radical is in the 4-position of ring E.

11. The compound according to claim 10 wherein
$A^\ominus$ is chloride.

12. A compound according to claim 8 wherein
$D_{10}''$ is 2-hydroxy-4-nitrophenyl,
$R_{24}'''$ is —(CH$_2$)$_3$—N(CH$_3$)$_2$, and
the —N=N— radical is in the 4-position of ring E.

13. The compound according to claim 12 wherein
$A^\ominus$ is chloride.

14. A compound according to claim 8 wherein
$D_{10}''$ is 2-hydroxy-5-nitrophenyl,
$R_{24}'''$ is —(CH$_2$)$_3$—N(CH$_3$)$_2$, and
the —N=N— radical is in the 3-position of ring E.

15. The compound according to claim 14 wherein
$A^\ominus$ is chloride.

16. A compound according to claim 8 wherein
$D_{10}''$ is 2-hydroxy-5-sulfamoylphenyl,
$R_{24}'''$ is —(CH$_2$)$_3$—N(CH$_3$)$_2$, and
the —N=N— radical is in the 3-position of ring E.

17. The compound according to claim 16 wherein
$A^\ominus$ is chloride.

18. A compound according to claim 8 wherein
$D_{10}''$ is 2-hydroxy-4-nitrophenyl,
$R_{24}'''$ is —(CH$_2$)$_3$—N(CH$_3$)$_2$, and
the —N=N— radical is in the 3-position of ring E.

19. The compound according to claim 18 wherein
$A^\ominus$ is chloride.

* * * * *